Jan. 21, 1941.　　　　L. V. LEWIS　　　　2,229,249
REMOTE CONTROL SYSTEM
Filed March 23, 1932　　　11 Sheets-Sheet 1

INVENTOR.
Lloyd V. Lewis.
HIS ATTORNEY.

Jan. 21, 1941.   L. V. LEWIS   2,229,249
REMOTE CONTROL SYSTEM
Filed March 23, 1932   11 Sheets-Sheet 4

INVENTOR.
Lloyd V. Lewis.
By
HIS ATTORNEY.

Jan. 21, 1941.  L. V. LEWIS  2,229,249
REMOTE CONTROL SYSTEM
Filed March 23, 1932   11 Sheets-Sheet 5

INVENTOR.
Lloyd V. Lewis.
By
HIS ATTORNEY.

Jan. 21, 1941.  L. V. LEWIS  2,229,249
REMOTE CONTROL SYSTEM
Filed March 23, 1932  11 Sheets-Sheet 9

INVENTOR.
Lloyd V. Lewis.
By
HIS ATTORNEY.

INVENTOR.
Lloyd V. Lewis.
HIS ATTORNEY.

Patented Jan. 21, 1941

2,229,249

UNITED STATES PATENT OFFICE 2,229,249

REMOTE CONTROL SYSTEM

Lloyd V. Lewis, Edgewood, Pa., assignor to The Union Switch & Signal Company, Swissvale, Pa., a corporation of Pennsylvania Application March 23, 1932, Serial No. 600,786

132 Claims. (Cl. 246—5)

My invention relates to remote control systems for the control and/or indication of a large number of devices from a control point, and is particularly adapted for, though in no way limited to, centralized traffic controlling systems for railroads in which traffic governing devices along the trackway are controlled from a central point, such as a train dispatcher's office, and the conditions of such devices and associated apparatus are indicated in said office. More particularly my present invention relates to a centralized traffic control system of the type described which employs but two line wires to connect the control office with each of a plurality of field stations and in which all operations are performed by means of code signals transmitted over these line wires. In the present embodiment of my invention, all operations of generating, transmitting, receiving and selecting code signals are performed by relays.

My present invention is an improvement upon the systems disclosed in my copending applications, Serial No. 291,465, filed July 9, 1928, now U. S. Patent 2,197,130 granted April 16, 1940, and Serial No. 373,675, filed June 25, 1929, now U. S. Patent 2,127,691 granted August 23, 1938, and contemplates the use of code signals produced by interrupting the line circuit connecting the office and the field stations to produce open circuit code elements of different lengths. One object of my present invention is the provision of a system of this character in which the periods of open circuit and closed circuit in the line wires are both regulated so that both of these periods are employed as code elements.

Other objects and features of my invention will become apparent as the description proceeds.

I will describe two forms of apparatus embodying my invention, and will then point out the novel features thereof in claims.

Figure 1:
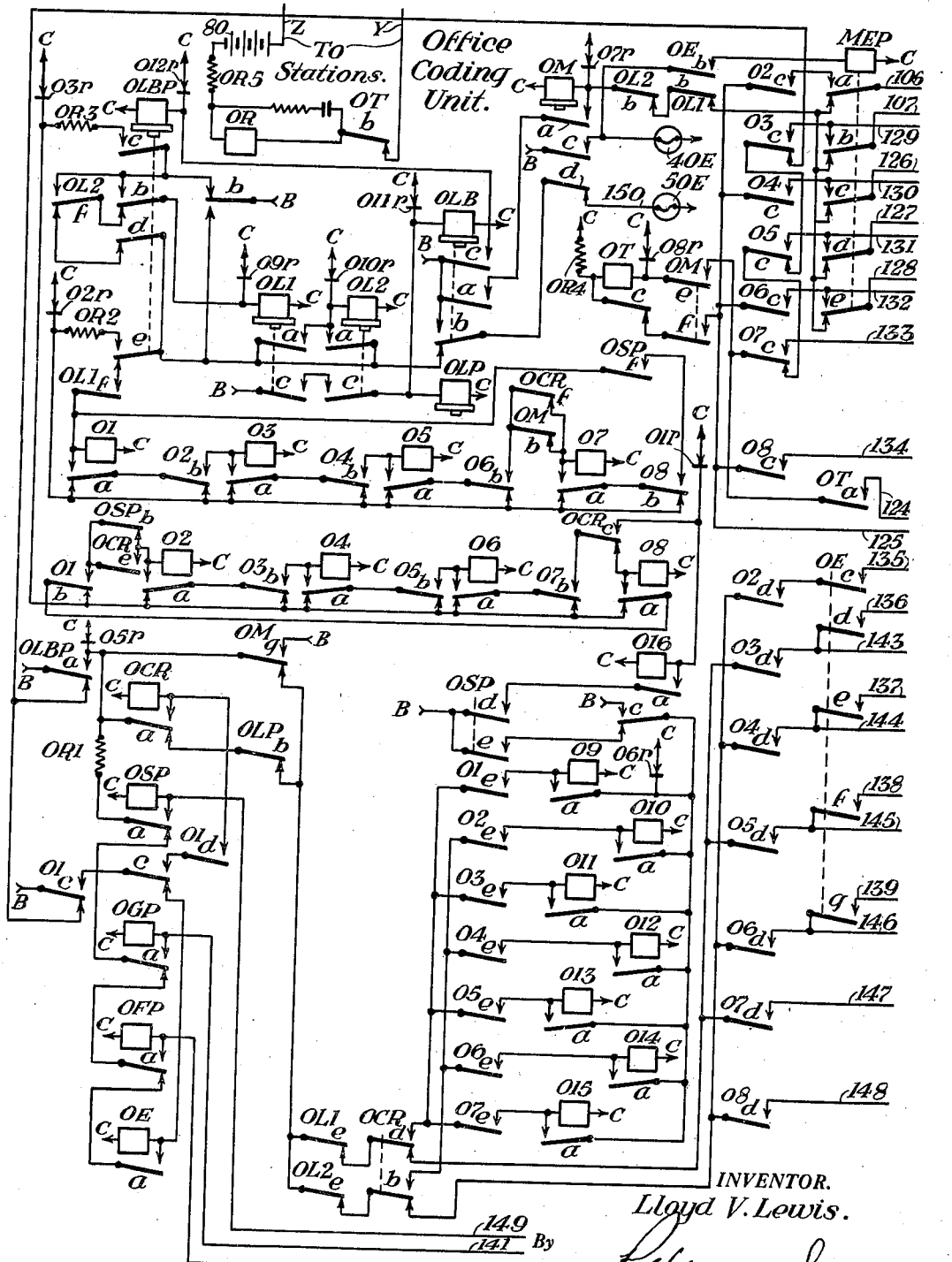
Figure 2:
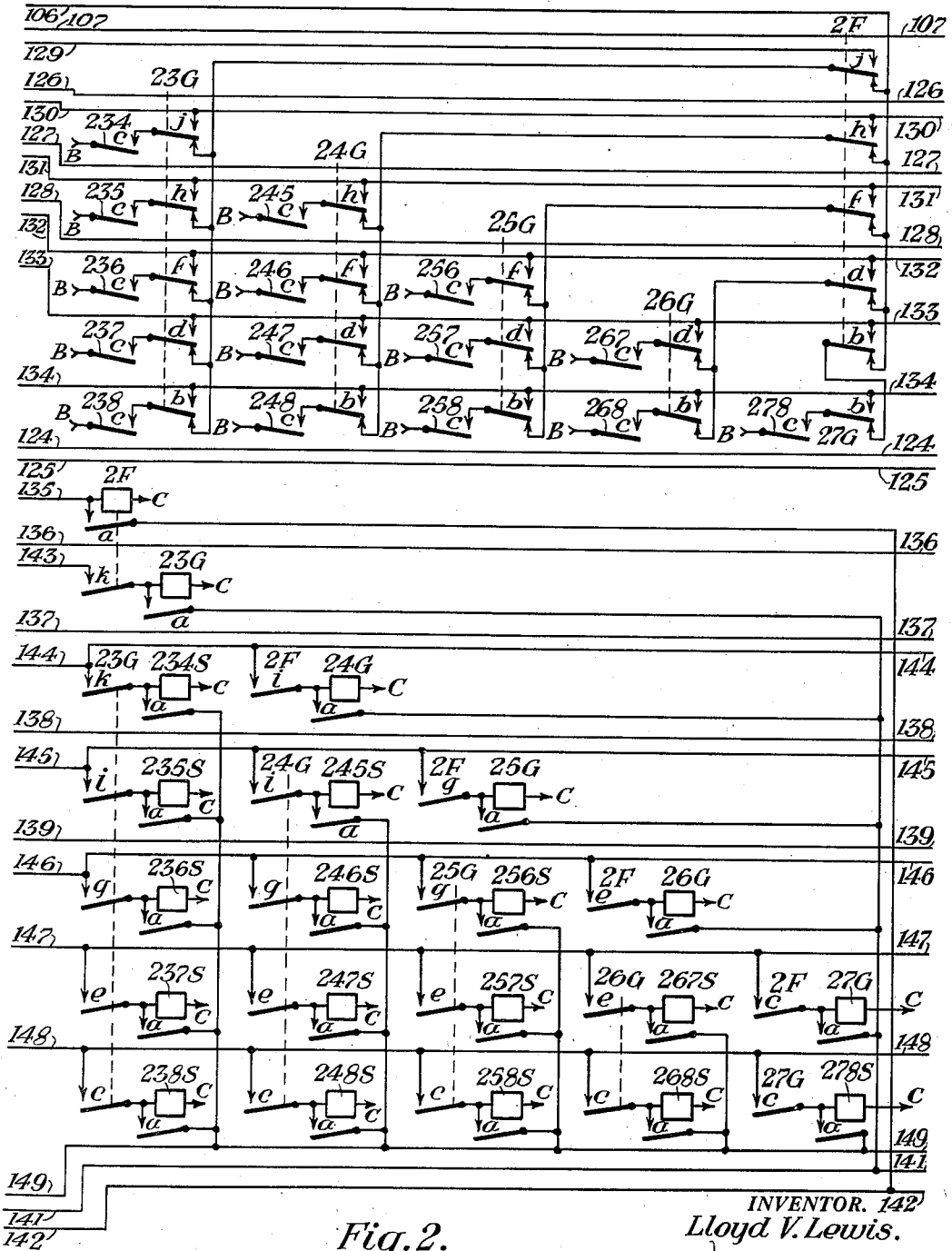
Figure 3:
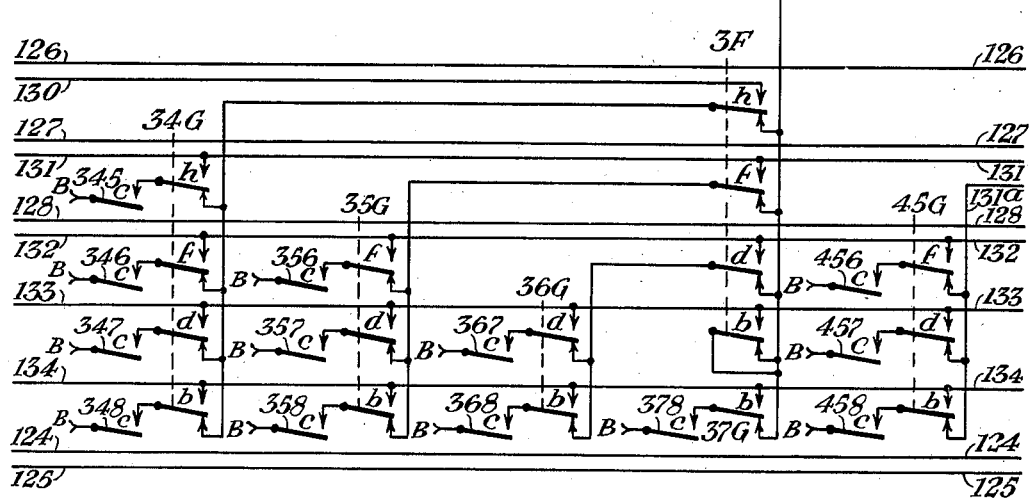
Figure 3:
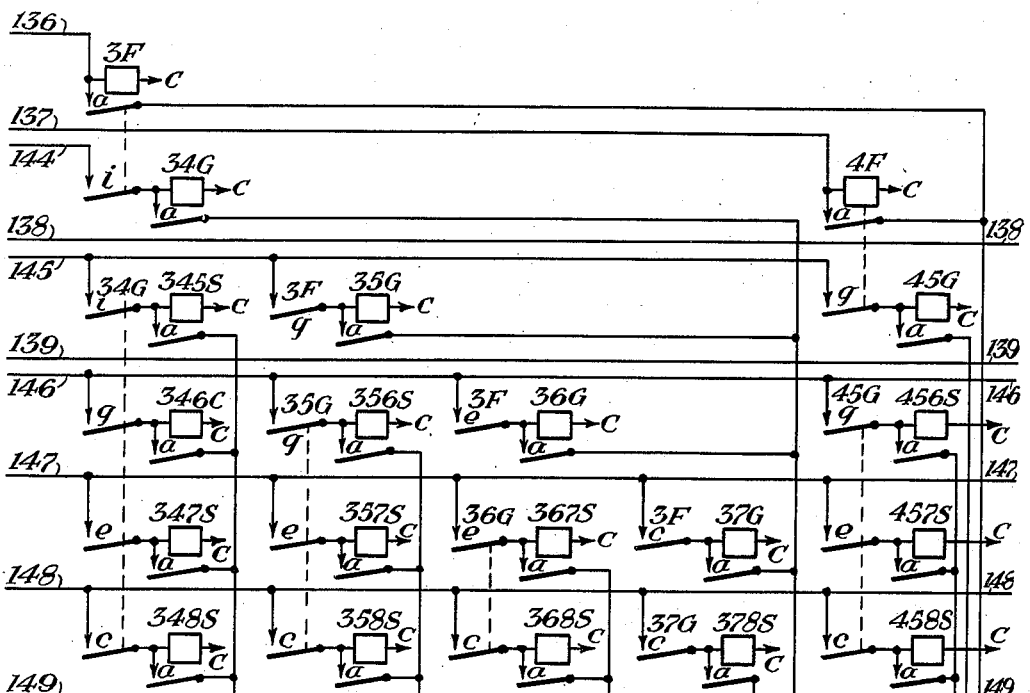
Figure 4:
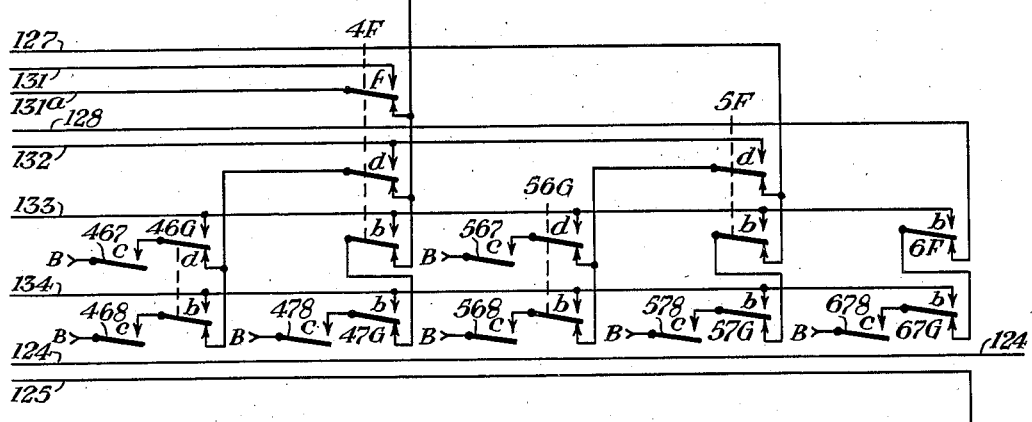
Figure 4:
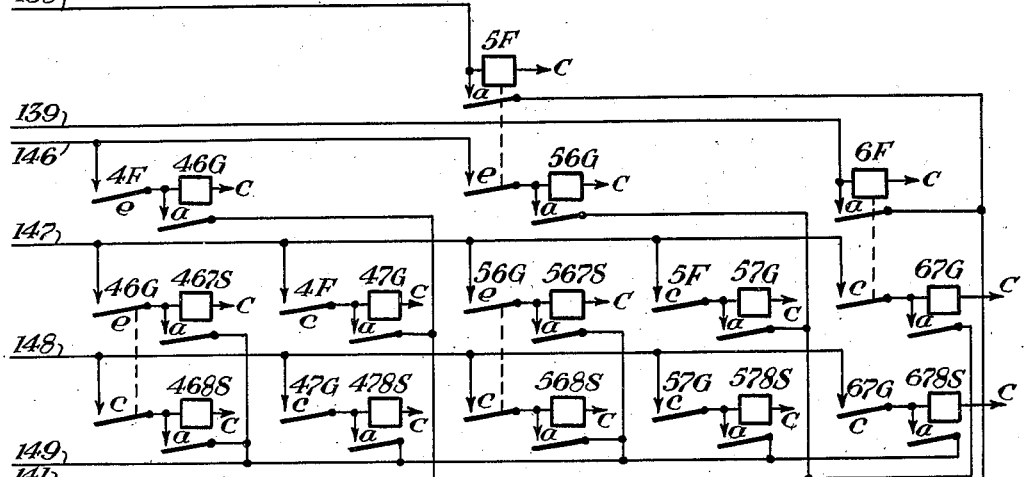
Figure 5:
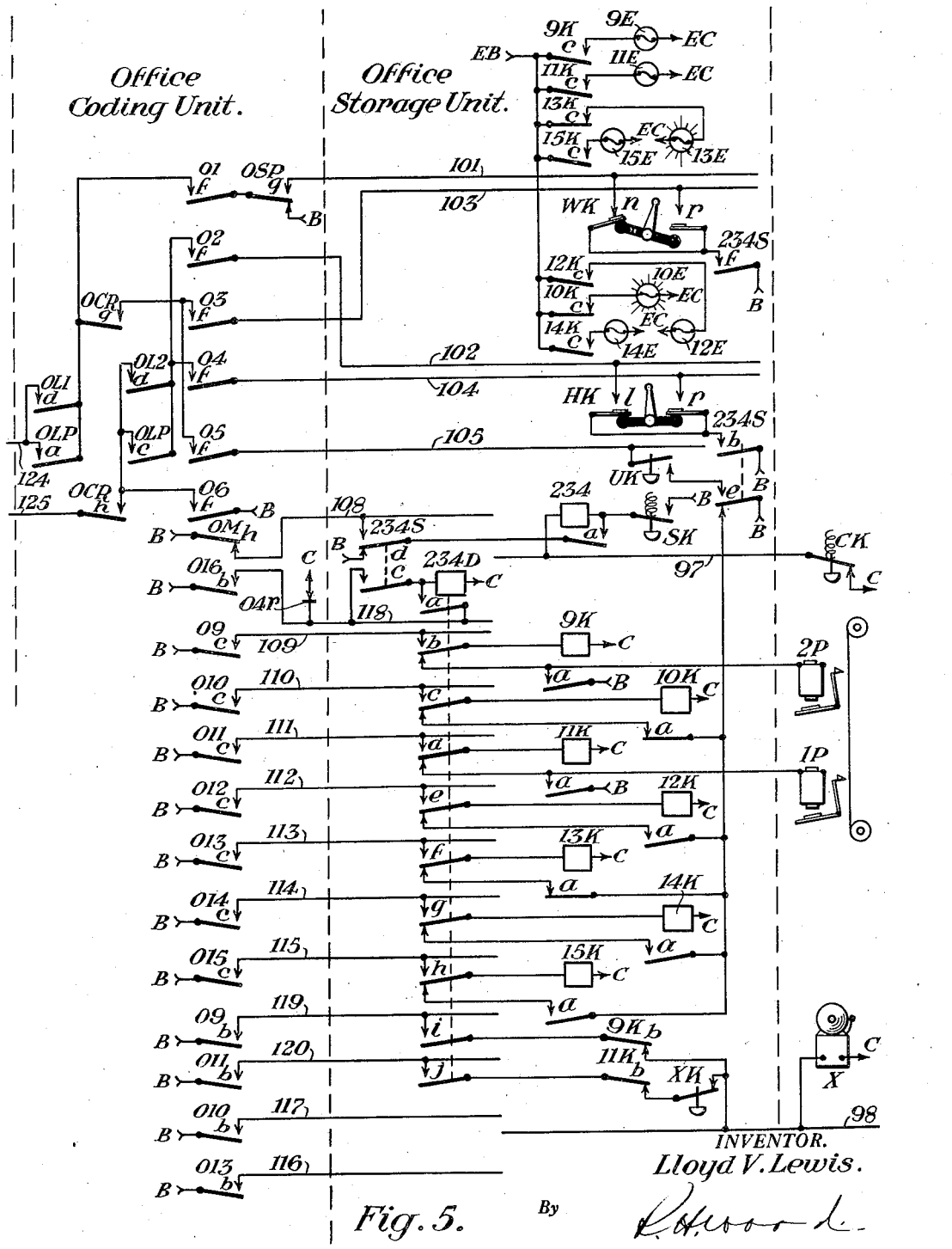
Figure 6:
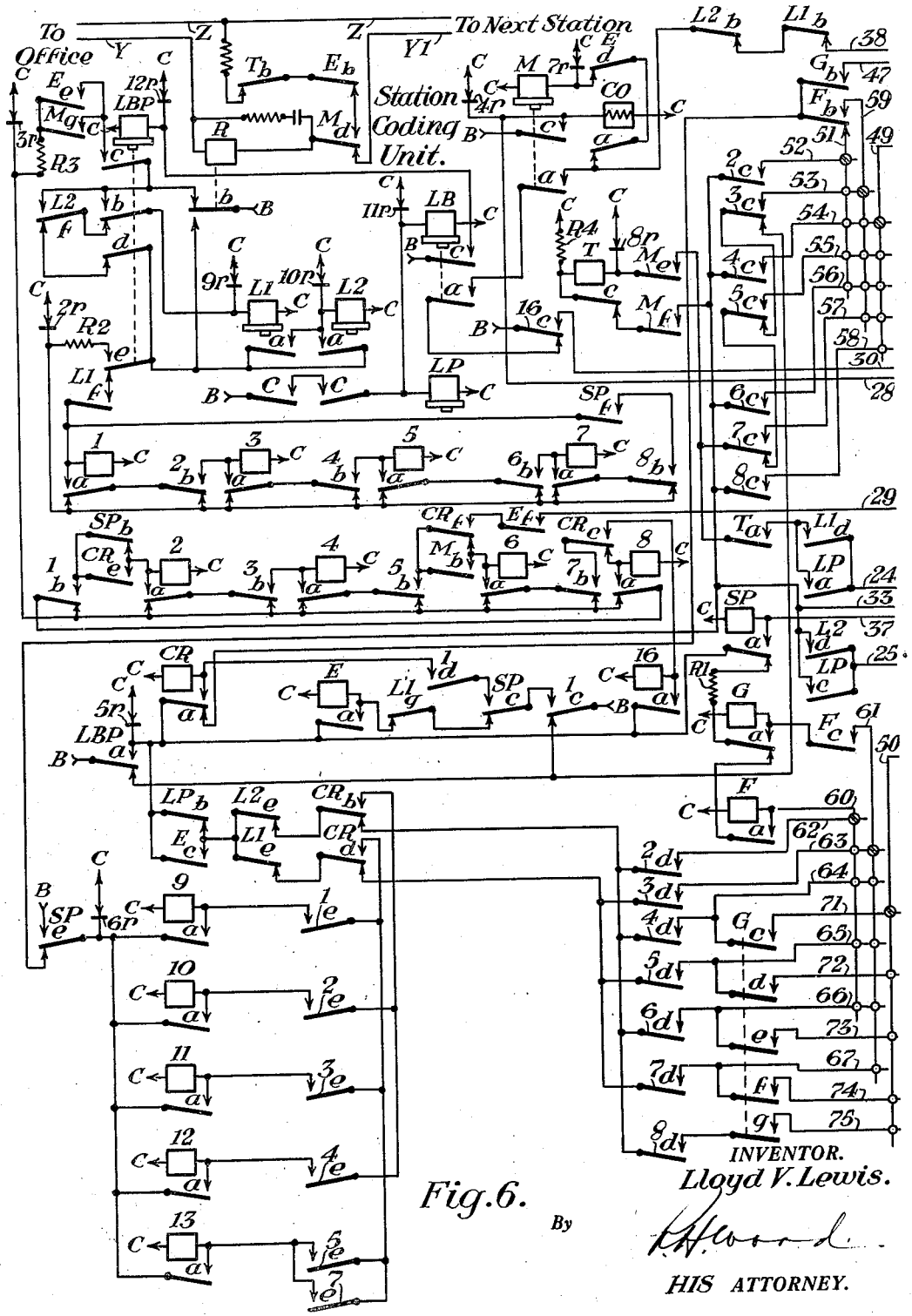
Figure 7:
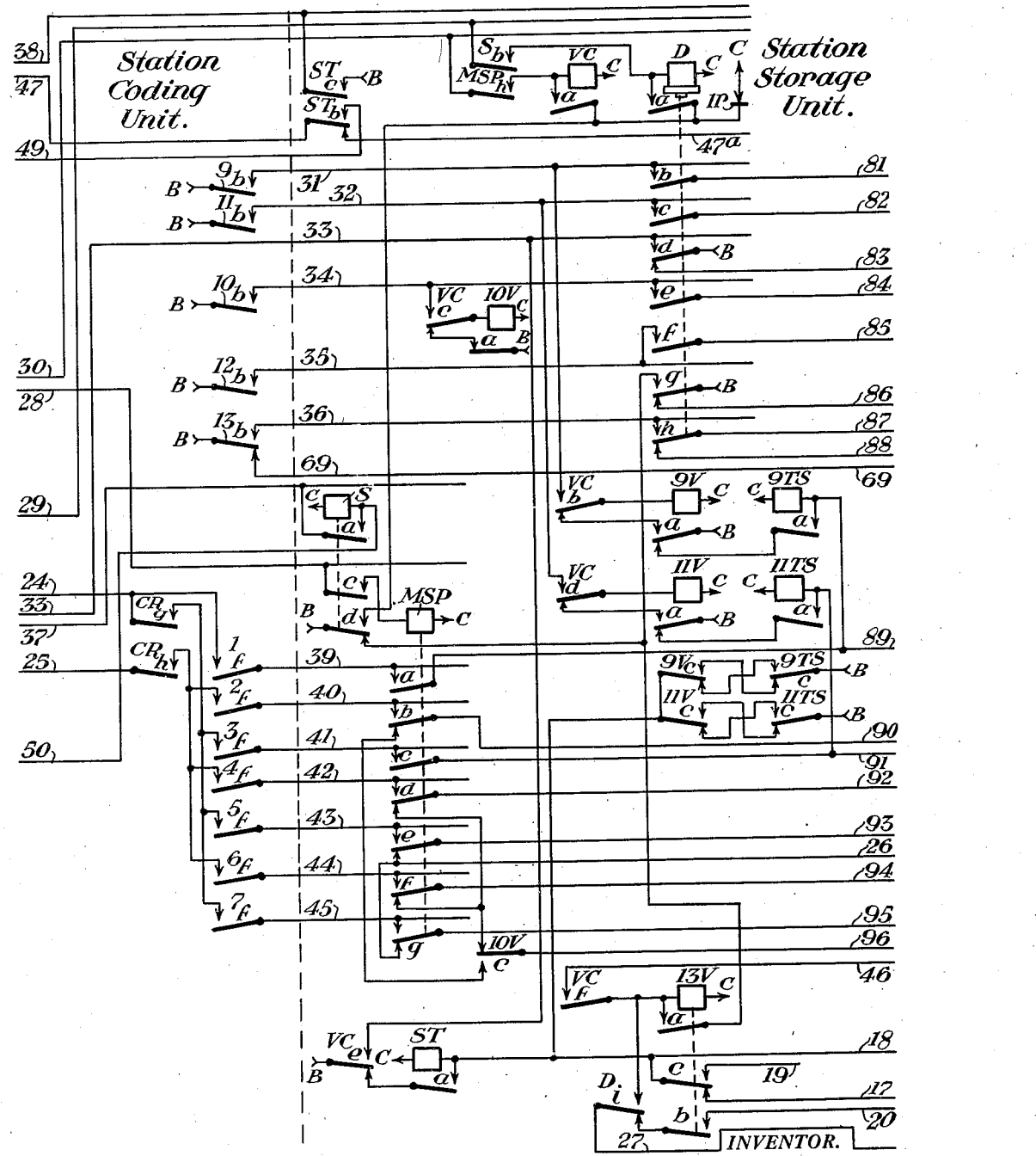
Figure 8:
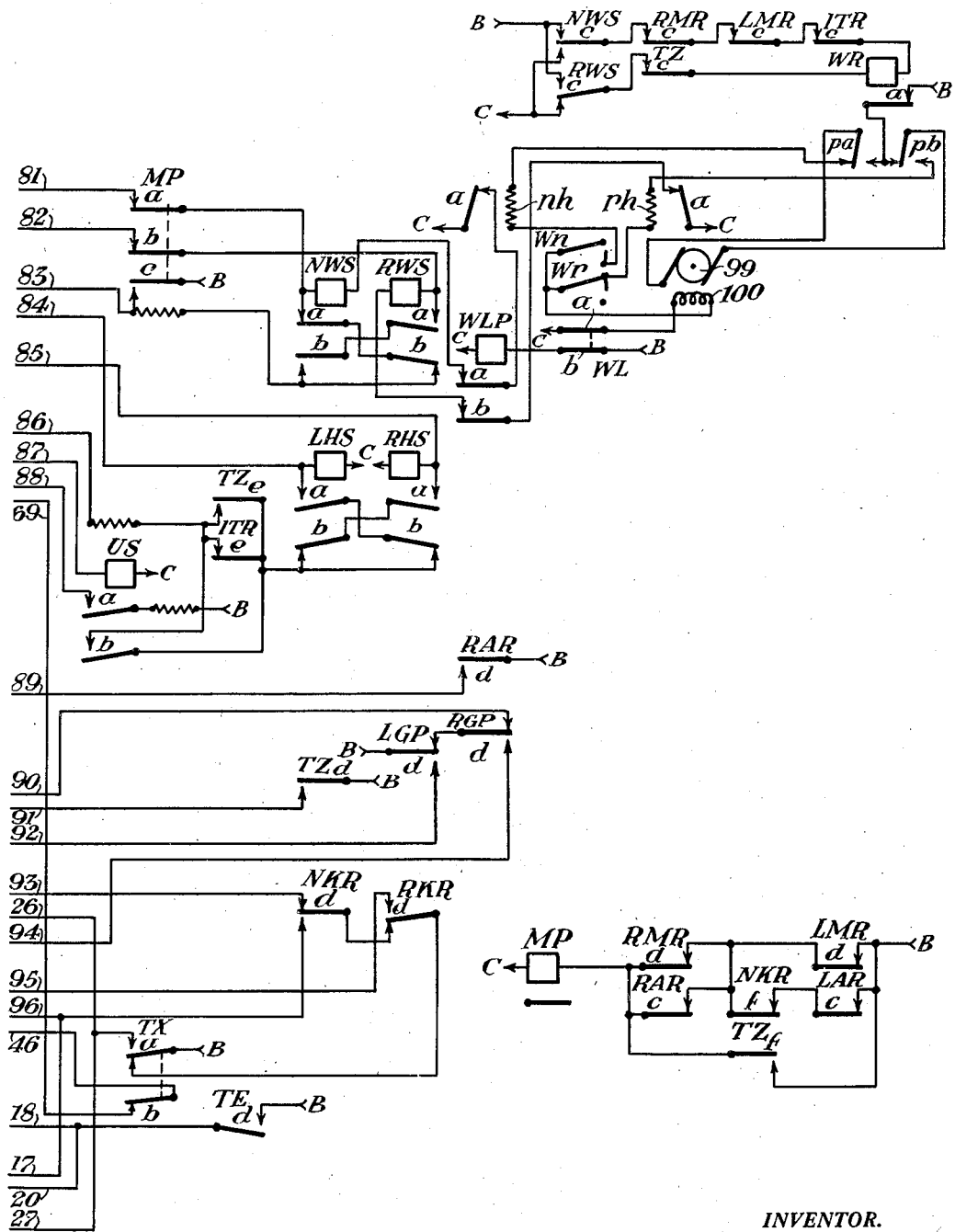
Figure 9:
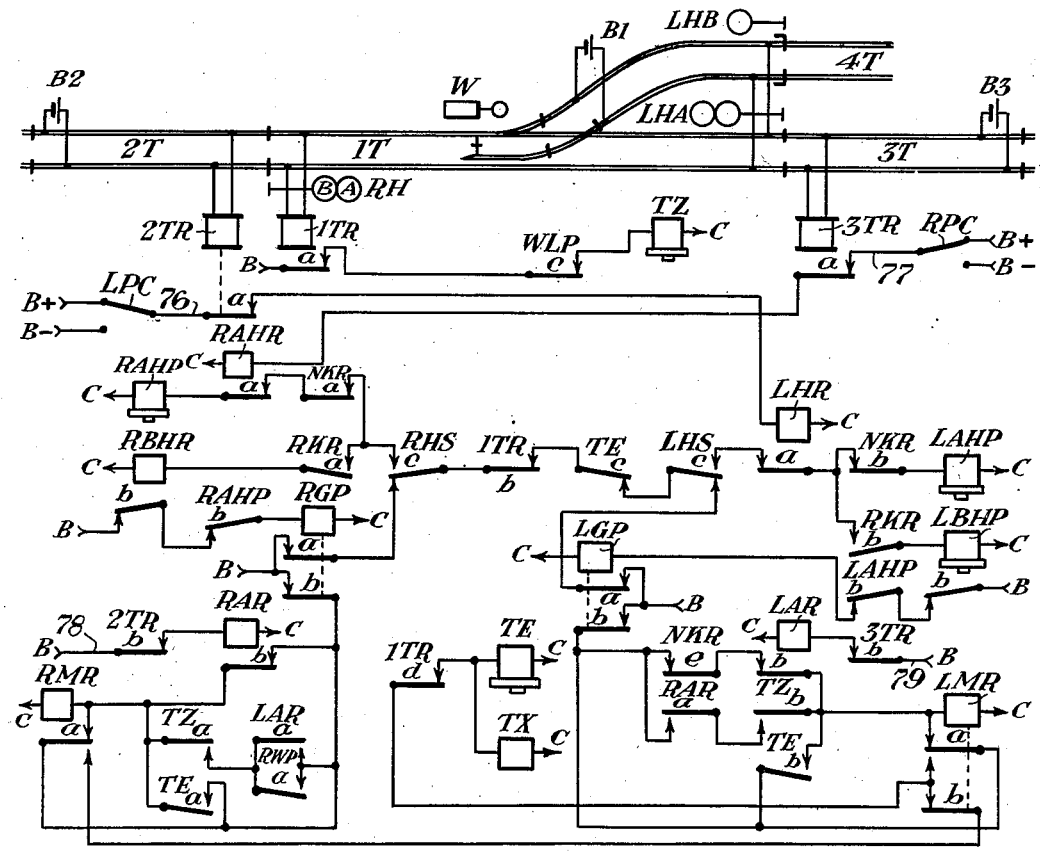
Figure 9:
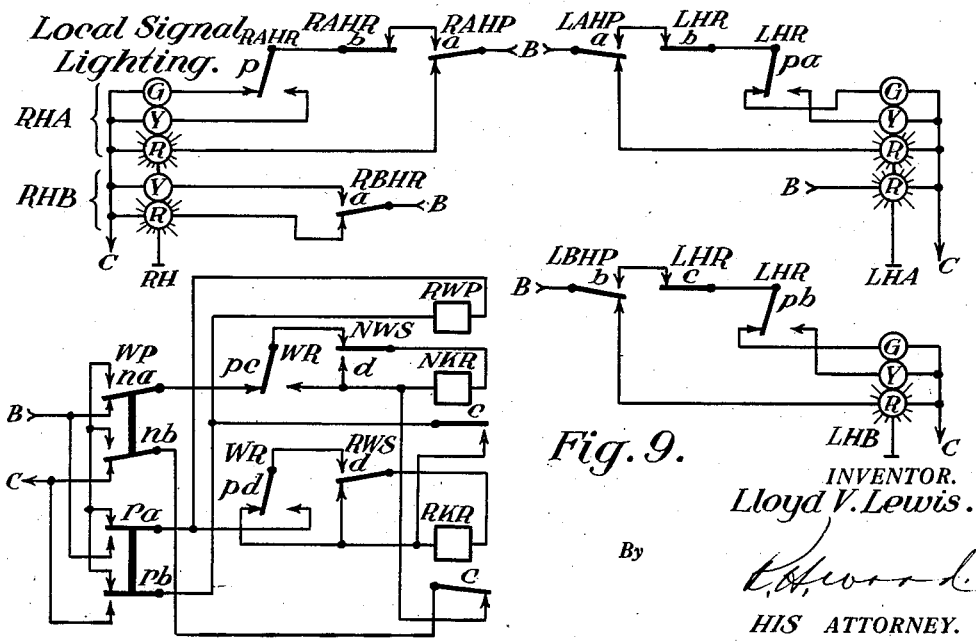
Figure 10:
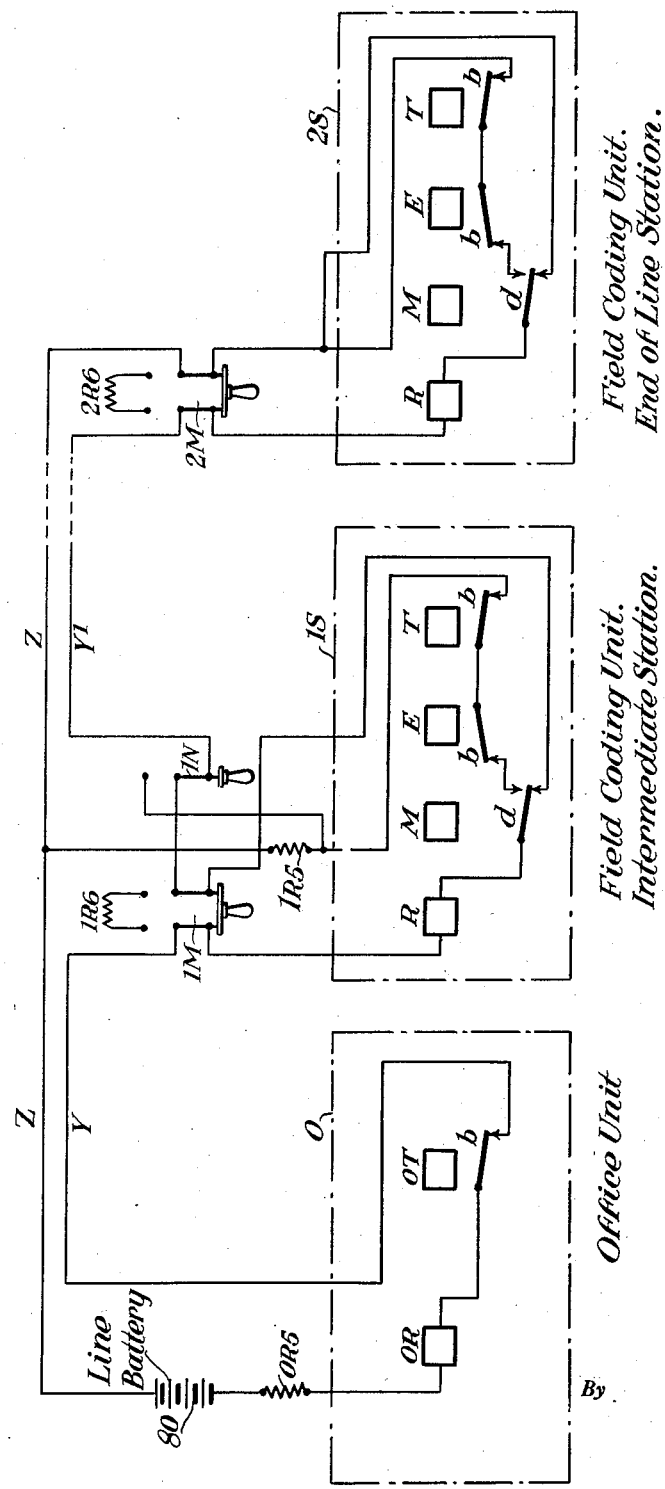
Figure 11:
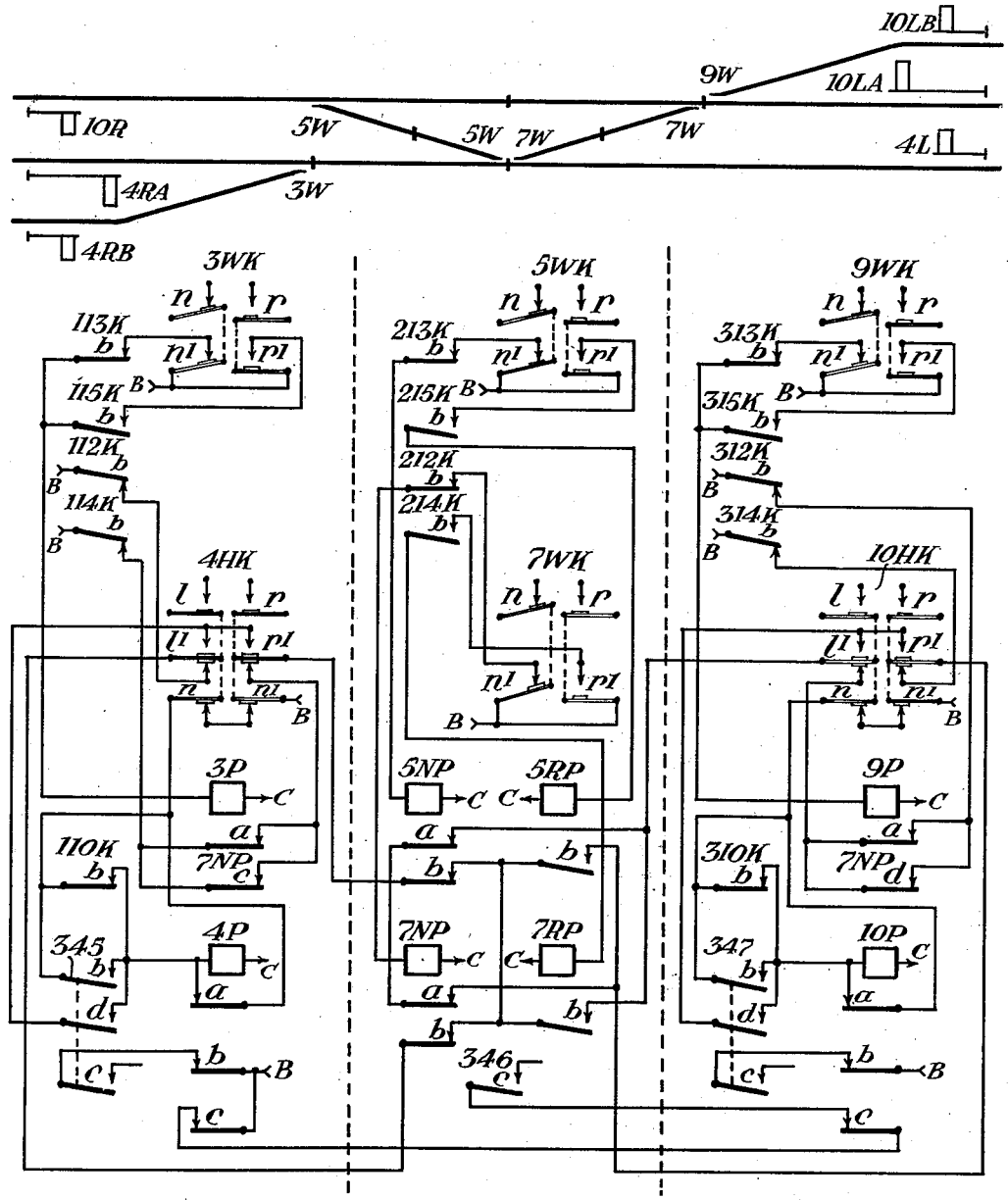

In the accompanying drawings, Figs. 1 to 5, inclusive, arranged side by side, form a diagrammatic view illustrating one form of office equipment employed in a centralized traffic control system embodying my invention. Fig. 1 illustrates a portion of an "office coding unit" for generating and delivering code signals to the line circuit and for receiving code signals from the line circuit. Figs. 2, 3 and 4 show selecting apparatus controlled by the coding apparatus of Fig. 1 when arranged for the control of a total of thirty-five "stations" or unit groups of apparatus. Fig. 5 shows, at the right, a typical "office storage unit," comprising a panel containing the levers for the control of a unit group of station apparatus, together with the relays and other apparatus that are individually associated therewith. Fig. 5 at the left, shows a portion of the office coding unit which directly controls the storage units. Figs. 6 to 9, inclusive, when arranged side by side, form a diagrammatic view illustrating the field station equipment embodying my invention. Fig. 6 shows a portion of a "station coding unit" for transmitting and receiving code signals. One such "station coding unit" is provided for each field location. Fig. 7 shows at the left, another portion of the station coding unit, and at the right, a "station storage unit," of which one is provided for each unit group of apparatus to be controlled. Fig. 8 shows the railway signaling relays and apparatus at the field station controlled directly by the storage unit of Fig. 7. Fig. 9 shows at the top a track diagram of a typical station and also shows signaling relays and apparatus controlled by traffic conditions and by the apparatus of Fig. 8. Fig. 10 is a diagrammatic view illustrating the line circuit connecting the office and stations, together with the apparatus immediately associated with such line circuit at the office and at two field stations. Fig. 11 is a view showing a modification of a portion of the apparatus embodying my invention as applied to the control of a group of interlocked switches and signals.

Similar reference characters refer to similar parts in each of the several views.

In the specific form herein shown and described, the centralized traffic controlling system of my invention includes apparatus at a control office and at each of a plurality of stations spaced at intervals along the line of a single track railroad, and provides means for continuously indicating to an operator at the dispatcher's office the condition of each of the switches and signals in the controlled territory for indicating and recording the passage of each train through the territory, and provides means whereby he may operate track switches and arrange train meets without stopping trains and without the use of train orders, and without the necessity of communicating with trains except by controlling the railway signals which govern train movements over the switches.

Fig. 9 shows a typical field station, comprising a section of a single track railroad including a switch W located in a track section IT having a track circuit with the usual track battery BI and track relay ITR. This track section is connected with a stretch of single track of which one section 2T has a track circuit with a track relay 2TR as shown at the left, and also is connected with a stretch of double track, of which one portion is shown at the right consisting of a main track section 3T having a track circuit with track relay 3TR and a passing siding 4T which, as shown, is not provided with a track circuit. A signal RHA controls train movements from section 2T to section 3T of the main line when the switch W is in its normal position. Signal RHB controls train movements from section 2T to section 4T of the siding when the switch W is reversed. Signals LHA and LHB control train movements out of sections 3T and 4T respectively into the single track stretch. It is to be understood that the next station to the right of that shown in Fig. 9 may be similarly arranged except that the passing siding will be at the left and the single track section at the right, and this may also be true of the next section to the left of that shown in Fig. 9. The territory controlled may consist not only of a series of passing sidings each having one end arranged similarly to Fig. 9, and the other end arranged similarly to Fig. 9 reversed, with intervening stretches of single track between the sidings, but may include other track arrangements, for example, some of the sections of main track and siding may be operated as double track, and may include interlockings such as illustrated in Fig. 11.

As explained more in detail hereinafter, the control and indication functions are performed by means of codes produced by repeatedly interrupting the line circuit connecting the office and the stations, to form a series of code elements. Distinctive characters are given to the codes by making the several code elements long or short in different patterns. One novel feature of my present invention resides in an arrangement of apparatus whereby both the open and closed periods of the line circuit are employed as code elements. Another novel feature of my invention resides in a method of code selection whereby I am able to control a much larger number of stations with a limited number of code elements than has been heretofore possible in systems of this character, while at the same time, my system is arranged in such a manner that all station codes have the same number of selecting elements, with the result that a failure to transmit or receive any selecting element in a code can not result in the selection of a wrong station.

As herein shown and described the total number of elements employed in an indication code is sixteen, comprising eight consecutive interruptions of the line circuit. Each code element is identified in character by its relative length, and may be either short or long. Each code comprises a selected combination of short and long, closed and open periods, as represented by the presence or absence of current in the line circuit.

The sixteen elements of an indication code are arranged in two groups of eight elements, the first group including a first element invariably short in an indication code to distinguish from a control code, and seven elements for station selection of which three are long and four short in a selected combination. The second group includes one element for each of the seven indications which the system provides as hereinafter described, and a final element comprising the normally closed condition of the line following the last interruption.

A control code consists of a series of fourteen elements comprising seven interruptions of the line circuit and includes a first group of eight elements of which the first is invariably long in a control code to distinguish from an indication code, and seven elements for station selection of which three are long and four short in a selected combination. The second group of elements in a control code includes five control impulses and a final element comprising the normally closed condition of the line following the last interruption.

The seven code elements for station selection are arranged in the same pattern in a control code for controlling a station and in the corresponding indication code transmitted by that station, and are controlled in a novel manner so as to employ all possible combinations of seven elements taken three at a time. Mathematically, these combinations are given by the formula $$\frac{7\times 6\times 5}{1\times 2\times 3}=35.$$

That is, the seven selecting elements provide thirty-five combinations, and therefore my system as illustrated is adapted to control thirty-five stations. My invention is not limited to this particular arrangement however, and this number of code elements is employed merely by way of illustration.

The office equipment preferably comprises a control board consisting of a number of similarly arranged panels each assigned to one station. Fig. 5 shows the panel assigned to the particular station shown in Fig. 9. This panel comprises a track indication lamp 11E for indicating the condition of the track section 1T which includes the switch and an approach indication lamp 9E for indicating the condition of a track section approaching the switch, such as section 2T. The panel also includes a two-position switch control lever WK, two switch indication lamps 13E and 15E, a three-position signal control lever HK, three signal indication lamps 10E, 12E and 14E, an auxiliary key UK, and a spring return starting key SK. The control levers WK and HK may be of any suitable type, such for example, as those illustrated in my copending application Serial No. 475,440, filed August 15, 1930, now Patent No. 1,887,273, granted November 8, 1932.

To effect a control, the operator positions the levers WK and HK, and the key UK as desired, and then momentarily closes starting key SK. This initiates the operation of the coding units at the office and at each of the field stations. The office coding unit generates a first group of code elements which selects the particular office storage unit individual to the panel from which the code was initiated, and simultaneously selects the corresponding station storage unit. The office coding unit then transmits a second group of code elements whose character is determined by the positions of the control levers of the selected panel, which elements are received by the selected station unit only, to control the switch and signal at the selected station according to the positions of the control levers. Thus if lever WK is in its normal position to close its left-hand contact n, the ninth element of a control code will be a long element and switch stick relay NWS (Fig. 8) will be operated to move the switch to its normal position as will appear hereinafter. If lever WK is reversed to close its right-hand contact r, the eleventh element will be long and relay RWS will be operated in lieu of NWS. If the signal lever HK is moved to close its left-hand contact $l$, the tenth element will be long and signal stick relay LHS will be picked up; if moved to close its right-hand contact $r$, the twelfth code element will be long and relay RHS will be picked up, while if the lever HK is in the middle position as shown, the tenth and twelfth code elements will be short and relays LHS and RHS will be deenergized.

If the signal stick relays LHS and RHS are deenergized, all signals governing traffic over switch W are caused to indicate stop, while if a signal stick relay is energized one of the signals may become clear to permit a train movement over the switch.

The key UK associated with the signal lever governs an element of the control code which may be used for any desired purpose, and as herein disclosed, it is used to provide "stick-non-stick" control of a signal. When key UK is closed, the thirteenth element of a control code will be long, and stick relay US (Fig. 8) will become energized. When US is energized, it removes LHS and RHS from control by track conditions at the station. When key UK is open, the thirteenth element of a control code is short and relay US becomes deenergized and places relays LHS and RHS under the control of track relay ITR. When US is energized, the signal will clear automatically following the passage of a train while if US is deenergized, the signal will remain at stop until cleared by the transmission of the new control code.

At the completion of the operation of the switch and signal in response to a control code, the station coding unit is set into operation to transmit an indication code to the office. Each indication code includes a first group of elements which selects the particular station storage unit initiating the code, and simultaneously operates the office coding unit to select the corresponding office storage unit. The station coding unit then transmits a second group of code elements to actuate the selected office storage unit to control each of the indication lamps of the corresponding panel in accordance with the condition of the corresponding station device. Thus when the approach section is occupied, the ninth element of an indication code will be a long element causing lamp 9E to be lighted; if all signals governing traffic over the switch are at stop, the tenth element will be long to light lamp 10E; if the track section containing the switch is occupied, the eleventh element will be long to light lamp 11E; and if the left-hand or the right-hand signal is clear, the twelfth or fourteenth element will be long to light lamp 12E or lamp 14E, respectively. If the switch is normal, or is reversed the thirteenth or fifteenth element will be long to light lamp 13E or 15E, respectively, while if the switch is open the thirteenth and fifteenth elements will both be short so that lamp 13E or 15E will become extinguished.

If the control levers of a panel are not moved, pressing a starting key will cause a control code to be transmitted to the associated station to initiate a return indication from such station, thus enabling the operator to "recall" the station indications without changing the condition of any station device. An indication code is transmitted not only at the completion of operations initiated at the office but is also transmitted automatically whenever a train enters or leaves one of the track sections 1T or 2T, or when a change in signal condition occurs automatically, or when the switch points become displaced from their proper positions. When a control code is transmitted or an indication code received, the switch and signal lights are extinguished when the panel selection is made, and remain out until a new set up is registered by the lighting of the proper lamps at the end of an indication code.

In practice, my system usually employs one office coding unit at the office and an office storage unit for each control panel or unit group of station apparatus, and in the field, one station coding unit at each location of controlled apparatus and one station storage unit for each unit group of apparatus at such location.

The selection of a storage unit at the office or station is accomplished by the energization of three relays in a fixed sequence by the three long station selecting elements of the code, these relays comprising a first selector F, a group selector G, and a station selector S. At the office, these selectors are identified by prefixes designating the code elements which operate them. For example, relay 2F is operated by the second code element, relay 23G by the third, provided 2F has been operated, and relay 234S by the fourth, provided 23G has been operated. It follows that the prefix numbers of the S relays indicate the available combinations of station selecting code elements. At the office, my system employs a maximum of five F relays, fifteen G relays, and thirty-five S relays as shown in Figs. 2, 3 and 4.

Each station coding unit is provided with one F relay and one G relay and may control from one to five station storage units, depending upon the code numbers selected; for example, it may control five storage units when the code numbers are 234 to 238, inclusive, in which case, the corresponding selector relays at the office are 234S to 238S, inclusive, as shown in Fig. 2. It is clear from the arrangement of code combinations illustrated in Figs. 2 to 4 that two other station coding units may control four station storage units each, three others may control three storage units each, four may control two storage units each, and the remaining five may each control but one storage unit. It is also to be noted that one combination (234 for example) may be employed at one location and the remaining combinations of the group having the same first and second selecting elements (235 to 238) may be employed at other locations.

Furthermore, the station units are not restricted to the control of the particular combination of apparatus that I have described but may be employed to control any combination of apparatus within their capacity. For example, a station unit may be used to control two signals (in each case with two track sections) or a station unit may be used to indicate four track sections. When several switches or signals are to be controlled at a single location usually but one station coding unit is employed to which are connected a plurality of station storage units. Thus, for example, a station including two single switches and two crossovers with associated signals would utilize three panels of the control machine as illustrated in Fig. 11, and at the station would employ one station coding unit and three station storage units.

In Fig. 10, I have shown a typical line circuit as employed for connecting the office and station coding units of my system. The line circuit includes a line battery 80 at the office, from one terminal of which the line circuit leads through a resistance OR5 to line relay OR of the office coding unit O, back contact b of office transmitter relay OT to line wire Y and through a closed contact of disconnecting switch 1M of the first station coding unit 1S, winding of line relay R, back contact d of master relay M, through the closed contacts of disconnecting switch 1M and of sectionalizing switch 1N to line wire Y¹ leading to the next station. In this manner, the line circuit is carried in series through each station in turn to the last station. At the last station the line circuit passes from wire Y¹ through the coding unit 2S to the return wire Z leading to the opposite terminal of the line battery 80 at the office. The line circuit is normally closed, and the repeated operation of contact b of relay OT at the office will therefore interrupt the line circuit and actuate all station line relays R in unison with the office line relay OR and will transmit the elements of a control code from the office to each station.

When an indication code is initiated at a station, as for example, station 1S, master relay M at the station becomes energized, and its front contact d is closed to disconnect the portion of the line circuit leading to the more remote stations and to complete the line circuit from the office over wire Y, relay R, front contact d of relay M, back contacts b of relays E and T, resistor 1R5, and line wire Z, back to the office. Resistor 1R5 is preferably of such value as to compensate for the resistance of the disconnected portion of the line circuit leading to the more remote stations. Contact b of relay T at the station then functions to transmit a code to actuate the line relay OR at the office in unison with relay R at station 1S, and at the completion of the code, relay M becomes deenergized to restore the line circuit to normal. While an indication code is being transmitted from station 1S it is evident that relay R of coding unit 2S is steadily deenergized. This prevents transmission of code from station 2S while station 1S is transmitting, as will be made clear as the circuits are described in detail. The more remote station 2S may transmit code to the office in the same manner, but when station 2S is transmitting, it is evident that relay R at the intermediate station 1S will be operated as well as relay OR at the office and relay R at station 2S. The coding apparatus controlled by relay R at station 1S, however, is, in this case prevented from operating by means which will be described in connection with the detailed circuits.

The manual switches 1M and 2M permit the corresponding coding units to be disconnected from service. When either of these switches is moved to the upper position, a resistor, such as 1R6 or 2R6 becomes connected in the line circuit in place of the line relay of the corresponding coding unit which may then be removed without interfering with the operation of other stations. The sectionalizing switch 1N permits a portion of the line to be disconnected in case of a failure of the line at a point remote from the office. When switch 1N is moved to its upper position, the wire at station 1S normally leading to wire Y¹ is disconnected therefrom, and is connected, through resistor 1R5, to wire Z to the office, thus permitting the operation of station 1S in case the line becomes interrupted between 1S and 2S.

It will be understood, of course, that in actual practice, a system embodying my invention may comprise a large number of stations which are similar to station 1S of Fig. 10 and which may be connected in the line circuit at the point indicated by broken lines in wires Y¹ and Z.

Before proceeding to a discussion of the functions of the various relays, it should be pointed out, that in order to simplify the disclosure, I have, in many instances, illustrated relay contacts on the drawings at points remote from the relay winding which controls them. In every such case I have applied to the contact the reference character used to designate the relay which operates it, and in addition I have applied a separate reference character to each contact. For the purpose of designating relay contacts I have employed lower case letters. Thus the contact immediately below the resistor OR3 in Fig. 1 bears the designation OL 2 to show that it is a contact of relay OL2 illustrated near the center of the upper half of Fig. 1, and this contact also carries the reference character f which distinguishes this contact from all others controlled by the same relay. I may therefore refer to this contact as "contact f of relay OL2."

Referring now to Figs. 1 and 6, it will be noted that the office equipment includes a number of relays similar in function to relays at the station. To these relays I have applied similar reference characters, distinguishing the office relays by the prefix O.

Relays which are associated with particular code elements are designated by number; for example, relays O1 to O8, inclusive, (Fig. 1) are a chain of counting relays operated consecutively during a first group of code elements 1 to 8, inclusive, to control selector relays over circuits including back contacts of a chain repeat relay OCR which becomes energized at the beginning of the ninth code element. The chain relays operate again in sequence during a second group of code elements 9 to 16 to control register relays O9 to O16, inclusive, over circuits including front contacts of OCR.

The transmitter relay OT controls relay OR, as already described, and relay OR controls the counting chain so as to pick up an odd-numbered chain relay (O1, O3, etc.) each time relay OR becomes deenergized, and to pick up an even numbered chain relay (O2, O4, etc.) each time OR becomes energized. The chain relays, in turn, control relay OT to cause its repeated operation to produce consecutive code elements. These relays are all comparatively quick acting and their aggregate time period determines the length of the short elements of the code.

Associated with line relay OR is a group of slow release relays designated by the prefix OL. Relays OL1 and OL2 are employed to register respectively the odd-numbered and even-numbered long impulses of the code when the office is receiving. Each of these relays is preferably adjusted to release in a period about three times as great as that of a short code element. Relay OLP is a repeater of relays OL1 and OL2, and is released following the release of either of these relays, and its function is to terminate the long impulse in a transmitted code. Relay OLB and its repeater OLBP are "bridging" relays which are adjusted so that OLBP will remain picked up for a period greater than a long period of a code and are for the purpose of maintaining local holding circuits during code transmission and to open such circuits at the end of a code, or in case the line relay becomes steadily deenergized. Relay OM is a master relay which is energized when the office is transmitting, and deenergized when the office is receiving, and this relay selects between transmitting and receiving operations. Relay OE is picked up to register the first element of a code. Its repeater relay MEP is picked up to register the first element of a control code only. Relays OFP, OGP and OSP are holding relays for controlling the selector relays of Figs. 2, 3 and 4.

Referring now to Fig. 5, relays 9K to 15K, inclusive, are indication relays each operated by the code element of corresponding number, those of each office storage unit being controlled by a delivery relay such as 234D having a prefix corresponding to the code number of the unit. Each office storage unit also has a starting relay such as 234, designated by the code number of the unit, and each starting relay has a contact c for initiating the code corresponding to its number. The contacts c of all the starting relays are grouped together in the upper portions of Figs. 2, 3 and 4.

Referring now to the station equipment shown on Figs. 6 and 7, those relays which have the same designation as the corresponding relays of Fig. 1, except for the omission of the prefix O, function in a manner similar to the corresponding office relays with the exception that relay E is operated during the first long impulse of a control code, but not during an indication code. In Fig. 6, relays 9 to 13 are operated on both indication and control codes, while at the office the relays O9 to O16 operate on indication codes but not on control codes. Relay D is a delivery relay which governs the switch and signal stick relays at the end of a control code. Relays 9V, 10V, 11V and 13V (Fig. 7) are relays which register individual elements of a transmitted indication code to control starting circuits for the station transmitting equipment, and are controlled by relay VC. Relays 9TS and 11TS (Fig. 7) are storing relays for controlling the transmission of track indications, and are so named because they function to store indications when the line is not available for transmission. Relay ST is a starting relay for the station storing unit, and relay MSP is a repeater of relays M and S at the station. Relay CO is a thermal relay which functions to disconnect the coding unit from the line in the event that it functions repeatedly due to inability to complete a code.

The relay circuits include a number of asymmetric units designated O1r to O12r, inclusive, in Fig. 1, and 1r to 12r, inclusive, in Fig. 6. Each of these units is so connected in circuit that it provides a high resistance to the flow of current from the power source, and at the same time provides a low resistance closed circuit including the winding of one or more relays, through which the relay current may continue to flow after the power source is disconnected, so that the inductive energy stored in the relays is discharged gradually, with the result that no sparking occurs when the controlling contacts are opened. Certain of the relays are shown conventionally on the drawings as slow release relays but each of these relays is timed to release slowly by reason of the short circuit through the relay winding and asymmetric unit in lieu of the short circuited winding or ferrule customarily employed.

The relays employed in the coding apparatus of Figs. 1 to 7 may be of any suitable type of quick acting relay such for example as the relay illustrated in my patent No. 1,815,947, issued July 28, 1931, while those relays shown in the circuits of Figs. 8 and 9 are preferably of the well known types customarily employed in railway signaling circuits.

It is to be understood that a local source or sources of direct current are provided at each location, but for simplicity I have illustrated the circuits diagrammatically, and in lieu of showing the local sources and the wires leading thereto in detail, I have shown only the terminals of the sources which I have designated in each case by the reference characters B and C.

I will now trace, in step-by-step fashion, the operation of the office equipment in receiving an indication code from a field station, assuming that the station selection number of the code received is 234, and that the apparatus at the station at which the code originated is in the condition shown in Fig. 9. In this code, therefore, the first element will be short, the second, third and fourth will be long, and the fifth to eighth, inclusive, will be short. Since the track sections 2T and 1T are unoccupied, elements 9 and 11 will be short. Since the switch is normal, element 13 will be long and element 15 will be short. Since the signals are at stop, element 10 will be long and elements 12 and 14 short.

When the line circuit opens during the first element of the received code, line relay OR becomes deenergized to close a circuit from terminal B, through back contact b of relay OR, back contact d of relay OLBP, back contact f of relay OL2, back contact b of relay OLBP, and relay OL1 to terminal C. Relay OL1 picks up and completes a circuit from terminal B, through back contact b of OR, contact a of relay OL1, and winding of relay OL2 to terminal C, and completes a second circuit from terminal B, through back contact b of OR, back contact e of OLBP, contact f of OL1, and relay O1 to terminal C, to pick up relays OL2 and O1. The energization of relay OL2 completes a circuit from terminal B, through contacts c of relays OL1 and OL2, and relay OLP to terminal C, and also completes a circuit through the same contacts and relay OLB to terminal C, to pick up relays OLP and OLB. When relay OLB picks up, it completes a circuit from terminal B through contact c of relay OLB and relay OLBP to terminal C. Relay OLBP therefore picks up and closes, at its front contact a, local holding circuits for various selector and register relays to be described later, and at its front contact c prepares circuits for the even-numbered counting relays. The operation of contact e of relay OLBP opens the pick-up circuit of relay O1 and establishes a holding circuit for relay O1 from terminal B over back contact b of relay OR, front contact e of relay OLBP, resistor OR2, back contact b of relay O2, front contact a and the winding of relay O1 to terminal C. When relay OL2 picks up, its contact f transfers OL1 from the back contact to the open front contact of relay OR, but relay OL1 remains picked up during the short first code element due to the continued flow of current through its winding and asymmetric unit O9r. Relay OL1 remains connected to the front contact of OR for the remainder of the code over a circuit including the front contact b of relay OLBP and is released during each odd-numbered long code element and is again energized during the succeeding even-numbered code element. Relay OL2 is connected to the back contact of relay OR for the remainder of the code over a circuit including either its own front contact a or the front contact a of relay OL1, and becomes released during each even-numbered long code element and is again energized during the succeeding odd-numbered code element. Relay OLB remains picked up during the periods when OL1 or OL2 are released due to the continued flow of current through its winding and asymmetric unit O11r so that OLB and consequently OLBP remain energized for the duration of the code. When relay OR became deenergized, another circuit was closed over its back contact b, back contact b of relay OLB, contact d of relay OM, wire 150 and lamp 50E to terminal C to light the lamp 50E. When relay OLB became energized its contact b supplied energy directly from terminal B to lamp 50E. This lamp remains lighted for the duration of an indication code and also is lighted if the line circuit is steadily opened. Contacts b of relays OL1 and OL2 open the pick-up circuit of OM, thereby preventing the energization of OM, while a code is being received.

When OR picks up at the beginning of the second code element, a circuit is closed from terminal B, through front contact b of relay OR, front contact c of relay OLBP, resistor OR3, back contact a of relay O8, front contact b of relay O1, back contact b of relay OSP, and relay O2 to terminal C, and when O2 picks up, it establishes a holding circuit comprising a branch from resistor OR3, through back contact b of relay O3, front contact a and winding of relay O2 to terminal C. When the back contact of relay OR opened, relay O1 became disconnected from its source of energy but remained picked up due to the continued flow of current from its righthand terminal and terminal C, through unit O2r, back contact b of relay O2, and front contact a and winding of relay O1 back to terminal C. This circuit is opened at back contact b of relay O2 to release O1 quickly when O2 picks up.

When OR is released at the beginning of the third code element, a circuit is closed from terminal B, through back contact b of OR, front contact e of OLBP, resistor OR2, back contact a of O1, front contact b of O2, and winding of relay O3 to terminal C; and when O3 picks up, it establishes a holding circuit from resistor OR2 through back contact b of relay O4, front contact a and winding of O3 to terminal C. When the front contact b of relay OR opened, terminal B was disconnected from O2, which remained picked up however, due to the flow of current from its terminal C through unit O3r, back contact b of O3, front contact a and winding of relay O2, back to terminal C, this circuit being opened at contact b of relay O3 to release O2 quickly when O3 picks up.

As the code continues, OR is operated repeatedly and the remaining chain relays are operated consecutively in a manner similar to that already described, each chain relay being energized over a pick-up circuit including a front contact of the next preceding chain relay and the back contact of the second preceding relay and the resistor. Each chain relay is provided with a stick circuit including the resistor and the back contact of the next succeeding relay and also is provided with a low resistance holding circuit including an asymmetric unit and the back contact of the next succeeding relay. The pick-up circuit of relay O7 in addition includes back contact f, and that of O8 includes back contact c of relay OCR which contacts remain closed during the first cycle of operation of the chain.

Considering now the selecting apparatus operated during the first cycle of operation of the chain relays, it is to be noted that when O1 is energized, a circuit is closed from terminal B, through front contact c of relay O1, back contact c of OSP, and winding of relay OE to terminal C, to pick up relay OE. This relay establishes a holding circuit for itself from terminal B, through front contact a of relay OLBP, resistor OR1, back contacts a of relays OSP, OGP and OFP, and front contact a and winding of OE to terminal C. Relay OE, when energized, closes its contacts c to g, inclusive, to connect wires 135 to 139, inclusive, to contacts d of relays O2 to O6, inclusive, to prepare selecting circuits so that a selected one of the F relays may be picked up during a succeeding code element.

Since the second code element is long, relay OL2 which is then deenergized becomes released and completes a circuit from terminal B, through front contact a of relay OLBP, back contact g of OM, back contact e of OL2, back contact b of OCR, front contact d of O2 front contact c of OE, wire 135, and winding of relay 2F to terminal C. Relay 2F therefore becomes energized, and completes a branch for the circuit just traced from wire 135, through front contact a of relay 2F, wire 142, and winding of relay OFP to terminal C. Relay OFP picks up and establishes a holding circuit for itself and for relay 2F at contact a of relay OFP. The picking up of relay OFP also releases relay OE. The release of OE opens the pick-up circuits for relays 2F to 6F, inclusive, at its contacts c to g, inclusive, so that it is not possible to pick up an F relay on any succeeding long code element. When 2F picks up, it closes its contacts k, i, g, e and c to connect relays 23G to 27G over wires 143 to 147, inclusive, to contacts d of relays O3 to O7, inclusive. Relays 3F to 6F are each provided with contacts for controlling a group of G relays as is clear from the drawings, and the G relays of the group controlled by the energized F relay are the only selector relays that can be energized by the next succeeding long code element.

When relay OR is released at the beginning of the third code element, OL1 is deenergized, and since this is a long element OL1 is released to complete a circuit from terminal B, through front contact a of relay OLBP, back contact g of relay OM, back contact e of relay OL1, back contact d of relay OCR, contact d of O3, wire 143, contact k of 2F, and winding of 23G to terminal C. When 23G picks up it completes a branch for the circuit just traced from wire 143, through front contact a or relay 23G, wire 141, and winding of relay OGP to terminal C. The latter relay picks up and establishes, at its front contact a, a holding circuit for itself and for relay 23G and, by opening its back contact a releases OFP and 2F, to open the pick-up circuits of each G relay of the group. It follows that when any G relay is picked up, no other G relay can be energized by a succeeding code element. Relay 23G when energized, also closes its contacts k, i, g, e and c to connect relays 234S to 238S, over wires 144 to 148, inclusive, to contacts d of relays O4 to O8, inclusive. Each G relay is provided with one or more contacts for controlling S relays, as is clear from the drawings, and the S relays of the group controlled by the energized G relay are the only selector relays that can be energized by the next succeeding long code element.

Relay OR picked up at the beginning of the fourth code element, and since this element is long, relay OL2 releases to close its back contact e. A circuit is then completed from terminal B, through front contact a of OLBP, back contact g of OM, back contact e of OL2, back contact b of OCR, front contact d of O4, wire 144, contact k of 23G and winding of 234S to terminal C. Relay 234S therefore picks up, and completes the station selection necessary to identify an individual office panel corresponding to the station of origin of the indication code received. The office panel illustrated on Fig. 5 is the panel selected by this code and when relay 234S becomes energized, one result is to open at back contact e of the relay, the holding circuits for any of the indication relays K associated with the switch or signal levers for this panel which may be energized. As shown in the drawings, relays 10K and 13K are energized to light the normal switch lamp 13E and the stop signal lamp 16E, and these lamps are, of course, extinguished when 234S picks up. Another result of the energization of 234S is to complete a branch for the circuit previously traced for 234S, from contact k of 23G, through front contact a of 234S, wire 149, and winding of OSP (Fig. 1) to terminal C. Relay OSP therefore picks up and completes, at its front contact a, holding circuits for itself and for 234S. The holding circuit for OSP passes from terminal B, through front contact a of OLBP, resistor OR1, front contact a of OSP and winding of OSP to terminal C. The holding circuit for 234S passes from terminal B, through front contact a of OLBP, resistor OR1, front contact a of OSP, wire 149, front contact a of 234S and winding of 234S to terminal C.

Furthermore, the energization of OSP opens the back contact a of this relay, thereby opening the circuits previously traced for OGP and 23G, and hence opening the pick-up circuits for all S relays of the group 234S to 238S, inclusive. It follows that only one S relay can be picked up in a given code but that any one of the thirty-five S relays shown in Figs. 2, 3 and 4 may be picked up by distinctive combinations of three long and four short code elements.

In the particular code described, no selecting operations are performed during the fifth to eighth code elements, inclusive. The chain relays have been rendertd available for operation through a second cycle by the closing of contact f of relay OSP, their repeated operation thus being made dependent upon correct operation during the first cycle.

When OR becomes deenergized at the beginning of the ninth code element, a pick-up circuit is established for O1 which includes contact f of OSP and also the front contact of the next preceding relay O8 and back contact of the second preceding relay O7. When O1 picks up, it opens at its back contact b the holding circuit for the next preceding relay O8.

When OSP picked up, it opened at back contact b the pick-up circuit previously traced for relay O2, but it will be seen from Fig. 1, that front contact e of relay OCR is connected in parallel with contact b of OSP, so the chain is available for the second cycle of operation if OCR is picked up. This is accomplished by a circuit from terminal B, through front contacts c of relays O1 and OSP, front contact d of relay O1, and winding of relay OCR to terminal C. Relay OCR when picked up, establishes a holding circuit for itself over its own front contact a and front contact a of OLBP, and opens, at its contacts b and d the selecting circuits leading to the contacts d of the chain relays O2—O8 and substitutes therefor the series of contacts e of relays O1 to O7, inclusive, leading to the register relays O9 to O15, inclusive. Relay OCR, at contact c opens the pick-up circuit for O8 and prepares a pick-up circuit for O16. Relay O16 will therefore be operated on the sixteenth element of the code in place of O8, so that the closed chain of the counting relays is broken when sixteen elements are received and it is thus impossible to pick up O1 a third time even though OR continues to operate.

When OR picks up at the beginning of the tenth code element, the chain relay O2 is energized over a pick-up circuit similar to that previously described for this relay except that front contact e of OCR is substituted for back contact b of OSP, as described above. Since the tenth element is long, OL2 releases, thereby closing a selecting circuit from terminal B, over front contact a of OLBP, back contact g of OM, back contact e of OL2, front contact b of OCR, front contact e of O2, and winding of register relay O10 to terminal C. The energization of relay O10 completes a holding circuit for itself from terminal B, through front contact e of OSP, back contact c of O16, front contact a of O10, and winding of O10 to terminal C.

During the eleventh and twelfth code elements, chain relays O3 and O4 are energized in succession, but since these elements are short, relays OL1 and OL2 do not release, and the corresponding register relays O11 and O12 remain deenergized.

When the thirteenth element is received, chain relay O5 is energized, and since this element is long, OL1 releases, and a circuit is closed for register relay O13 from terminal B over front contact a of OLBP, back contact g of OM, back contact e of OL1, front contact d of OCR, front contact e of O5, and winding of register relay O13 to terminal C. Relay O13 therefore picks up and completes a holding circuit for itself over its own front contact a, similar to the holding circuit previously described in connection with relay O10.

During the fourteenth and fifteenth code elements, chain relays O6 and O7 are operated, but since these elements are short, the corresponding register relays O14 and O15 remain deenergized.

When the line becomes steadily closed at the end of the fifteenth code element, thus producing a sixteenth code element, OR picks up and closes the chain circuit as already described to pick up O16, which establishes a holding circuit for itself from terminal B, through contact d of OSP, front contact a of relay O16 and winding O16 to terminal C. Relay O16, at contact c transfers the holding circuits for the registere relays O9 to O15, inclusive, from contact e of OSP directly to terminal B so that the register relays will not release until after O16 releases.

Referring now to Fig. 5, when relay O16 becomes energized, it connects the bus wire 118 to terminal B over front contact b of relay O16. When this happens the delivery relay D is energized at the panel which has its station selecting relay S picked up. Under the conditions now being described, the delivery relay 234D is picked up over front contact c of 234S, and relay 234D is subsequently stuck up over its own front contact a and front contact b of relay O16. It will be remembered that the office storage unit includes an indication relay K for each of the register relays O9 to O15, inclusive, and when the delivery relay 234D becomes energized the indication relays K are connected with front contacts c of the corresponding register relays. When relay 234D picks up, therefore, a circuit is closed from terminal B, through front contact c of O10, bus wire 110, front contact c of 234D and winding of relay 10K to terminal C. Another circuit is closed from terminal B, through front contact c of O13, bus wire 113, contact f of 234D, and winding of relay 13K to terminal C. It should be noted that when relay 234D is released at the end of the code, as will be explained hereinafter, the energized indication relays 10K and 13K will remain energized by virtue of holding circuits including their own front contacts a and back contact e of 234S, until the next code is sent from or received at the corresponding office storage unit.

Each indication relay, when energized, completes a circuit for a corresponding lamp on a panel of the office storage unit. Since relays 10K and 13K are now energized, indication lamps 10E and 13E will be lighted to inform the operator that the switch is normal and that the signals are at stop at the station corresponding to this particular office storage unit. The circuits for the indication lamps will be obvious from the drawings, lamp 13E being energized over front contact c of 13K, and lamp 10E being energized over front contact c of 10K.

If the ninth element of the indication code being received is long, as is the case when the code originates at a station where the approach track section 2T is occupied, relay O9 is picked up during such ninth element and relay 9K becomes energized during the sixteenth element of the code to light lamp 9E, thereby informing the operator of the occupied condition of the approach track section. Similarly, when the detector track section 1T is occupied, the eleventh element of the resulting indication code is long, and when this code is received at the office, register relay O11 is picked up, and on the sixteenth element, indication relay 11K is energized to light lamp 11E and to inform the operator of the condition of the detector track section. Furthermore, when the switch is reversed, the fifteenth element of the indication code is long, and relay 15K is energized to light lamp 15E. If the twelfth or fourteenth element of the code is long to correspond to a clear condition of a westbound or an eastbound signal, indication relay 12K or indication relay 14K is energized to light the appropriate signal indication lamp 12E or 14E.

A graphic recorder is provided to record the passage of trains through the controlled territory. This recorder, as here shown, comprises a chart driven slowly by clockwork and having a manually actuated recording pen for each track section whose condition is to be recorded. Each pen traces a continuous line on the chart which line is displaced laterally when the pen magnet is energized. Two of the pen magnets are indicated in Fig. 5, magnet 2P for recording the condition of the approach section 2T, and magnet 1P for recording the condition of the track section 1T. Magnet 2P is energized by a circuit from terminal B over front contact a of relay 9K, and magnet 2P to terminal C. Magnet 1P is energized by a similar circuit including front contact a of relay 11K.

The holding circuits for 9K and 11K are so arranged that they do not include back contact e of relay 234S, so that these relays do not release when 234S picks up, but are released when 234D picks up provided O9 or O11, respectively, are deenergized.

The purpose of this arrangement is to insure that the pen magnets will be operated only when a change in track condition occurs; the relays controlling the lever lights 10E and 12E to 15E are however, controlled by a selector relay 234S, so that these relays, if energized, become released when an indication code is received as soon as the panel selection is made. This provides a brief interval during the reception of each indication code when all lever lights are out, thereby informing the operator that an indication code is being received. Relay 234S is also picked up during the transmission of each control code and it follows that the lever lights are out during the interval between the transmission of a control code and the reception of an indication code, thereby informing the operator that the code transmitting apparatus has responded to his operation of the starting key, but that the operations to be performed by the control code have not been completed and indicated.

The indication apparatus also includes a single stroke bell X, adapted to ring when a code is received to indicate that an approach section or track section has become occupied. If, for example, 9K is deenergized and a code is received in which O9 becomes energized, a circuit (Fig. 5) is closed from terminal B, through front contact b of relay O9, bus wire 119, contact i of 234D, back contact b of 9K, wire 98, and bell X to terminal C. This circuit is quickly opened by the pick-up of 9K which is energized at the same time, but bell X is of low resistance and operates more rapidly than 9K, and is thus supplied with a brief impulse for single stroke operation. If 11K is deenergized and a code is received in which O11 is picked up, the bell X is energized over a circuit including bus wire 120, back contact b of relay 11K, and the closed contact of key XK. This key may be included in any of the bell circuits, and provides means by which the operator can prevent the bell X from ringing except when he desires to have his attention called to the entrance of a train into a particular track section.

As already explained, the switch and signal elements of a code may be employed to indicate two additional track sections. When this is done relays 10K and 13K are employed as track indication relays and are controlled like 9K and 11K, and the bell circuits for 10K and 13K are connected to bus wires 117 and 116.

When OR becomes steadily energized at the end of the code, OL2 is released. This releases OLP and OLB, and the release of the latter relay extinguishes lamp 5OE and releases OLBP, which opens the chain circuits and also releases OCR, 234S and OSP, and deenergizes OL1. The equipment is then in condition to start the reception of a new indication code. When OL1 releases, its back contact b becomes closed to prepare the pick-up circuit for OM, and the equipment is then in condition to start the transmission of a control code. When OSP releases, O16 is deenergized and when O16 releases, relay 234D releases to establish the holding circuits for the indication relays and the register relays O9 to O15 are deenergized and become released, and restore the apparatus to its normal condition.

One novel feature of my invention is the use of two slow release relays OL1 and OL2, connected respectively to the front and back contacts of the line relay for registering respectively the odd-numbered and even-numbered elements of the code so as to employ both the closed and open periods of the code as code elements. Another advantage is that there are no idle relays in the chain; these relays are all alike in function and may all have the same number of contacts. This results in uniform operation and thereby permits faster operation.

Another novel feature of my invention resides in the counting chain which is particularly adapted to fast and reliable operation. In order to cause the relays to pick up quickly, I employ resistors OR2 and OR3 in the pick-up circuits and employ relays of lower resistance than would otherwise be permissible. By this means, the time constant of the relay circuit is reduced. The voltage drop across the resistor is zero when the relay circuit is closed, and is small when the relay picks up but it increases in proportion to the current, and limits the inductive energy stored in the relay. As a result, there is less energy stored in the relay for the same maximum current than would be the case if the relay were connected directly across the energy source, and hence less energy to be interrupted when the circuit is opened.

Another important feature of my invention is the method of breaking the chain relay circuits without producing sparking at the control contacts. The asymmetric units O2r and O3r provide a discharge path for the energy for each chain relay when terminal B is disconnected from the relay by opening the contact of relay OR. As is well known, when the energizing source is disconnected from an inductive circuit, the discharge current in the circuit decreases, at first rapidly and then more slowly, and since the inductive energy in a circuit is proportional to the square of the current, it follows that in a short time the remaining energy will be but a small fraction of its initial value and will be too small to produce a spark if the circuit is then opened. I have found that a relay circuit can be opened without sparking provided the source is first disconnected to permit a portion of the stored energy to discharge; and that the circuit of a chain relay can be opened sparklessly by the back contact of the succeeding relay as soon as the next relay can be picked up, because the energy in the relay at the time is not enough to produce a spark even though the current is considerably above the release value of the relay. By this means each relay of the chain is released quickly and positively, so that the chain is adapted to operate reliably at a comparatively high speed.

A further advantage of the chain circuit which I employ resides in the use of circuits for the control of the chain relays which are self-checking so as to insure that no two even-numbered relays and that no two odd-numbered relays can be energized at the same time, thereby eliminating the necessity for checks in the other circuits controlled by the chain relays. As illustrated, the chain relays each have six contacts of which but two are used for chain control so that the chain is equivalent in function to four rotary switches or commutators.

Another important feature of my invention is in the provision of self-checking means whereby the chain relays may be operated repeatedly in a closed chain, and their operation definitely terminated after any desired number of operations.

Another novel feature of my invention is contained in the method of code selection comprising three overlapping groups of code elements so arranged that a selections by any element of a group renders the next succeeding element available as an element of the next succeeding group. For example, during the first code element, connections are made which render the next five code elements available for the selection of an F relay. An overlapping group of five code elements is provided for the selection of a G relay, which is rendered available when the selection of an F relay is made, and this group is in turn overlapped by a group of five code elements provided for the selection of an S relay, which is rendered available when the selection of a G relay is made. Thus the fourth element is initially available for the selection of 4F only, but if 2F or 3F is selected by a preceding element, the fourth element becomes available for the selection of either 24G or 34G depending upon which F relay is selected. If 2F is selected, 23G may be selected during the third code element, and if this occurs, the fourth element becomes available for the selection of 234S only.

I will now describe the transmission of a control code, assuming that the operator momentarily closes the starting key SK and that the control levers are in the positions shown in Fig. 5. The first element of this control code will be long, the remaining elements of the first group will be the same as in the indication code described. Since the switch lever WK is normal, the ninth element will be long and the eleventh element short. Since the signal lever HK is in the stop position and the key UK is open, elements 10, 12 and 13 are short.

When key SK is closed, a circuit is completed from terminal B, over starting key SK, starting relay 234, but wire 97, and knock-down key CK, to terminal C. Relay 234 then picks up and establishes a holding circuit for itself from terminal B, over back contact d of relay 234S, front contact a of relay 234, and winding of relay 234 to terminal C, so that 234 remains energized until relay 234S picks up, during a control code. When relay 234S picks up during an indication code, relay OM is not energized and the holding circuit for 234 is maintained from terminal B, over back contact h of relay OM, but wire 108, front contact d of 234S, front contact a of 234 and winding of 234 to terminal C, so that 234 is not released except by the transmission of a control code or by the operation of key CK. Any number of control codes may therefore be stored by operating the appropriate starting keys, and the corresponding starting relays will be held up until the proper codes have been delivered or until key CK is operated. The latter key is provided so that the operator can cancel the control code before transmission if he so desires.

Each of the thirty-five starting relays, 234 * * * 678, is provided with a contact c, as shown in Figs. 2, 3 and 4. When starting relay 234 is picked up, a starting circuit is closed from terminal B, over front contact c of 234, back contacts j of 23G and 2F, wire 106, back contact a of relay MEP, back contacts b of relays OL1 and OL2, and winding of master relay OM to terminal C. A similar starting circuit is provided under the control of each of the other starting relays, as is clear from the drawings, so that when any starting relay is energized, a circuit is closed from terminal B over contact c of the starting relay, back contacts of G and F relays, one of the wires 106, 107, 126, 127 or 128, and a back contact of MEP to relay OM. When any starting relay is energized, therefore OM picks up and closes the pick-up circuit of transmitter relay OT, from terminal B, over back contact a of OLBP, back contacts c of chain relays O3, O5 and O7 in series, front contact e of OM, winding of relay OT, and resistor OR4 to terminal C. OT picks up and opens its back contact b to open the line circuit and creates the first code element.

When the line opens, relay OR releases, and as already described in connection with the indication code, operates relays OL1, OL2, O1, OLP, OLB, OLBP and OE. When OL1 picks up, terminal B is disconnected from OM, but OM remains closed due to the flow of current through its winding and asymmetric unit O1r until OLB picks up, when a holding circuit is closed from terminal B, over contacts a of OLB and OM, and winding of relay OM to terminal C, so that relay OM remains picked up for the duration of the code. When OE picks up, relay MEP is energized over a circuit from terminal B, over front contact c of OM, front contact b of OE, and winding of relay MEP to terminal C, and lamp 4OE is connected directly to terminals B and C over front contact c of OM to light lamp 4OE for the duration of a control code.

When MEP picks up, it opens its back contacts a to e, inclusive, disconnecting wires 106, 107, 126, 127 and 128 from the wire leading to relay OM, and closes its front contacts a to e, inclusive, to connect these wires to contacts c of relays O2 to O6, respectively, each of which is connected to one terminal or the other of relay OT, thereby preparing a series of circuits whereby relay OT is placed under the control of contacts c of all of the starting relays 234 * * * 678 as will be described hereinafter.

When OLBP picks up, the pick-up circuit of OT is opened but OT remains energized by reason of a holding circuit from terminal B, over back contact g of OSP, (Fig. 5) front contact f of O1, front contacts a of OLP and d of OL1 in multiple, wire 124, front contact a of OT, front contact e of OM, winding of relay OT, and resistor OR4 to terminal C. Relay OL1 is now deenergized and releases, and deenergizes relay OLP. When OLP releases, the source of energy is removed from OT but this relay remains energized for a short period due to the flow of current through its winding, resistor OR4 and asymmetric unit O8r, and then releases to close its back contact b to close the line circuit and start the second code element. Relay OT controls the timing of the short code elements, and in part, that of the long code elements, and is arranged to release somewhat slowly by means of the snubbing circuit through resistor OR4 and unit O8r, and to pick up somewhat slowly when energized by the circuit from terminal B over the back contacts c of the odd-numbered chain relays, because it is of relatively high resistance and its pick-up circuit includes resistor OR4.

At the beginning of the second code element, relay OR picks up and, just as in the case of an indication code, picks up O2 and releases O1. Relay O1 closes its back contact and supplies energy from terminal B, over back contacts c of the odd-numbered chain relays O1, O3, O5 and O7, and contact e of OM to the right-hand terminal of OT. Relay OT, however, does not pick up because terminal B is now also connected to its left-hand terminal over contact c of relay 234, back contacts j of relays 23G and 2F, wire 106, front contact a of MEP, front contact c of O2, front contact f of OM, and back contact c of OT to the left-hand terminal of OT. OT therefore remains deenergized to prolong the second code element. Relay OL2 is now deenergized, and when it releases, it deenergizes OLP. When OLP releases, a circuit is closed from terminal B, over contact g of relay OM, back contact a of OCR, back contact b of OLP, back contact e of OL2, back contact b of OCR, contact d of O2, contact c of OE, wire 135 to pick up 2F and OFP and to release OE as already described. When OE releases, MEP is released so that the circuits over its contacts and contacts c of relays O2 to O6 are no longer available to control OT. When 2F picked up, it opened at its back contact j the hold-down circuit for relay OT, disconnecting terminal B from its left-hand terminal so that OT can again pick up due to the energy supplied over the back contacts c of the odd-numbered chain relays to its right-hand terminal. When any F relay picks up, it disconnects the contacts c of the starting relays which control it, from one of the wires 106, 107, 126, 127, 128 and connects these contacts to different wires of the group 129 to 133, inclusive, which are connected over contacts c of relays O3 to O7, inclusive, to one terminal or the other of relay OT. The F relay contacts which function in this manner are designated by the reference characters j, h, f, d, and b. It is clear from the drawings that each starting relay is provided with a circuit for creating a long code element to pick up an F relay; that when one of said circuits is closed it causes an F relay to pick up, and that when this occurs the said circuits which otherwise would be adapted to create succeeding long code elements are disconnected and a different group of circuits is prepared for creating succeeding long code elements.

When relay OT picks up to initiate the third code element, a holding circuit for OT is established from terminal B, over front contact c of 234, back contact j of 23G, front contact j of 2F, wire 129, front contact c of relay O3, back contacts c of O5 and O7, contact e of OM, winding of relay OT and resistor OR4 to terminal C. When relay OT picked up, it released OR to operate the chain relays as already described, picking up O3 and releasing O2. When O3 picked up, it opened the pick-up circuit of OT, but this relay remains up, by reason of the holding circuit just described. Relay OL1 is now deenergized and at the conclusion of its holding time, it releases. This deenergizes, and after a time interval, releases OLP thereby completing a circuit from terminal B, over front contact a of OLBP, back contact a of OCR, back contact b of OLP, back contact e of OL1, back contact d of OCR, front contact d of O3, wire 143, front contact k of 2F, and winding of 23G to terminal C. Relay 23G therefore becomes energized to open its back contact j and break the holding circuit of OT. Relay OT then releases and terminates the third element of the code by restoring the line circuit through its back contact b.

When 23G picks up, OGP (Fig. 1) picks up and 2F (Fig. 2) and OFP (Fig. 1) are released, so that the circuits leading over front contacts of 2F to wires 129 to 133, inclusive, are no longer available to control OT. When any G relay picks up, it disconnects the contacts c of the starting relays which control it, from one of the wires of the group 129 to 133, inclusive, and connects each said contact to a different wire of the group 130 to 134, inclusive, which are connected over contacts c of relays O4 to O8, inclusive, to relay OT. The G relay contacts which function in this manner are designated by the reference characters j, h, f, d and b. It is clear, therefore, that a starting relay contact which has completed a circuit to create a long code element to pick up an F relay or a G relay will thereby restrict the control of the next succeeding code element to the contacts of those starting relays which control the same F or G relay.

When relay OT becomes deenergized to initiate the fourth code element, the hold-down circuit of relay OT is closed from terminal B, over contact c of relay 234, front contact j of 23G, wire 130, front contact c of O4, front contact f of OM, and back contact c of OT to the left-hand terminal of OT so that OT remains deenergized. Relays OL2 and OLP then release and complete a selecting circuit over the back contacts of these relays and over wire 144 to pick up 234S, which opens its back contact d to release starting relay 234. Relay 234 opens its contact c to permit OT to pick up to terminate the fourth element. When 234S is energized, OSP picks up and 23G and OGP are released, and relay 23G disconnects wires 131 to 134, inclusive, from the c contacts of relays 234 to 238, inclusive. It is clear that in the code described, each long selecting element is produced by the c contact of the relay 234, and it is immaterial whether contacts of other starting relays are closed or not, and that if the contacts of other starting relays are closed, each contact will cause the transmission of a complete code and these codes will be transmitted in sequence in a predetermined order.

When 234S picks up, it also opens its back contact e to release any of the switch or signal indication relays 10K, 12K, 13K, 14K or 15K of the office storage unit that are energized, thereby extinguishing the lever lights of the panel as already explained. During the remainder of the first group of code elements the operation of the system will be readily understood from the discussion above and that appearing in connection with the indication code. Contact f of OSP provides a pick-up circuit for O1 for the ninth element; and relay OCR picks up and its contact e provides a pick-up circuit for O2 for the tenth element. Since OM is energized during a control code, its back contact b is open and since back contact f of OCR is also open, no pick-up circuit is now available for relay O7 after the closing of the line during the fourteenth code element. It follows that in a control code, the operation of the chain is terminated with the second operation of relay O6 and that relay O16 is not operated. Since back contact a of OCR and back contact of OM are open, it follows that register relays O9 to O15 are not operated during a control code.

During the ninth code element, a holding circuit for OT is established from terminal B, over front contact f of 234S (Fig. 5) contact n of switch lever WK, bus wire 101, front contact g of OSP, contact f of O1, contacts d and a of OL1 and OLP in multiple, wire 124, contact a of OT, contact e of OM, winding of relay OT, and resistor OR4 to terminal C. This circuit holds OT energized to prolong the ninth or normal switch element until OL1 and OLP release, as already described in connection with the first element. This is the only long element in the second group but it will be noted that contacts f, b and e of relay 234S (Fig. 5) connect the terminal B through the contacts of WK, HK and UK, and the bus wires 101 to 105, inclusive, to the contacts f of relays O1 to O5, inclusive, thence through circuits controlled by relays OLP and OCR, over wires 124 and 125 to relay OT, so that each of the lever contacts is adapted to produce a long code element when the contact is closed.

When OT is released to terminate the thirteenth code element, OR becomes energized and picks up O6, closing a circuit from terminal B, over contact f of O6, (Fig. 5) contact h of OCR, wire 125, contact f of OM and contact c of OT to the left-hand terminal of OT to insure that OT remains down until OM is released to break the pick-up circuit of OT. It follows that OR remains steadily energized and relays OL2, OLP, OLB, OLBP, 234S and OSP release, as already described. Relay OLBP releases relays O6 and OL1. When relay OLB releases, OM is deenergized and releases slightly before OLBP releases, and disconnects terminal B from relay OT before O6 releases. When OM releases, lamp 40E is extinguished. The equipment is in condition to receive a new code as soon as the chain relay O6 is released, and is in condition to transmit a new code as soon as OL1 is released.

An important feature of my transmitting apparatus resides in the use of a single relay OT for creating a series of code elements, which relay is provided with holding circuits for prolonging either its period of energization or its period of deenergization, and in the control of these holding circuits by a pair of slow release relays which are in turn controlled by relay OT through the medium of the line circuit. Another feature is the means for controlling both the pick up and release time of relay OT to create the short code elements and in providing means for controlling this relay, not only by the line circuit, but also by a line relay and chain relays which are similar to those at the various receiving stations. This provides a margin in operation and insures that the chain relays at each station will be enabled to operate correctly before the transmitter terminates a short code element, and automatically adjusts the transmitting speed to the pick-up rate of the line relays as determined by the inductance of the line circuit.

Another feature of my invention resides in the provision of the slow release relay OLP controlled by each of the slow release relays OL1 and OL2 to register long code elements of a transmitted code, which provides a margin in operation so that relays L1 and L2 at the stations will in all cases be enabled to release and register a long code element before it is terminated by the transmitting station.

Another important feature of my invention is contained in the transmitting circuits including the contacts c of the starting relays which operate in such a manner that by closing any one of a plurality of single contacts I not only start the transmitter into operation but also selectively create three selecting elements of the code. The arrangement herein disclosed is not only simple but is reliable in operation. Changes can be made with great facility, for example, assume that an installation is in service in which the code number 234 is not used and it is desired to install an additional panel employing this code number. All that is necessary is to install an additional storage unit, as shown in Fig. 5, making the proper connections to bus wires in multiple with similar connections to other panels and to connect one wire from contact c of the starting relay of the added unit to contact j of relay 23G and to connect a second wire from the S relay of the added unit to contact k of relay 23G.

The operation of the station equipment in receiving the control code just described, is as follows:

Relay R, shown in Fig. 6, operates in unison with office relay OR and each chain relay and slow release relay controlled by relay R operates in unison with the corresponding office relay as already described. Since the first code element is long, relay L1 releases, closing a circuit from terminal B, over front contact c of relay 1, back contact c of relay SP, back contact g of L1, and winding of relay E to terminal C. Relay E picks up, establishing a holding circuit for itself, over front contacts a of LBP and E, so that relay E remains energized for the duration of the code. During the second long code element, L2 releases to complete a circuit from terminal B, over front contact a of LBP, front contact c of relay E, back contact e of relay L2, back contact b of relay CR, front contact d of relay 2, wires 62 and 60, and winding of relay F to terminal C. Wire 60 is provided with an adjustable connection and may be connected to any one of the five wires 62 to 66, inclusive, leading respectively to contacts d of relays 2 to 6, inclusive, so that the relay F may be operated in unison with any one of the relays 2F to 6F, inclusive, at the office, and the station coding unit may thus be adapted to receive a selected one of a group of five code elements to operate relay F. When F picks up, it establishes a holding circuit for itself, from terminal B over front contact a of LBP, back contact a of SP, resistor R1, back contact a of relay G, front contact a and winding of relay F to terminal C. During the third long code element, L1 becomes released to close a circuit for relay G from terminal B, over front contact a of LBP, front contact c of relay E, back contact e of relay L1, back contact d of CR, front contact d of relay 3, wires 63 and 61, front contact c of relay F, winding of relay G to terminal C. Wire 61, leading to relay G, is provided with an adjustable connection so that it may be connected to any one of the five wires 63 to 67, inclusive, leading respectively to contacts d of relays 3 to 7, inclusive, by means of which the unit may be adapted to receive one of a group of five code elements to operate relay G in unison with a corresponding relay at the office. When G picks up, it establishes a holding circuit for itself at its contact a and releases relay F, thereby opening contact c of relay F in the pickup circuit of relay G. During the fourth long code element, relay L2 again becomes deenergized to pick up relay S of the station storage unit over a circuit which passes from terminal B, over front contact a of LBP, front contact c of relay E, back contact e of L2, back contact b of CR, front contact d of relay 4, front contact c of relay G, wires 71 and 50, and winding of relay S to terminal C. When G picked up, it closed its contacts c to g, inclusive, connecting contacts d of relays 4 to 8, inclusive, to wires 71 to 75, inclusive, thereby providing a series of circuits to each of which the wire 50 leading to relay S of a storage unit may be connected. The coding unit is therefore adapted to control five storage units, and may be used to control one storage unit for each code element of the group 4 to 8, inclusive, following the element which controls relay G. The first of the S relays to become energized, closes its contact a to complete a branch circuit from its wire 50, to bus wire 37, and winding of relay SP to terminal C. Relay SP picks up and closes its contact a to establish a holding circuit for itself and for the S relay which operates it, and releases relay G to open its contacts c to g, inclusive, thereby opening the pickup circuits for all of the S relays controlled by the coding unit. It is therefore impossible for more than one S relay to be picked up by a single code.

Referring now to the chain relays, it will be noted that although the operation during the first group of eight elements is the same as that at the office, the circuits differ somewhat in detail. The pick-up circuits of relays 6 and 8 include back contacts f and c respectively of relay CR, and the pick-up circuits of the even-numbered chain relays include a front contact e of relay E in multiple with an open front contact g of relay M. When receiving a control code, E is energized and M deenergized. When transmitting an indication code, M is energized and E is deenergized. When receiving an indication code transmitted by a more remote station, both E and M are deenergized. It follows that when a station is transmitting an indication code, the operation of the chain relays at intermediate stations is prevented. The operation of the chain relays at stations more remote from the office than the transmitting station is prevented because relay LBP at each such station becomes released. When receiving a control code the operation of the chain relays is stopped at the end of the first group of elements, at all stations except the one at which a relay S is opperated by reason of the front contact f of relay SP in the pick-up circuit of relay 1. At the selected station, therefore, relay 1 is operated by the ninth code element to pick up CR which closes its front contacts b and d to connect relays 9 to 13, inclusive to back contacts e of relays L1 or L2 over circuits including contacts e of relays 1 to 5, inclusive. Relays 9 to 13 may also be operated during transmission of an indication code, and the circuit for relay 13 includes a front contact e of relay 7 which is employed only during transmission.

In the code described, I have assumed that the ninth element is long and that the tenth, eleventh, twelfth and thirteenth are short; therefore, relay 9 picks up when back contact e of L1 is closed during the ninth element and closes a holding circuit for itself from terminal B, front contact e of relay SP, contact a and winding of relay 9 to terminal C. Relays 10, 11, 12 and 13 remain deenergized during the corresponding short elements of the code.

When R becomes steadily energized at the end of the code, it closes a circuit from terminal B, over front contact b of relay R, front contact c of LBP, front contacts e of E and g of M in parallel, resistor R3, front contact b of relay 5, front contacts f of relays CR and E, bus wire 29, front contact b of relay S, and winding of the delivery relay D of the selected storage unit to terminal C. Relay D picks up as the final relay of the chain and closes a holding circuit from terminal B, over front contact d of relay S, front contact a of relay D, and the winding of relay D to terminal C, and also operates a series of contacts b to h, inclusive, which function to deliver the code pattern indicated by the positions of relays 9 to 13, inclusive, to the switch and signal stick relays of the selected storage unit. The normal switch stick relay NWS is now picked up over a circuit from terminal B, (Fig. 7) front contact $b$ of relay 9, bus wire 31, front contact $b$ of relay D, wire 81, front contact $a$ of relay MP, winding of relay NWS, front contact $a$ of relay WLP, and closed contact $a$ of thermal cutout $nh$ to terminal C. NWS picks up and prepares a holding circuit which is closed when relay D releases from terminal B over back contact $d$ of relay D, wire 83, back contact $b$ of RWS, front contact $a$ of NWS, thence as previously traced through NWS to terminal C. If switch lever WK had been reversed and its contact $r$ closed, relay 11 would have been picked up instead of relay 9, completing a similar circuit for the reverse stick relay RWS from terminal B, over contact $b$ of relay 11, bus wire 32, front contact $c$ of relay D, wire 82, front contact $b$ of MP, winding of RWS, front contact $b$ of WLP, and contact $a$ of thermal cutout $rh$ to terminal C. Relay RWS is also provided with a holding circuit similar to that traced above for NWS.

The signal stick relays LHS and RHS each have a holding circuit from terminal B, back contact $g$ of relay D, wire 86, front contact $e$ of relay ITR, back contact $b$ of one signal stick relay, front contact $a$ and the winding of the other signal stick relay to terminal C. In the code assumed, if either of these stick relays is energized, it becomes released when relay D picks up, because relays 10 and 12 are deenergized. If, however, the left-hand contact $l$ of signal lever HK had been closed, relay 10 would have been picked up, providing a pick-up circuit for LHS, from terminal B, over contact $b$ of relay 10, bus wire 34, contact $e$ of relay D, wire 84, and winding of relay LHS to terminal C. If the right-hand contact $r$ of signal lever HK had been closed, relay 12 would have been energized, providing a similar pick-up circuit for relay RHS over bus wire 35 and wire 85. If key UK had been closed, relay 13 would have been energized to provide a pick-up circuit for relay US over bus wire 36 and wire 87. Back contact $h$ of relay D provides a holding circuit for relay US from terminal B, over contact $a$ of relay US, wire 88, back contact $h$ of relay D, wire 87, and winding of relay US to terminal C. It follows that the energization of relay D at the end of the control code positions each of the five stick relays to agree with the positions of the register relays 9 to 13, inclusive. When line relay R becomes steadily energized at the end of a control code, the relays release in sequence as already described. When S and SP release, relay D though deenergized, remains picked up for a short time because of the flow of current through its winding and asymmetric unit $lr$, and provides holding circuits for relays 9 to 13, inclusive, from terminal B, over front contact $d$ of relay D, bus wire 33 and back contact $e$ of SP, so that the register relays do not release until after relay D releases. This provides a maximum time for the operation of the switch and signal stick relays, and it is clear from the circuits that the delivery relay D and the register relays 9 to 13 may remain picked up until after the transmission of another code has been started.

When relay D became energized, it also closed its front contact $i$ to complete a pick-up circuit for relay 13V, and relay 13V controls a starting circuit to cause a return indication to be transmitted as soon as the station operations performed by the control code are completed. It may be assumed that the switch is normal and the signals are at stop, so that no change takes place in the station apparatus as a result of the control code being described. In this case, the normal switch indication relay NKR will be energized, as later described, and when D becomes energized, a circuit is closed from terminal B, over back contact $a$ of relay TX, (Fig. 8) back contact $d$ of relay RKR, front contact $d$ of NKR, wire 93, back contact $e$ of MSP, wires 26 and 27, front contact $i$ of relay D, and winding of relay 13V to terminal C. Relay 13V picks up and completes a holding circuit from terminal B, over front contact $g$ of relay D, and contact $a$ and winding of 13V to terminal C.

Relays S and D release consecutively, and when S releases it connects terminal B, over back contact $d$ of relay S to the holding circuit of 13V so that relay 13V is maintained energized.

If the switch at the station is reversed, the reverse switch indication relay RKR will be energized, as described hereinafter, and under these conditions when relay D becomes energized an alternate circuit is closed for relay 13V from terminal B, over back contact $a$ of TX, front contact $d$ of RKR, wire 95, back contact $g$ of MSP, wires 26 and 27, front contact $i$ of relay D, and winding of relay 13V to terminal C. Since S picks up before D, during the control code, it follows that 13V is released during each control code and is then picked up again at the end of the code if wire 93 or 95 is energized, but 13V remains deenergized under these conditions if wires 93 and 95 are deenergized, as would be the case if the switch occupied an intermediate unlocked position or if relay TX were energized. When relay D releases, if either NKR or RKR is then energized, a starting circuit is closed from wire 93 or 95, connected with terminal B over the circuits previously traced, over a back contact of MSP, wires 26 and 27, back contact $i$ of relay D, front contact $b$ of 13V, wires 20 and 18, and winding of relay ST to terminal C. Relay ST therefore picks up to start the transmission of an indication code as described hereinafter.

If, however, the control code is one which is adapted to move the switch, the energized switch indication relay will become deenergized before relay D is released, and the starting circuit just traced will be open. In this case the starting circuit will be closed when the switch indication relay NKR or RKR becomes energized at the completion of the operation of the switch. It may sometimes occur that a switch is obstructed and unable to complete its movement. If the operator does not receive his indication within a reasonable time, he will operate the starting key again to repeat the control code. When relay S becomes energized by this second control code, its back contact $d$ will open and release 13V, and a starting circuit will be closed from back contacts $d$ of RKR and NKR, as before, over wire 17, back contact $c$ of 13V, and winding of relay ST to terminal C. It follows that if a control code is transmitted containing switch control elements for moving the switch to the position it already occupies, the code will not cause operation of the switch and will be immediately followed by a return indication code to indicate that the switch is in one of its two closed positions, but that if the control code contains switch control elements for moving the switch to its opposite position, the switch will be operated and a return indication of its final closed position will be transmitted when the switch completes its operation, while indications of its initial position or of its open or unlocked condition will not be transmitted. However, at any time before the switch completes its operation, an immediate return indication of the open condition of the switch may be obtained by transmitting a second control code. By this novel construction of circuits and apparatus I avoid transmission of unnecessary codes and provide an arrangement whereby any combination of operations at the station that may be performed by a single code will also be indicated by a single code.

I will now describe the apparatus of Figs. 8 and 9 illustrating those portions of a typical railway signaling system directly related in operation to the code apparatus at the station.

Signal RHA is controlled by a polar line relay RAHR governed over a circuit including a front contact $a$ of track relay 3TR and a pole-changer RPC for determining the polarity of the current supplied to relay RAHR. It will be understood that in actual practice pole-changer RPC occupies the position indicated in the drawing to connect terminal B+ with wire 77, thereby energizing relay RAHR in the left-hand or normal direction, when the stretch of track from signal RHA to the next signal in advance is unoccupied and the signal in advance indicates clear or caution. When the section beyond the signal in advance is occupied by a train moving in a direction from left to right, the pole-changer RPC is reversed, thereby connecting the terminal B— with wire 77, and causing energization of relay RAHR in the reverse or right-hand direction. It will be understood that in addition to the control illustrated, wire 77 will usually be controlled by other track relays, not shown, in accordance with standard practice in railway signaling.

Signals LHA and LHB are controlled by polar line relay LHR provided with a circuit including front contact $a$ of relay 2TR and a pole-changer LPC governed by traffic conditions to the left of the portion of track shown in the drawings. When pole-changer LPC occupies the normal position as shown in the drawings, relay LHR is energized in the left-hand or normal direction, but when pole-changer LPC is reversed, relay LHR is energized in the right-hand or reverse direction.

Signal relays are provided for each of the signals. If the switch control relay WR is normal, and the switch is locked normal and switch stick relay NWS is energized, relay NKR will be energized, as hereinafter described, and if the signal stick relay RHS also is energized, and the track sections governing signal RHA are unoccupied, the signal relay RAHP may be energized by a circuit from terminal B, over front contact $a$ of relay LGP, back contacts $c$ of relays LHS and TE, front contact $b$ of relay ITR, front contact $c$ of RHS, front contacts $a$ of NKR and of RAHR, and winding of relay RAHP to terminal C. When relay RAHP is energized, and RAHR reversed, a lighting circuit is closed from terminal B, over front contact $a$ of relay RAHP, front contact $b$ and right-hand polar contact $p$ of RAHR, lamp Y of signal RHA to terminal C. If relay RAHR is energized in the normal direction, left-hand contact $p$ will be closed to light lamp G of signal RHA. When RAHP is deenergized, a circuit is completed from its back contact $a$ to light lamp R of signal RHA.

The circuits for lighting the lamps of the other signals are similar, with the exception that signal RHB is not controlled by a line relay, and are obvious from the drawings.

The circuits for the four signal relays are symmetrically arranged and it is obvious that if the signal stick relay LHS is energized instead of RHS, signal relay LAHP may be energized to clear signal LHA.

When the switch control relay WR is reversed and the switch is locked reverse and switch stick relay RWS is energized, the reverse switch indication relay RKR may be energized in place of NKR as hereinafter described and it is obvious from the drawings that under this condition, relay RBHR or LBHP may be energized to clear either signal RHB or LHB. It follows from the foregoing, that the operator can clear any one of the four signals by transmitting a code to energize one of the switch stick relays NWS or RHW and one of the signal stick relays LHS or RHS provided the route governed by the signal may be safely established.

Track relay ITR is provided with a slow pick-up slow release repeater relay TZ having a circuit from terminal B, over front contact $a$ of ITR, front contact $c$ of WLP, and winding of relay TZ to terminal C, so that TZ is picked up shortly after ITR is energized, and is released shortly after ITR is released when section IT becomes occupied. The stick relays LHS and RHS (Fig. 8) each have a holding circuit which includes front contacts $e$ of relays ITR and TZ in multiple. When a train accepts a signal and enters section IT, relay ITR releases to open the holding circuit to release the signal stick relay. By this means, the signals may be caused to remain at stop following the passage of a train through section IT until again cleared by the operator. When relay TZ releases, the holding circuit for the signal stick relay again becomes available so that the signal stick relay may be then energized by a code even though the section IT is occupied. By this arrangement, I provide means whereby the operator is enabled to transmit a code to control the switch and signals to set up a new route as soon as he is informed by the lighting of lamp IIE and by bell X that a train has accepted the existing route and has entered section IT. My system includes another important feature comprising relay US which may be energized optionally by the operator to close its front contact $b$ in multiple with contacts $e$ of relays ITR and TZ in the holding circuits of LHS and RHS. When relay US is energized so that its contact $b$ is closed, it is obvious that LHS or RHS will not become deenergized when a train enters IT and it follows that the signal which the train accepts will, in this case, again clear automatically as soon as the train passes out of the territory which governs the signal. It follows that the operator may by a single code, control a signal so that it will clear to permit the passage of one train and will hold a following train, or so that it will clear repeatedly to permit the passage of a fleet of trains moving in the same direction.

For each direction of traffic, a signal indication relay GP is provided. The circuit for relay RGP is from terminal B, over back contacts $b$ of RBHR and RAHP, and winding of relay RGP to terminal C. The circuit for LGP similarly includes back contacts of LAHP and LBHP. An approach relay AR is provided for each direction, the circuit for RAR being from terminal B, over wire 78, contact $b$ of 2TR, and winding of relay RAR to terminal C. It will be understood that relay RAR may in practice be also controlled by one or more track sections to the left of 2T. A similar circuit is provided for relay LAR which includes wire 79, and a front contact of the track relay 3TR. A locking relay MR is also provided for each direction of traffic, the circuit for RMR being from terminal B, over front contacts b of RGP and RAR, and winding of relay RMR to terminal C, so that RMR is energized when signals RHA and RHB indicate stop and the approach section 2T at the left is unoccupied. Relay RMR will remain energized when this approach section becomes occupied by reason of a holding circuit including its own front contact a, and front contact b of RGP, if signals RHA and RHB indicate stop. Relay RMR will, of course, be deenergized when a signal is cleared, and a release circuit is provided so that relay RMR will again become energized when a train passes the signal. If the switch is normal, RMR will become energized when the train passing signal RHA enters section 3T, the circuit being from terminal B, over contact b of RGP, back contacts a of LAR and TZ and winding of relay RMR to terminal C. If the switch is reversed, relay RWP is energized, and its contact a bridges contact a of LAR in the release circuit just traced so that relay RMR will become energized when a train passing signal RHB enters section 1T and releases TZ. Relay RMR may also be energized at the end of a predetermined time interval, if the signal is placed at stop in front of an approaching train. This is accomplished by means of a time element relay TE having a contact a in the pick-up circuit of RMR adapted to become closed at the end of a predetermined time interval after relay TE is energized. Thus, if the operator transmits a code to deenergize RHS to cause signal RHA to indicate stop, while a train is approaching the signal, RGP will become energized and a circuit will be closed from terminal B, over front contact b of RGP, back contact a of RMR, front contact b of LMR, contact d of ITR, and winding of relay TE to terminal C, so that relay TE will become energized and will, at once, open its contact c which is included in the signal network for the purpose of insuring that relay TE is initially in the proper position. At the end of the predetermined time interval, contact a of relay TE becomes closed to complete a pick-up circuit for RMR and the latter relay will then pick up and close its holding circuit and will open the circuit of TE and restore the latter to its initial position.

The circuits for locking relay LMR are generally similar to those of relay RMR and their operation will be obvious from the drawings. Thus relay LMR becomes deenergized if signal LHA or LHB is cleared, and will become energized when LHA goes to stop provided there is no train approaching signal LHA. Relay LMR will become energized when a train passing signal LHA or LHB enters section 2T, or may be energized at the end of a predetermined time interval after signal LHA or LHB is placed at stop.

Switch W is controlled by a dual selector switch machine having a selector lever WL (Fig. 8) which in one position, closes its contacts a and b, and also couples the shaft of the motor armature 99, by means not shown, to the mechanism for moving the switch so that the switch is thereby adapted to power operation. The selector lever, in another position, opens contacts a and b, and connects a hand throw lever to the switch mechanism in lieu of the motor, so that the switch may then be operated manually. When the selector lever is in the motor position, a circuit is closed from terminal B, over contact b of selector lever WL, and winding of relay WLP to terminal C. When the selector lever is in the hand throw position, relay WLP is deenergized, and contact a in the circuit of the motor field 100 is opened and prevents the motor from being energized. Relay WLP when deenergized, opens its contact c in the circuit already described for relay TZ, so that relay TZ is deenergized when the selector mechanism is in the hand throw position. Contacts a and b of relay WLP are included in the circuit of relays NWS and RWS so that both of these relays become deenergized when the selector mechanism is moved to the hand throw position.

The switch machine for controlling switch W is provided with a polar control relay WR (Fig. 8) which has a normal energizing circuit extending from terminal B, over front contacts c of relays NWS, RMR, LMR and ITR, winding of relay WR, front contact c of relay TZ, and back contact c of RWS to termianl C. Relay WR has a reverse energizing circuit similar to that described but including front contact c of relay RWS and back contact c of NWS, so that relay WR may be energized in one direction or the other in accordance with the energization of the switch stick relays NWS, RWS, provided the locking relays LMR and RMR are energized, and provided the track section containing the switch is unoccupied so that ITR and TZ are energized.

The switch W is operated by a motor comprising a field 100 and an armature 99 and governs a contact Wn closed except when the switch is locked normal, and a contact Wr closed except when the switch is locked reverse. Relay WR and the switch W are both shown in the normal position, and the switch motor circuit is open. If relay WR is reversed, a circuit is closed from terminal B, over contacts a and pa of relay WR, armature 99, contact pb of relay WR, operating winding of thermal cutout rh, contact Wr, field 100, contact a of WL to terminal C. The switch motor will be energized over this circuit to move the switch to the reverse position, and the circuit will then be opened by contact Wr controlled by the switch machine. If relay WR is then restored to normal position, a motor circuit will be closed similar to that described except that current will traverse the armature 99 in the opposite direction to move the switch to the normal position and the circuit will include contact Wn which opens the circuit when the switch reaches its normal position. This circuit also includes the operating winding of thermal cutout nh.

The thermal cutouts nh and rh function in such manner that if the switch becomes obstructed during transit, the continued supply of current over the motor circuit then closed, causes one or the other of these devices to become heated to actuate a thermostat contact a included in the circuit of stick relay NWS or RWS, which is thereby deenergized to release WR and thus open the motor circuit. Since this operation affects but one of the switch stick relays, the other can then be operated by code to restore the switch to its initial position.

A switch indication circuit is provided including circuit controller WP (Fig. 9) having a pair of contacts *na* and *nb* closed only when the switch is locked in normal position and a second pair of contacts *ra* and *rb* closed only when the switch is locked in reverse position. When relay NWS is energized and relay WR and the switch are normal, a circuit is closed from terminal B, over contact *na* of WP, normal contact *pc* of WR, front contact *d* of NWS, winding of normal switch indication relay NKR, back contact *c* of reverse switch indication relay RKR, and contact *nb* of WP to terminal C. If the switch becomes unlocked or is moved away from the normal position, or if relay WR is reversed, or if NWS becomes deenergized, the terminal B becomes disconnected from relay NKR and the wires leading to NKR are connected together so that this relay is prevented from becoming energized even though the circuit is accidentally in contact with a foreign source of energy. A similar circuit is provided for relay RKR including contacts *ra* and *rb* of WP, reverse contact *pd* of relay WR, front contact *d* of RWS and back contact *c* of NKR, which circuit is closed only when the switch is locked reverse, relay RWS is energized and WR is in the reverse position and NKR is deenergized.

The switch circuit controller WP also controls a switch repeater relay RWP which is employed to close circuits for the release of approach locking when the switch is in the reverse position, as already described, which relay has a circuit from terminal B, contact *ra* of WP, winding of relay RWP, and contact *rb* to terminal C, so that relay RWP is energized when the switch is locked in the reverse position.

In order to prevent the operator from inadvertently attempting to change a route when a train is approaching a clear signal, I employ a lock repeater relay MP (Fig. 8) having a circuit from source B, front contacts *d* of relays LMR and RMR, and winding of relay MP to terminal C, so that MP is energized when all signals are at stop and the approach locking is released. Relay MP may also be energized when signal RHA or RHB is clear, provided no train is approaching the signal and relay RAR is energized, the circuit for relay MP then being from terminal B, over contact *d* of LMR, contact *c* of RAR, and winding of relay MP to terminal C. Relay MP is also energized when signal LHA is clear provided no train is approaching and relay LAR is energized, its circuit then being from terminal B, over contact *c* of LAR, contact *f* of NKR, contact *d* of RMR, and winding of relay MP to terminal C, and since this circuit is not available when the switch is reversed, it follows that MP can not be energized when signal LHB is clear. When a train enters section 1T, relay MP becomes energized over a circuit from terminal B, over back contact *f* of relay TZ, and winding of relay MP to terminal C. Relay MP, when energized, closes its contacts *a* and *b*, connecting relays NWS and RWS over wires 81 and 82 of the station coding unit. When relay MP is deenergized, obviously NWS and RWS can not be operated by code and if one of these relays is energized, it is held picked up by current flowing from terminal B, over back contact *c* of relay MP, to the holding circuits of the switch stick relays. It follows from the foregoing that the operator can operate the switch and clear a signal by one code, which may be transmitted at any time except when signal LHB is clear, or when a train is approaching one of the other signals at clear. For example, assume that relays RWS, RHS, RAR and MP are energized and signal RHB is clear, and that a code is received at the station to pick up NWS and RHS, releasing RWS. The first result will be to release the switch indication relay RKR which will in turn release RBHR and cause signal RHB to indicate stop, and relay RGP to become energized. The opposing signals indicate stop, relays LGP and LMR are energized, and since RAR is energized, RMR becomes energized, and if section 1T is unoccupied, relay WR will then become energized in the normal direction, causing the switch motor to become energized to move the switch to the normal position. When the switch completes its movement, the normal switch indication relay NKR becomes energized, closing its contact *a* to complete the circuit of signal relay RAHP to cause signal RHA to clear to permit a train movement over the route established by the code.

I will now describe the operation of the station coding apparatus in transmitting an indication code. As already explained, each indication code includes seven indicating elements and is a composite indication of the condition of the switch and signal and of the track and approach sections and is initiated whenever any one of the indicated devices changes its condition, or when a control code is received. The transmission of an indication code is initiated by picking up the starting relay ST (Fig. 7). A number of circuits are provided for this relay one of which is closed upon any change in the condition of the station apparatus which it is desired to indicate. Thus for example, an indication code will be transmitted when a train approaching signal RHA enters the approach section and releases relay RAR (Fig. 9). I will assume that this occurs and that the station apparatus is otherwise in the condition shown in Figs. 8 and 9.

When RAR releases, it closes its back contact *d* (Fig. 8) and relay 9TS becomes energized over a circuit from terminal B, over back contact *d* of relay RAR, wire 89, and winding of relay 9TS (Fig. 7) to terminal C. Relay 9TS establishes a holding circuit for itself over contacts *a* of relays 9V and 9TS, so that 9TS, if energized by a momentary closing of contact *d* of relay RAR, remains energized and maintains the connection from terminal B to wire 89 until an indication code is transmitted to pick up relay 9V. When relay 9TS picks up, it closes a circuit for starting relay ST from terminal B over front contact *c* of 9TS, back contact *c* of relay 9V, and winding of relay ST to terminal C.

When ST is energized it closes its holding circuit over its own front contact *a* and back contact *e* of VC, and also closes a circuit from terminal B over contact *c* of relay ST, to bus wire 38, thence over back contacts *b* of relays L1 and L2, back contact *a* of relay CO, back contact *d* of relay E, and winding of relay M to terminal C. Relay M picks up, operating its contact *d* to disconnect the line circuit from the more remote stations and to connect contact *b* of relay T into the line circuit to the office as already described in connection with Fig. 10. Relay M also closes its contacts *e* and *f* to set relay T into operation to transmit a code to operate relays R and OR in unison in a manner similar to that already described in connection with relay OT. The opening of relay R causes the energization of relays L1, 1, L2, LB and LBP in a manner similar to that described in connection with corresponding relays at the office. When L1 picks up, it disconnects relay M from wire 38, and when relay LB picks up, it completes a circuit from terminal B, over back contact c of relay 16, contacts a of relays LB, M and CO, back contact d of relay E, and winding of relay M to terminal C, to maintain M energized for the duration of the code. Relay T is picked up over a circuit including back contact a of relay LBP and back contacts c of relays 3, 5 and 7 and contact e of relay M. This circuit is opened as soon as LBP picks up and releases T, so that the first code element is a short element and does not release L1, and therefore relay E is not operated. It will be noted that the first element is terminated by the opening of back contact a of LBP and is thus just enough longer than the remaining short elements which are terminated by opening a back contact c of a chain relay to permit the additional relays which are operated during the first code element at the office to pick up. If it should happen that the office and the station should start transmission at substantially the same time, relays T and OT both pick up, and relay OT, which has a holding circuit will hold the line open, even though relay T releases, and this will cause relay E to pick up and open its contact b in the line circuit. This contact will then hold the line open, even though OT releases. When relay E picks up, it opens its contact d, which deenergizes relay M. When M releases, it restores the through line circuit to permit OT to transmit control codes to all stations, and since relay E is picked up at each station, it follows that all of the stations are in condition to receive the control code and there is no possibility of interference if two transmitters become energized at the same time.

During the second code element of the indication code in question, a hold-down circuit for T is established from terminal B over front contact a of LBP, back contact a of CR, back contact b of F, wires 51 and 52, contact c of relay 2, contact f of relay M, contact c of relay T to the left-hand terminal of T to hold T deenergized. Relay R remains energized, and L2 and LP release, when a circuit is closed from terminal B, over front contact a of LBP, back contact b of LP, back contact e of L2, back contact b of CR, contact d of relay 2, wires 62 and 60 and winding of F to terminal C. Relay F picks up and closes its contact a to establish a holding circuit from terminal B, over front contact a of LBP, back contacts a of SP and G, contact a and winding of relay F to terminal C. Relay F closes its contact c to prepare a circuit for relay G, and operates contact b to open the hold-down circuit of relay T so that relay T becomes energized to terminate the second code element. It will be noted that in transmitting, the selector relay F is picked up when LP releases and closes its back contact b, following the release of L1 or L2, but that in receiving this contact is shunted by contact c of relay E so that the selector relay is picked up when relay L1 or relay L2 is released. It is also to be noted that wire 51 is adapted to be connected to any one of five wires 52 to 56, inclusive, leading over c contacts of relays 2 to 6, inclusive, to one terminal or the other of relay T, and that wires 51 and 60 must be connected with contacts c and d, respectively, of the same chain relay. When F picks up, it closes its front contact b and prepares a circuit from terminal B over wire 59 adapted to be connected to any one of the five wires 53 to 57, inclusive, leading over the c contacts of relays 3 to 7, inclusive, to one terminal or the other of relay T to control the next selecting element of the code. Wire 59, must of course, be connected to contact c of the chain relay which has wire 61 connected to its d contact. As shown in the drawing during the third code element a circuit for holding T energized to prolong the third code element. This circuit passes from terminal B over front contact a of LBP, back contact a of CR, front contact b of relay F, wires 59 and 53, front contact c of relay 3, back contact c of relay 5, back contact c of relay 7, front contact e of relay M, winding of relay T, and resistor R4 to terminal C. When relay LP releases, a circuit is closed to pick up relay G, current flowing from terminal B, over front contact a of LBP, back contact b of LP, back contact e of L1, back contact d of CR, front contact d of relay 3, wires 63 and 61, front contact c of relay F, and winding of relay G to terminal C. When relay G picks up, it closes its contact a to complete its holding circuit and to release relay F as previously described, and when relay F releases, it opens the pick-up circuit of relay G and the holding circuit of relay T. Relay G also closes its contact b connected with wire 47 which is connected with wire 49 over front contact b of relay ST. Wire 47 is connected with terminal B over front contact a of LBP and back contact a of CR so that when relay G picks up, terminal B is connected to one of the five wires 54 to 58, inclusive, leading to relay T over the c contacts of relays 4 to 8, inclusive. As here shown, wire 49 is connected with wire 54 so that when relay T is deenergized during the fourth code element, a holding circuit is completed from terminal B over front contact a of LBP, back contact a of CR, front contact b of relay G, wire 47, front contact b of ST, wires 49 and 54, front contact c of relay 4, front contact f of relay M and back contact c of relay T to the left-hand terminal of relay T. This circuit prolongs the fourth element of the code until relay LP releases to pick up relays S and SP and to release relay G as previously described.

When several storage units are connected to the same coding unit, wire 47 from the coding unit is connected to wire 47 of the first storage unit and a series circuit leading through the contact b of relay ST of each storage unit in turn is provided by connecting wire 47a of each storage unit to wire 47 of the next succeeding storage unit. Wires 49 and 50 from each storage unit are connected to contacts c and d respectively of the same chain relay. Relay T is repeatedly energized to produce the fifth to eighth code elements over the circuit including back contacts c of the odd-numbered chain relays as already described.

If the first group of code elements are correctly transmitted to the line, relay SP will be energized to complete the pick-up circuit for relay 1 for the ninth code element. Relay CR picks up during the ninth element, closing its contact e so that relay 2 may be energized during the tenth element. Relay CR opens its back contact a to disconnect the station selecting circuits, and also opens its back contact f in the chain circuit which, however, is now shunted by contact b of relay M so that relay 6 may be picked up during the fourteenth element. When relay 6 is energized, it permits relay 7 to pick up during the fifteenth element. Since front contact c of relay CR is now closed, relay 16 will be energized in place of relay 8 when the line is steadily closed at the end of the code.

During an indication code, when S picks up, a circuit is established from terminal B, over contact c of relay M, wire 28, contact c of relay S, and winding of relay MSP to terminal C. Relay MSP picks up and connects the seven indication wires 89 to 95, inclusive, over its contacts a to g, inclusive, and bus wires 39 to 45, inclusive, to the f contacts of chain relays 1 to 7, inclusive, to provide holding circuits over wires 24 and 25 for the control of relay T during the second group of code elements.

The wires 89 to 95, inclusive, are selectively connected with terminal B to prolong the corresponding elements of the indication code in accordance with the condition of apparatus at the station. Thus, in the particular case now being described, wire 89 is connected with terminal B as explained hereinbefore, over back contact d of relay RAR, and also over contacts a of relays 9TS and 9V. Current flows from this wire 89 over front contact a of MSP, bus wire 39, front contact f of relay 1, wire 24, front contacts d and a of L1 and LP, respectively, in multiple, front contact a of relay T, front contact e of relay M, winding of relay T and resistor R4 to terminal C. This circuit holds relay T energized until L1 and LP release, thereby prolonging the ninth element of the code. When L1 and LP release, a circuit is closed from terminal B over front contact a of LBP, back contact b of LP, back contact e of L1, front contact d of CR, front contact e of relay 1, and winding of relay 9 to terminal C. Relay 9 therefore picks up and closes its holding circuit as previously described in connection with the reception of the control code.

During the tenth element of the code, since the signals are at stop, a holding circuit is completed for relay T to prolong this element. The holding circuit closed under these conditions passes from terminal B, over front contacts d of LGP and RGP to wire 90, thence over front contact b of MSP, bus wire 40, front contact f of relay 2, front contact h of CR, wire 25, front contact d of L2 and front contact c of LP in parallel, front contact f of relay M and back contact c of relay T to the left-hand terminal of relay T. The relay T therefore remains deenergized to prolong the tenth element of the code until relays LP and L2 release whereupon relay T becomes energized to produce the eleventh code element. During this tenth element of the code register relay 10 becomes energized and completes its holding circuit as will be obvious from the preceding description. In the particular case now being described, no holding circuit is closed for relay T during the eleventh and twelfth elements which are therefore short. During the thirteenth element of the code however, since the switch is normal, a holding circuit is completed for relay T from terminal B over back contact a of TX, back contact d of RKR, front contact d of NKR, wire 93, front contact e of MSP, bus wire 43, front contact f of relay 5, front contact g of CR, wire 24, front contact d of L1 and front contact a of LP in parallel, front contact a of relay T, front contact e of relay M, winding of relay T and resistor R4 to terminal C. The thirteenth element of the code is therefore prolonged and during this element, register relay 13 becomes energized and completes its holding circuit. The fourteenth and fifteenth elements of the code are short.

When relay R is energized at the conclusion of the fifteenth code element, relay 16 picks up as the final relay of the chain and closes its holding circuit over its own front contact a and also completes a circuit from terminal B over front contact c of relay 16, (Fig. 6) wire 30, front contact h of MSP, and winding of VC (Fig. 7) to terminal C. Relay VC picks up, and establishes a holding circuit for itself over its own front contact a and front contact d of relay S. The energization of relay VC closes its contacts b, c and d, connecting relays 9V, 10V and 11V over bus wires 31, 34 and 32, with the b contacts of relays 9, 10 and 11, respectively, and at the same time opens the holding circuits of these V relays. In the code described, relays 9V and 10V become energized and relay 11V deenergized, and relays 9V and 10V close their front contacts a to prepare holding circuits so that these relays are held energized until the next code is received. Relay 13V has a holding circuit from terminal B, back contact d of relay S, contact a and winding of relay 13V to terminal C, which is opened when S picks up so that 13V is thus released during each control or indication code. When VC picks up it closes its contact f connecting relay 13V to wire 46 of the storage unit, which is connected to bus wire 69 of the coding unit and to back contact b of relay 13, but since relay 13 is energized, this circuit is open and relay 13V is not picked up. Relay VC by opening its back contact e opens the holding circuit of relay ST to release ST if all of the starting circuits are open. Relay VC also closes a circuit from terminal B, over its front contact e, bus wire 33, contact f of relay M, back contact c of relay T, to the left-hand terminal of relay T. This circuit prevents relay T from again picking up after it has been released at the end of the code and a branch thereof supplies energy to the back contact e of relay SP, so that when SP releases at the end of the code, the holding circuits of relays 9 to 13, inclusive, are maintained and these relays do not release until after VC is released. Since relay R is now steadily energized, the chain relays and the slow acting relays release in sequence as already described. When 16 picked up it opened its back contact c and deenergized M, which released and closed its back contact d to restore the through line circuit, opened its contact c to deenergize CO and MSP, and opened contacts e and f to deenergize relay T. When LBP releases relays CR, E, S and SP are released and the coding units is then in condition to receive a new code. When S releases, relay VC is deenergized, and when VC releases, relays 9 to 13 are deenergized. When relay L1 releases, the coding unit is ready to transmit a new code. It will be noted that the transmission of the indication code positions the relays 9V to 13V, inclusive, in such manner that all starting circuits are open provided the station devices remain unchanged in position and the condition of wires 89 to 95, inclusive, remains in agreement with the code pattern of the second group of elements of the transmitted code. However, if one of the deenergized wires of the group 89 to 95 becomes energized, a circuit is rendered available to pick up relay ST to start the transmission of a new code. Thus, if a signal clears, relay LGP or RGP will become deenergized and will connect terminal B with wire 92 or wire 94 to pick up relay ST. For example, I will assume that an eastbound signal is cleared, thereby deenergizing RGP. Current then flows from terminal B over front contact d of LGP, back contact d of RGP, wire 94, back contact f of MSP, front contact c of 10V, wires 96 and 17, back contact c of 13V and winding of relay ST to terminal C. In case a westbound signal clears, the circuit is from terminal B, over back contact d of LGP, wire 92, back contact d of MSP, to front contact c of 10V and thence as before through the winding of ST to terminal C. In either case the energization of relay ST initiates the transmission of a code. If RGP is deenergized to connect wire 94 with terminal B as described above, the resulting indication code will have the fourteenth element prolonged and when this code is received at the office, lamp 14E will be energized to indicate that a left-hand signal is at clear. In case relay LGP is deenergized so that wire 92 is connected with terminal B, the resulting indication code will have its twelfth element prolonged to light lamp 12E in the corresponding office storage unit to inform the operator that a right-hand signal is at clear. In case RGP and LGP are both energized, wires 92 and 94 are both disconnected from terminal B, but wire 90 is connected with this terminal so that the tenth element of the code is prolonged but the twelfth and fourteenth elements are short. When this code is received at the office lamp 10E will be lighted to indicate that the signals at the corresponding station are at stop. It should be noted that when a clear signal code is transmitted, wire 90 is deenergized by the opening of LGP or RGP so that relay 10 at the station does not pick up, and hence 10V becomes deenergized at the end of the clear signal code and prepares a starting circuit to energize relay ST when the signals are restored to stop. This starting circuit may be traced from terminal B over front contact d of LGP and RGP, wire 90, back contact b of MSP, back contact c of 10V, wires 96 and 17, back contact c of 13V and winding of relay ST to terminal C.

If the indication code transmitted includes a normal or a reverse switch indication and the switch then becomes displaced from its locked position from any cause beyond the control of the operator so that NKR and RKR are both deenergized, a starting circuit will be closed from terminal B over back contact a of TX, back contacts d of RKR and NKR, wire 17, back contact c of 13V and winding of relay ST to terminal C. The indication code resulting from this energization of relay ST will have its thirteenth and fifteenth elements both short, thereby extinguishing lamps 13E and 15E in the corresponding office storage unit, to give a distinctive indication of the unlocked condition of the switch. When this code is transmitted from the station the register relay 13 will not pick up, because the thirteenth and fifteenth elements of the code are both short so that when relay VC at the station becomes energized, a circuit will be closed to energize 13V. This circuit may be traced from terminal B through back contact b of relay 13 (Fig. 7), wire 69, back contact b of relay TX, wire 46, front contact f of relay VC and winding of relay 13V to terminal C. When relay S next releases, a holding circuit will be established for 13V from terminal B over back contact d of relay S and front contact a of 13V to terminal C. When 13V picks up it disconnects wire 17 from the starting circuit for relay ST, and prepares a starting circuit which becomes closed if either of the switch indication relays NKR or RKR becomes energized. Thus if relay NKR becomes energized while relay 13V is picked up, a starting circuit is completed from terminal B over back contact a of TX, back contact b of RKR, front contact b of RKR, wire 93, back contact e of MSP, wires 25 and 27, back contact i of relay D, front contact b of 13V, wires 20 and 18 and winding of relay ST to terminal C. This starting circuit when closed will, of course, transmit an indication code having the fifteenth element prolonged to light lamp 15E of the office storage unit. In case relay RKR becomes energized the starting circuit is similar to that just traced except that wire 95 is connected with terminal B to pick up relay ST and the thirteenth element of the code will then be prolonged to light lamp 13E of the office storage unit.

Reverting now to the code originating at the station when a train enters the approach section 2T while the signals are at stop, the switch normal, and section 1T unoccupied, the prolonged ninth element of this code picks up relay 9K of the office storage unit to light lamp 9E and indicate the condition of the approach section at the corresponding station. It has already been pointed out that when this indication code is transmitted, relay 9V becomes energized so that a starting circuit is available when the relay RAR next becomes deenergized in response to the exit of the train from section 2T. When this happens the energization of relay RAR breaks the stick circuit for 9TS, but does not affect relay 9V. A starting circuit is then closed from terminal B over back contact c of 9TS, front contact c of 9V and winding of relay ST to terminal C. The starting relay then becomes energized, and the resulting indication code will have its ninth element short. When this code is received at the office, relay 9K on the corresponding storage unit will be deenergized to extinguish lamp 9E and show that the approach section is unoccupied. During the transmission of this indication code, 9V will be deenergized, since its stick circuit will be opened when VC picks up and the pick-up circuit for 9V will then be open because relay 9 does not become energized during an indication code having a short ninth element.

The circuits for effecting indication of the track section 1T are similar to those provided for the indication of the approach section and will be understood without tracing these circuits in detail. It should be pointed out however, that the eleventh element of an indication code is allocated to the detector track section so that when relay TZ is energized, relay 11TS picks up and closes a starting circuit to energize relay ST. In addition, wire 91 is connected with terminal B under these conditions, so that the eleventh element of the indication code is prolonged to pick up relay 11K of the corresponding office storage unit and light lamp 11E. When this indication code is transmitted, 11V picks up, breaking the starting circuit initially closed by the deenergization of relay TZ, and preparing a circuit which will send a new code when TZ becomes deenergized upon the exit of the train from section 1T.

It should be noted that if the dual selector mechanism is actuated to place the switch under hand control, the consequent deenergization of relay WLP will deenergize relay TZ, and will also release either switch stick relay NWS or RWS which happens to be energized. The indication then sent to the office will result in lighting lamp 11E, and extinguishing both switch lamps 15E and 13E, thereby producing a distinctive indication of the fact that the dual selector has been operated.

It will be evident from the foregoing that transmission is stopped at the end of the code as a result of correct transmission of each of the selecting and indicating elements. It follows that the station coding unit is rendered incapable of stopping if a failure occurs which prevents the completion of a code or the release of relay ST at the end of a code, and that the continued operation of one coding unit would prevent transmission of indications from other stations. I therefore provide a thermal cutout relay CO which is energized for the duration of an indication code by a circuit from terminal B, over front contact c of relay M, and the heating element of relay CO to terminal C. Relay CO comprises a heating element adapted to control a heat storage member provided with a contact a which consists of a strip of thermostatic metal mounted in such manner that it will open contact a when heated. If relay M remains energized or is energized repeatedly, as when, for example, ten codes are transmitted in succession, the temperature of CO will rise enough to open contact a and release M, and prevent the transmission of codes by that coding unit. When M releases, the heating element is deenergized, but the heat storage member will continue to supply heat to the thermostat to hold the contact open for a time so as to enable other stations to transmit a number of codes. When relay CO becomes cooled, contact a will again be closed to permit M to be energized if the starting relay ST is still picked up, but this will again supply heat to relay CO to open contact a so that the coding unit will operate intermittently as long as relay ST remains energized. One advantage of this arrangement is that the repeated operation of the station apparatus brings the failure to the attention of the operator, and insures prompt servicing of the defective unit. A second advantage is that it permits repetition of a code, as it has been found that a number of possible causes of trouble, particularly of line trouble, are variable and do not re-occur if a code is repeated. A third advantage is that when the defect is of such nature that it does not prevent the coding unit from transmitting its indication correctly, the operator is not deprived of information because of the defect.

In the operation of my system, it may occur that after the operator has cleared a signal for a train it becomes desirable to again put the signal at stop and to set up a different route. If relay MP at the station is deenergized, the operator is prevented from changing the route; he may, however, send a control code to put the clear signal at stop which, as explained above, will cause the time element relay TE to become energized, and at the end of a predetermined time interval will energize the locking relay MP, and he may then send a control code to set up a new route. It is therefore desirable that the operator be informed when the time element relay TE is in operation and when it completes its movement and I therefore provide means for indicating its operation which I will now describe.

As the result of the transmission of the control code to put the signal at stop, relay TX, (Fig. 9) which is connected in multiple with TE, becomes energized and operates its contacts as soon as TE is energized at the beginning of the time element. Another result is that wire 90 becomes energized to cause the transmission of an indication code, but since back contact a of relay TX is open, wires 93 and 95 will be deenergized, the resulting code will have both the thirteenth and fifteenth elements short, and a switch indication lamp of the office panel will not become lighted when this code is received. The indication code received in response to this control code will thus be distinctive as it results in the lighting of signal lever lamp 10E only. At the station, relay 13V became energized during the control code, and is released during the indication code when relay S picks up. Relay 13 is not picked up during the indication code, and the circuit from back contact b of relay 13, over wires 69 and 46 to relay 13V is not closed because this circuit includes back contact b of relay TX, which is now open. At the end of the time element, measured by relay TE, this relay closes a circuit momentarily from terminals, (Fig. 8) over front contact d of relay TE, wire 18, and winding of relay ST to terminal C, to start transmission of an indication code. Relay TE at the same time closes its contacts a and b to pick up the deenergized MR relay (Fig. 9) and this causes relays TE and TX to become deenergized and relay TX closes the switch indication circuit at its back contact a to energize wire 93 or wire 95. It follows that this second indication code will light lever lamp 10E and either 13E or 15E in the usual manner, indicating to the operator that he may then transmit a code to set up a new route. If the operator desires to recall or verify his indications during the interval that relay TE is in operation he may do so. If he transmits a second control code while relays TE and TX are energized, a circuit is closed, when D becomes energized, from terminal B, over front contact a of relay TX, wire 27, and front contact i of relay D, and winding of relay 13V to terminal C, so that relay 13V picks up. When D releases, a starting circuit is closed from wire 27, in the circuit just traced, over back contact i of relay D, front contact b of 13V, wires 20 and 18, and winding of relay ST to terminal C to cause the transmission of an indication code. Since in this case there is no change in the condition of the station apparatus, this code will be a repetition of the preceding indication code.

One advantage of my invention resides in the multiple unit arrangement of station apparatus comprised in the provision of interchangeable station coding units of similar design, to which may be connected interchangeable station storage units alike in design, and in the employment of circuits so arranged, as herein described, that one of a plurality of storage units may be selectively operated by a first group of code elements so as to effect an exclusive control to transmit or receive a second group of code elements through the medium of a plurality of bus wires which connect the coding unit with each associated storage unit. The advantage of this arrangement is that the system may be readily adapted to a wide variety of conditions with the employment of a minimum of idle apparatus.

In the foregoing description, the operation of my centralized traffic control system has been described in connection with the control of an isolated switch and group of signals which are controlled by code signals in which each code contains both switch selecting and signal selecting elements, and as already described, the switch selecting elements through the medium of the switch indication relays control the signals. It follows that the operator is enabled to clear a signal for any one of a plurality of routes by transmitting a single code so arranged that a failure of any of the code elements to be correctly transmitted will merely cause the signal to fail to clear and will not clear a signal for a different and undesired route. It frequently occurs, however, that a number of switches may be so located that one signal will control a plurality of routes and each route may be determined by the positions of a number of different switches. The number of switches may be so large that it is impracticable to provide code elements for all of them in a single code and as some of the switches may be infrequently used it is more efficient to control each switch or at most each pair of switches by a separate code.

In Fig. 11, I have illustrated a typical small interlocking including two main tracks, two sidings, two single switches 3W and 9W and two crossovers 5W and 7W. Switch 3W and signals 4RA, 4RB and 4L governing train movements over the lower track may be controlled by one code in the manner hereinbefore described in connection with the switch and signals of Fig. 9, and at the office, one panel and one office storage unit as shown in Fig. 5 and at the station one storage unit as illustrated in Fig. 7 may be used. Switch 9W and signals 10LA, 10LB and 10R may be controlled by another code in a similar manner. The crossover switches 5W and 7W may likewise be controlled by a single code in the same way but in this case, switch 7W will employ the signal control lever HK of the office panel and indication relays 12K and 14K, and at the station switch stick relays and associated apparatus as hereinbefore described will be connected to the station coding unit in place of signal stick relays. Referring now to Fig. 11, it is evident that when signal 4RA is clear, a train moving from left to right may accept a route having any one of three possible exits, which route has been established by the transmission of three different codes and that there are a total of nine possible routes in each direction.

One method of insuring correct operation of a plant of this character is for the operator to first transmit codes to place at stop any signal that may be cleared which conflicts with a route which he desires to set up, then transmit switch codes to set up the route, and then wait until he has received indications that all of the transmitted codes have become effective and that the desired operations have been completed before he transmits a code to clear the proper signal. This method, however, may result in train delays, or the acceptance by a train of an undesired route, if the operator clears the signal prematurely, or if he fails to note that a switch has failed to operate. I therefore provide additional circuits and apparatus as illustrated typically in Fig. 11 to facilitate the operation of switches and signals by so controlling the code starting circuits that a plurality of codes may be transmitted in a desired sequence and so that a signal will not be cleared unless the desired route is available. It is to be understood that each of the three panels illustrated includes all of the apparatus of the typical panel of Fig. 5, thus the left-hand panel includes a group of indication relays 113K, etc., similar to indication relays 13K, etc., of Fig. 5. The other two panels include similar groups of indication relays designated 213K, 313K, etc., respectively. The code numbers arbitrarily selected for the three panels are 345, 346 and 347, respectively. Contacts $c$ of each of the relays 345, 346 and 347 of Fig. 3 will therefore become closed when the starting key for the corresponding panel is momentarily closed. These contacts however, are not connected directly to terminal B as are contacts $c$ of the corresponding relays in Fig. 3, but are connected to terminal B, through front contacts of certain lever repeater relays described hereinafter and designated by the reference character P with appropriate prefixes, so that a code will not be transmitted when a starting key is closed unless the proper lever repeater relay is energized.

Each switch lever is provided with additional normal and reverse contacts $n^1$ and $r^1$, and each signal lever with additional left-hand and right-hand contacts $l^1$ and $r^1$ and a pair of contacts $n$ and $n^1$ for closing a circuit only when the lever is in the center or stop position.

Each switch lever such as 5WK or 7WK, controlling a switch governing routes employing one signal code when the switch is normal and a different signal code when the switch is reversed, is provided with a pair of lever repeater relays thus for example, switch lever 5WK has a pair of relays 5NP and 5RP. Relay 5NP has a circuit from terminal B, over normal contact $n^1$ of lever 5WK, contact $b$ of normal switch indication relay 213K for switch 5W and winding of relay 5NP to terminal C. It follows that 5NP is energized when the switch lever is normal and when the normal switch indication relay is energized, but becomes deenergized when switch lever 5WR is reversed in preparation to changing the route. If lever 5WK is moved from reverse to normal, relay 5NP becomes energized following the energization of 213K in response to the receipt of the normal switch indication. Relay 5RP is controlled in a similar manner by the reverse switch indication relay 215K and the reverse contact $r^1$ of lever 5WK.

Each switch lever, such as 3WK or 9WK, controlling a switch governing routes which employ the same signal code for both positions of the switch has but one repeater relay, thus for example, lever 3WK has a relay 3P, which has a circuit from terminal B, over contact $n^1$ of lever 3WK, contact $b$ of normal indication relay 113K for switch 3W and winding of relay 3P to terminal C, and another circuit from terminal B, over reverse contact $r^1$ of lever 3WK, contact $b$ of reverse indication relay 115K, and winding of relay 3P to terminal C, so that relay 3P is energized whenever the position of lever 3WK is in agreement with the indication of switch 3W, and becomes deenergized whenever the lever 3WK is moved in preparation for the transmission of a code to operate switch 3W.

Each signal lever, such as 4HK and 10HK is provided with a lever repeater relay which is energized when the signal lever is in the stop position and the signal indicates stop or a stop signal code has been transmitted, and is also energized when the signal lever is moved to the left or right provided a route is available, that is, provided the indication of each switch included in the route is in agreement with the position of the corresponding switch lever, the opposing signal lever is in the stop position and the opposing signal does not indicate clear. This last-named circuit is closed only when the starting relay of the corresponding panel is energized, and thus is opened as soon as a clear signal code is transmitted. Thus, for example, lever 4HK has a relay 4P, which has a circuit from terminal B, over contacts $n^1$ and $n$ of signal lever 4HK, contact $b$ of stop signal indication relay 110K for signals 4RA, 4RB and 4L, and winding of relay 4P to terminal C. Contact $b$ of relay 110K in this circuit is shunted by contact $b$ of relay 345, and by contact $a$ of relay 4P. It follows that 4P may be energized by moving lever 4HK to the stop position if the signals already indicate stop or if the starting key is operated to pick up starting relay 345 to transmit a stop signal code. If relays 110K and 345 then become deenergized, relay 4P will remain energized over the holding circuit including its front contact $a$ as long as the signal lever remains in the stop position. When relays 4P and 345 are energized, a starting circuit is closed from terminal B, over front contact $b$ of relay 4P, front contact $c$ of relay 345, thence over contact $h$ of relay 34G, as shown in Fig. 3, and as already described, to cause the transmission of a control code.

Relay 4P may also be energized when the left-hand contacts of signal lever 4H are closed provided a route is available so that signal 4L may be cleared. If switches 5W and 7W are normal and signals 4RA and 4RB are at stop, the clear indication relay 114K for the latter signals will be deenergized and a circuit will be closed from terminal B, over back contact $b$ of 114K, front contact $c$ of 7NP, contact $r^1$ of 4HK, front contacts $b$ of 5NP and 7NP, contact $l^1$ of 4HK, front contact $d$ of 345, and winding of relay 4P to terminal C so that 4P will become energized when the starting key is operated to pick up 345 to transmit a code to clear signal 4L and will complete the starting circuit. A similar circuit is closed if lever 4HK is operated to the opposite position to clear signal 4RA or 4RB. This circuit includes contact $l^1$, and contact $r^1$ of lever 4HK and back contact $b$ of indication relay 112K for signal 4L. It follows from the foregoing that when switches 7W and 5W and their levers are normal switch 3W and signals 4RB, 4RA or 4L may be operated by a single code in the manner already described in connection with the switch and signals of Fig. 9, with the exception that the operator is prevented from sending a code to clear a signal unless he first sends a code to put the opposing signal to stop if such opposing signal is clear. When switches 5W and 7W and their levers are normal, the operation of switch 9W and signals 10LR, 10LA and 10R is entirely independent of that of switch 3W and signals 4L, 4RA and 4RB and is similar thereto.

If, now, switch lever 5WK or switch 5W is reversed, the signal 4R can not be cleared because the circuit for 4P including front contact $r^1$ of lever 4HK wil be open at contact $b$ of 5NP. Signal 4L may be cleared provided a route is available over 5W reversed if signal 10R does not indicate clear so that its indication relay 314K is deenergized, and provided lever 10HK is not in its left-hand position. In this case 4P may be energized by a circuit from terminal B, over back contact $b$ of 314K, contact $r^1$ of 10HK, contacts $b$ of 5RP and 7NP, contact $l^1$ of 4HK, front contact $d$ of 345, and winding of relay 4P to terminal C. If 5W is normal and 7W is reversed, signal 4RA or 4RB may be cleared, provided switch 9W indicates normal or reverse, and signals 10LA or 10LB do not indicate clear and lever 10HK is not in the position to clear 10L. In this case 4P may be energized by a circuit from terminal B, over back contact $b$ of clear indication relay 312K for signal 10L, front contact $a$ of relay 9P, contact $l^1$ of lever 10HK, front contacts $b$ of 7RP and 5NP, contact $r^1$ of 4HK, front contact $d$ of 345, and winding of relay 4P to terminal C. Switch 3W, being controlled by the same code as signals 4L or 4R may be operated under any condition which permits the code to be sent to operate signals 4L, 4RA or 4RB. Thus, if switch 7W is normal, a code may be transmitted to reverse switch 3W and to clear signal 4L. The result of this code will be to first reverse the switch 3W, and to then clear the signal 4L. If switch 5W is reversed, switch 3W may be operated during a code transmitted to clear signal 4L but in this case the signal may clear as soon as the code is received, because the route which it governs does not include the switch 3W.

The starting circuit for transmitting codes to operate switches 5W or 7W is from terminal B, over front contacts $c$ of relays 4P and 10P, and starting relay 346, thence to contact $f$ of 34G as shown in Fig. 3 and as already described. It follows that the operator can not send a code to operate switch 5W or 7W unless all signals governing routes over these switches are at stop or codes have been transmitted to put them to stop. Relays 4P and 10P may be energized while codes are being transmitted to clear the signals, but this does not permit a code to be transmitted to operate switch 5W or 7W because these circuits will be opened by the release of the switch lever repeater relays as soon as one of the switch levers is moved.

I will now assume that all switches are normal and all signals are at stop as shown in the drawings and the operator desires to clear a route from signal 4RB to 10LB. To effect this operation, he reverses the levers 3WK, 7WK and 9WK, leaving signal levers 4HK and 10HK in the stop position, and presses the three starting keys to pick up the starting relays 345, 346 and 347. Relays 3P, 5NP, 5RP, 7NP, 7RP and 9P are now deenergized but relays 4P and 10P are energized so that the three codes will be transmitted in order. As soon as each code is transmitted the lights of the corresponding panel become extinguished and as soon as the code for operating switches 5W and 7W have been transmitted, the operator may operate lever 4HK to close contacts $r$ and $r^1$, and may then again operate the starting key to pick up 345. As soon as 7W reverses, an indication will be received to pick up 7RP and as soon as 9W reverses, an indication will be received to pick up 9P. When 7RP and 9P are both energized, relay 4P will pick up to transmit a code to clear signal 4RB and this code will become effective as soon as switch 3W has completed its movement to reverse in response to the first code transmitted. The operator is thus assured that a train accepting signal 4RB can only move into the siding past 10LB and not out over either of the main tracks due to a failure of one of the switch codes to be transmitted from the office, or to be received at the station, or due to the failure of one of the switches to operate.

If, now, the apparatus had been in the position shown in the drawings except that signal 10LA was clear, the procedure would have been exactly the same except that the operator would have moved lever 10HK to the stop position to pick up 10P in order to transmit switch codes to operate 7W and 9W and to put signal 10LA to stop. Although in Fig. 11 a relatively simple group of switches and signals is shown, it is obvious that the same principles may be employed to control extensive layouts such as are customarily found in large interlocking plants.

The arrangement of interlocked control panels shown in Fig. 11 may be modified in a number of ways within the scope of my invention. For example, the switch repeater relays, such as 5NP and 5RP may be omitted, and contacts of the switch indication relays such as 213K and 215K may be used in place of the contacts of the switch lever relays in the circuits controlling the signal lever repeater relays. Signal indication relays 110K and 310K may be used to control the switch code starting circuit in place of contacts c of 4P and 10P, with the result that the release of the switch code will follow the receipt of a stop signal indication instead of the sending of a stop signal control. Separate stop indication relays may be provided for each signal of a pair of opposing signals and front contacts of these relays employed in place of the back contacts b of the indication relays 112K and 114K. The important feature of which I have here illustrated but one modification is the interlocking of the control levers of a remote control machine through the medium of the circuits for initiating the transmission of controls and in accordance with the indications received from the controlled devices, in such manner that a series of controls will be transmitted in the proper order and the transmission of a control for performing the final operation of a series is made dependent upon the receipt of indications of the completion of preceding operations of the series.

Although I have herein shown and described only two forms of remote control apparatus embodying my invention, it is understood that various changes and modifications may be made therein within the scope of the appended claims without departing from the spirit and scope of my invention.

Having thus described my invention, what I claim is:

1. A centralized traffic controlling system for railroads comprising an office and a plurality of stations spaced at intervals along a stretch of railroad track and connected by a single line circuit, a coding unit at the office, and a coding unit at each of the stations, each adapted to send and receive code signals through the medium of the line circuit, a plurality of track sections at each station, each including a track switch, a signal for each section for governing train movements through the section, a plurality of station storage units controlled by each station coding unit including one for each of said track sections at the station, a plurality of office storage units controlled by the office coding unit including one for each station storage unit; switch and signal control levers, switch, signal and track indicators and a starting key for each office storage unit; means responsive to the operation of any starting key for simultaneously and selectively actuating corresponding office and station storage units through the medium of said coding units and line circuit to thereby operate a selected switch and signal in accordance with the positions of the control levers of the actuated office storage unit, and means responsive to a change in condition of a switch, signal, or track section at any station for simultaneously and selectively actuating corresponding office and station storage units through the medium of the coding units at the office and at said station and the intervening line circuit to thereby operate the indicators of the actuated office storage unit in accordance with the condition of said switch, signal, and track section.

2. In combination with a line relay capable of assuming two positions, means for operating said relay alternately to said two positions for selected time intervals, two timing devices, means for operating one said timing device when said relay remains in one said position for a predetermined time interval, means for operating the other timing device when said relay remains in the other said position for a predetermined time interval, a series of indicators, and means effective upon each operation of each said timing device to operate a different indicator in said series.

3. In combination with a relay capable of assuming two positions, means for operating said relay alternately to said two positions for selected time intervals, two timing devices one arranged to commence its operation when the relay is moved to one said position and provided with a contact closed if the relay remains in such one position for a predetermined time interval and the other arranged to commence its operation when the relay is moved to the other said position and provided with a contact closed if the relay remains in such other position for a predetermined time interval, a series of indicators, and means effective upon the closing of each said contact to operate one of said indicators.

4. In combination with a first relay arranged to be energized and deenergized for selected time intervals, two slow acting relays one controlled by a front contact and the other by a back contact of said first relay, a series of indicators, and means effective upon each operation of each of said slow acting relays to operate a different indicator in said series.

5. In combination with a first relay arranged to be energized and deenergized for selected time intervals, two slow releasing relays, an energizing circuit for one of said slow releasing relays including a front contact of said first relay, an energizing circuit for the other slow releasing relay including a back contact of said first relay, a series of indicators, and means effective upon each closing of a back contact of each slow releasing relay for operating a different one of said indicators.

6. In combination with a line relay capable of assuming two positions, means for operating said relay alternately to said two positions for selected time intervals, two timing devices, means for operating one said timing device when said relay remains in one said position for a predetermined time interval, means for operating the other timing device when said relay remains in the other said position for a predetermined time interval, a series of contacts, means for operating the contacts of said series successively in response to said alternate operation of said relay, a series of register relays, means for controlling certain of said register relays by one said timing device and by particular ones of said contacts, and means for controlling the remaining register relays by the other timing device and by others of said contacts.

7. In combination with a line relay capable of assuming two positions, means for operating said relay alternately to said two positions for selected time intervals, two timing devices, means for operating one said timing device when said relay remains in one said position for a predetermined time interval, means for operating the other timing device when said relay remains in the other said position for a predetermined time interval, a series of contacts, means for operating the contacts of said series successively in response to said alternate operation of said relay, a series of register relays, one for each contact of said series, means for controlling each odd-numbered register relay by the associated contact of said series, and by one of said timing devices, and means for controlling each even-numbered register relay by the associated contact of said series and by the other said timing device.

8. In combination with a line relay capable of assuming two positions, means for operating said relay alternately to said two positions for selected time intervals, two timing devices, means for operating one said timing device when said relay remains in one said position for a predetermined time interval, means for operating the other timing device when said relay remains in the other said position for a predetermined time interval, a chain of counting relays, means for operating the relays of said chain successively in response to said alternate operation of said line relay, a series of register relays each allocated to a particular counting relay, means for controlling each odd-numbered register relay by one said timing device and by the corresponding counting relay, and means for controlling each even-numbered register relay by the corresponding counting relay and by the other timing device.

9. In combination with a line relay capable of assuming two positions, means for operating said relay alternately to said two positions for selected time intervals, two timing devices, means for operating one said timing device when said relay remains in one said position for a predetermined time interval, means for operating the other timing device when said relay remains in the other said position for a predetermined time interval, a series of indicators, means effective upon each operation of each said timing device to operate one of said indicators, and means controlled by both said timing devices for subsequently holding each operated indicator in its operated condition.

10. In combination with a line relay capable of assuming two positions, means for operating said relay alternately to said two positions for selected time intervals, two timing devices, means for operating one said timing device when said relay remains in one said position for a predetermined time interval, means for operating the other timing device when said relay remains in the other said position for a predetermined time interval, a chain of counting relays, means for operating the relays of said chain successively in response to said alternate operation of said line relay, a series of register relays each allocated to a particular counting relay, means for controlling each odd-numbered register relay by one said timing device and by the corresponding counting relay, means for controlling each even-numbered register relay by the corresponding counting relay and by the other timing device, and a stick circuit for each said register relay controlled by the last counting relay in said chain.

11. In combination with a line relay and means for energizing and deenergizing such line relay for selected time intervals, two timing devices for separately measuring the time intervals during which said line relay is energized and deenergized respectively, a chain of counting relays, means responsive to repeated energization and deenergization of said line relay for successively operating the relays of said chain, a plurality of indicators, and means effective when either timing device indicates that the line relay has remained in the corresponding condition for more than a predetermined time interval for actuating a selected one of said indicators depending upon the particular counting relay of said chain then operated.

12. Code transmitting apparatus comprising a transmitting relay, means for transmitting consecutive code elements in response to repeated energizations and deenergizations of said relay, means for intermittently energizing said relay, means for at times maintaining said relay energized to prolong certain of said code elements, and means for at times preventing said relay from picking up to prolong certain others of said code elements.

13. Code transmitting apparatus comprising a transmitting relay capable of assuming two positions, means for transmitting a code element in response to operations of said relay to either said position, means for operating said relay alternately to said two positions to produce a series of code elements, and means for at times holding said relay in either said position to prolong certain elements of said series.

14. In combination with a line circuit, a transmitting relay, means effective when said relay is energized for deenergizing said relay, means effective when said relay is deenergized to transmit a code element to said line circuit, means effective when said relay is deenergized to reenergize said relay to terminate said code element, and means for at times short circuiting the winding of said relay to prolong certain of said code elements.

15. In combination with a transmitting relay and a line circuit controlled by said transmitting relay, a line relay included in said line circuit, means for repeatedly energizing and deenergizing said transmitting relay to produce successive code elements in said line circuit, and means controlled by said line relay for at times delaying the energization of said transmitting relay to prolong at least one of said code elements.

16. In combination with a transmitting relay and a line circuit controlled by said transmitting relay, a line relay included in said line circuit, an operating circuit for said transmitting relay, means for repeatedly interrupting said operating circuit to produce successive code elements in said line circuit, and means controlled by said line relay for at times delaying the operation of said transmitting relay after said operating circuit is closed to prolong at least one of said code elements.

17. In combination with a transmitting relay and a line circuit controlled by said transmitting relay, a line relay included in said line circuit, means for repeatedly energizing and deenergizing said transmitting relay to produce successive code elements in said line circuit, a series of contacts, means for actuating said contacts in order in response to consecutive operations of said line relay, and means controlled selectively by said contacts for at times delaying the energization of said transmitting relay to prolong at least one of said code elements.

18. In combination with a line circuit, a normally deenergized transmitting relay for controlling said line circuit, a line relay included in said line circuit, a series of normally closed contacts arranged to be opened one at a time in order by consecutive operations of said line relay, an operating circuit for said transmitting relay including said contacts in series, whereby the transmitting relay is intermittently energized to produce successive code elements in said line circuit, and means for at times delaying operation of said transmitting relay after said operating circuit is closed to prolong at least one of said code elements.

19. In combination with a normally closed line circuit, a line relay included in said line circuit, a transmitting relay having a back contact included in said line circuit, a series of counting relays, means for energizing and releasing said counting relays in order in response to repeated operations of said line relay, an operating circuit for said transmitting relay including back contacts of a plurality of said counting relays in series, and means for at times delaying the operation of said transmitting relay after said operating circuit is closed.

20. In combination with a line circuit including a line relay, a transmitting relay having a contact included in said line circuit, a series of counting relays, means responsive to repeated operations of said line relay for energizing said counting relays one at a time in order, the pick-up circuits for alternate counting relays including a contact of the line relay closed in one position and the pick-up circuits for the remaining counting relays including a contact of the line relay closed in another position, an operating circuit for said transmitting relay including back contacts of said alternate counting relays, means for at times holding said transmitting relay energized independently of said operating circuit, and means for at times preventing operation of said transmitting relay while said operating circuit is closed.

21. In combination with a line circuit including a line relay, a transmitting relay having a contact included in said line circuit, a series of counting relays, means responsive to repeated operations of said line relay for energizing said counting relays one at a time in order, the pick-up circuits for alternate counting relays including a contact of the line relay closed in one position and the pick-up circuits for the remaining counting relays including a contact of the line relay closed in another position, an operating circuit for said transmitting relay including back contacts of said alternate counting relays, means controlled by front contacts of selected ones of said alternate counting relays for at times holding said transmitting relay energized, and means controlled by front contacts of selected ones of the remaining counting relays for at times preventing operation of said transmitting relay while said operating circuit is closed.

22. In combination with a transmitting relay and a line circuit controlled by said relay, an operating circuit for said transmitting relay, means for repeatedly interrupting said operating circuit to produce successive code elements in said line circuit, and means for at times equalizing the potentials on the two sides of said transmitting relay to prevent its energization and thereby prolong at least one of said code elements.

23. In combination with a transmitting relay and a line circuit controlled by said relay, a line relay included in said line circuit, an operating circuit for said transmitting relay, means for repeatedly interrupting said operating circuit to produce successive code elements in said line circuit, and means controlled by said line relay for at times equalizing the potentials on the two sides of said transmitting relay to prolong at least one of said code elements.

24. In combination with a transmitting relay and a line circuit controlled by said relay, a line relay included in said line circuit, a timing device controlled by said line relay, an operating circuit for said transmitting relay, means for repeatedly interrupting said operating circuit to produce successive code elements in said line circuit, and means controlled by said timing device for at times equalizing the potentials on the two sides of said transmitting relay to prolong at least one of said code elements.

25. In combination with a transmitting relay and a line circuit controlled by said relay, a line relay included in said line circuit, two timing devices controlled by front and back contacts respectively of said line relay, an operating circuit for said transmitting relay, means for repeatedly interrupting said operating circuit to produce successive code elements in said line circuit, means controlled by one said timing device for holding said transmitting relay energized to prolong at least one of said code elements, and means controlled by the other timing device for at times delaying operation of said transmitting relay by said operating circuit to prolong another of said code elements.

26. In combination with a transmitting relay and a line circuit controlled by said relay, a line relay included in said line circuit, a timing device controlled by said line relay, an operating circuit for said transmitting relay, means for repeatedly interrupting said operating circuit to produce successive code elements in said line circuit, means controlled by said timing device for at times holding said transmitting relay to prolong at least one of said code elements, and means controlled by said timing device for at times delaying operation of said transmitting relay by said operating circuit to prolong another of said code elements.

27. In combination with a transmitting relay and a line circuit including a contact of said transmitting relay, an operating circuit for said transmitting relay, means for repeatedly interrupting said operating circuit to produce successive code elements in said line circuit, and means including a back contact of said transmitting relay for at times preventing energization of said transmitting relay by said operating circuit to prolong at least one of said code elements.

28. In combination with a transmitting relay and a line circuit including a back contact of said transmitting relay, a line relay included in said line circuit, a chain of counting relays, means for operating said counting relays one at a time in sequence in response to repeated operations of said line relay, a pick-up circuit for said transmitting relay including back contacts of alternate ones of said counting relays, code selecting means for establishing a plurality of holding circuits for said transmitting relay each including a front contact of a selected one of said counting relays, and means also controlled by said code selecting means and by selected ones of said counting relays for preventing the energization of said transmitting relay after said pick-up circuit is closed.

29. In combination with a transmitting relay and a line circuit including a back contact of said transmitting relay, a line relay included in said line circuit, a chain of counting relays, means for operating said relays one at a time in sequence in response to repeated operations of said line relay, a pick-up circuit for said transmitting relay including back contacts of alternate ones of said counting relays, means for establishing a plurality of holding circuits for maintaining the transmitting relay energized and each of which includes a front contact of said transmitting relay and a front contact of a selected one of said contacts, and means for establishing a plurality of other holding circuits for preventing energization of said transmitting relay and each including a back contact of the transmitting relay and a front contact of a selected one of said counting relays.

30. In combination, a relay having a main circuit adapted to be energized and deenergized by the closing and opening of a control contact, a first branch for said main circuit in parallel with said control contact and including a front contact of the relay, said first branch operating to hold the relay energized when said control contact becomes opened, another branch for said main circuit in parallel with the winding of the relay and including a back contact of the relay, said other branch operating to hold the relay deenergized when said control contact becomes closed, and means for selectively closing said branch circuits.

31. In combination, a relay having a main circuit adapted to be energized and deenergized by the closing and opening of a control contact, two auxiliary contacts, a first branch for said main circuit in parallel with said control contact and including one of said auxiliary contacts and a front contact of the relay, said first branch operating to hold the relay energized when said control contact becomes opened until the auxiliary contact is opened, and another branch for said main circuit in parallel with the winding of the relay and including the other of said auxiliary contacts and a back contact of the relay, said other branch operating to hold the relay deenergized when said control contact becomes closed until said other auxiliary contact is opened.

32. In combination with a control relay, a selector of the relay type adapted to be operated by said control relay and comprising a series of counting relays interconnected to permit successive energization of the relays; a pick-up circuit for each said counting relay including a contact of the control relay, a front contact of the next preceding counting relay and a back contact of the second preceding counting relay; and a holding circuit for each said counting relay including a contact of the control relay and a back contact of the next succeeding counting relay.

33. In combination with a control relay, a selector of the relay type adapted to be operated by said control relay and comprising a series of counting relays interconnected to permit successive energization of the relays; a pick-up circuit for each said counting relay including a contact of the control relay, a front contact of the next preceding counting relay and a back contact of the second preceding counting relay; a holding circuit for each said counting relay including a contact of the control relay, and a back contact of the next succeeding counting relay; and means for actuating said control relay to energize said circuits in order.

34. In combination with a line relay controlled from a remote point, a selector of the relay type comprising a plurality of counting relays arranged in order, a pick-up circuit for each counting relay each except the first including a front contact of the next preceding counting relay and each except the first and second including also a back contact of the second preceding counting relay, a pick-up circuit for the first counting relay including a front contact of the last counting relay and a back contact of the counting relay preceding the last relay, a pick-up circuit for the second counting relay including a front contact of the first counting relay and a back contact of the last counting relay, a holding circuit for each counting relay each except the last including a back contact of the next succeeding counting relay, a holding circuit for the last counting relay including a back contact of the first counting relay, and means controlled by said line relay for picking up the first relay and for then briefly energizing said pick-up circuits in order.

35. A selector of the relay type comprising a control relay, a plurality of counting relays arranged in order, a pick-up circuit for the first counting relay; a pick-up circuit for each odd-numbered counting relay except the first including a front contact of the next preceding counting relay, a back contact of the second preceding counting relay, and a contact of the control relay closed in one position; a pick-up circuit for each even-numbered counting relay including a contact of said control relay closed in another position, a front contact of the next preceding counting relay and for each counting relay except the second, a back contact of the second preceding counting relay; and a stick circuit for each said counting relay each except the first including a back contact of the next succeeding counting relay and a contact of said control relay.

36. A selector of the counting relay type comprising a control relay, a plurality of counting relays arranged in order, a pick-up circuit for the first counting relay; a pick-up circuit for each odd-numbered counting relay except the first including a front contact of the next preceding counting relay, a back contact of the second preceding counting relay, and a contact of the control relay closed in one position; a pick-up circuit for each even-numbered counting relay including a contact of said control relay closed in another position, a front contact of the next preceding counting relay and for each counting relay except the second, a back contact of the second preceding counting relay; a stick circuit for each odd-numbered counting relay including a back contact of the next succeeding counting relay and a contact of said control relay closed in said one position, and a stick circuit for each even-numbered counting relay except the first counting relay including a back contact of the next succeeding counting relay and a contact of said control relay closed in said other position.

37. A selector of the relay type comprising a control relay, a plurality of counting relays arranged in order, a pick-up circuit for each counting relay, means controlled by said control relay for closing said pick-up circuits in order, a stick circuit for each counting relay controlled by said control relay, and a holding circuit for each counting relay except the final relay including an asymmetric unit and a contact of the next succeeding counting relay.

38. A selector of the relay type comprising a control relay, a plurality of counting relays arranged in order, a pick-up circuit for each counting relay, means controlled by said control relay for closing said pick-up circuits in order, a stick circuit for each counting relay controlled by said control relay; and a holding circuit for each counting relay except the final relay including its own front contact, a back contact of the next succeeding counting relay and an asymmetric unit connected in such direction as to provide a low resistance discharge path, whereby current continues to flow in each said counting relay after the opening of the corresponding stick circuit until the next succeeding counting relay picks up.

39. Means for closing a series of contacts consecutively in response to repeated operations of a control relay having a pair of contacts closed alternately, comprising, a series of counting relays, a pick-up circuit for the first counting relay including a contact of said control relay, a pick-up circuit for each of said counting relays except the first, including a contact of said control relay and a front contact of the next preceding counting relay, a stick circuit for each counting relay including a contact of said control relay, and a holding circuit for each counting relay except the final relay including a back contact of the next succeeding counting relay, and an asymmetric unit connected in such direction as to provide a discharge path for each said relay including the winding of the relay through which current may continue to flow after the corresponding stick circuit is opened.

40. A selector of the relay type comprising a control relay, a series of counting relays arranged in order, means controlled by said control relay for operating the counting relays of said series successively through one cycle, means effective when the last counting relay of said series is operated to operate the first counting relay on the next operation of the control relay to initiate a second cycle of operation of the counting relays, an additional relay, and means for substituting said additional relay for one relay of said series during such second cycle of operation.

41. A selector of the relay type comprising a control relay, a series of counting relays arranged in order, means controlled by said control relay for operating the counting relays of said series successively through one cycle, means effective when the last counting relay of said series is operated to operate the first counting relay on the next operation of the control relay to initiate a second cycle of operation of the counting relays, an additional relay, and means controlled by said counting relays for substituting the additional relay for one counting relay of said series during such second cycle of operation.

42. Receiving apparatus for a remote control system of the code type comprising a control relay operated in accordance with the received code, a chain of counting relays arranged in order, each relay of said chain being adapted when operated to condition the next succeeding relay for operation, means controlled by said control relay for operating the counting relays of said chain successively through one cycle, means controlled by the last relay of said chain for initiating a second cycle of operation of said chain by said control relay, an additional relay, and means for substituting said additional relay for one relay of said chain during said second cycle of operation.

43. Means for sparklessly interrupting the flow of current through an inductive winding in response to the opening of a contact for controlling said current; comprising a circuit including a winding, a control contact and a source of current; a branch for said circuit including an asymmetric unit shunted around the control contact and source and connected in such direction as to provide a low resistance discharge path for the inductive energy of the winding when the control contact is opened, a relay having a back contact in the branch circuit, and means for opening the control circuit and for then energizing the relay to open the branch circuit.

44. Means for controlling the current in a first relay connected to a direct current source by a control contact, comprising an auxiliary relay; a branch circuit including a front contact of said first relay, an asymmetric unit and a contact of said auxiliary relay, said branch circuit being closed when said first relay is energized, and providing a low resistance discharge path for the inductive energy in said relay when said control contact is opened, means for opening said control contact to disconnect said source from said first relay, and means for actuating said auxiliary relay to interrupt the current in said first relay a predetermined time after said control contact is opened.

45. In combination with a slow release relay, a supply circuit for the relay including a source of energy, a discharge circuit for the relay including an asymmetric unit for providing a low resistance path permitting the continued flow of current to maintain the relay in the energized position after the supply circuit is opened, control means for opening the supply circuit, and means controlled by said control means for subsequently opening the discharge circuit to cause the release of the relay.

46. A code selector comprising a chain of counting relays and a control relay, means responsive to the first operation of the control relay to operate the first chain relay, means effective when each chain relay is operated to condition the next succeeding chain relay for operation by said control relay, two series of register relays, means controlled by the chain relays for energizing selected register relays of one said series during the first cycle of operation of said chain, means controlled by said one series of register relays and by the last chain relay when operated for conditioning the first chain relay to start a second cycle of operation of the chain, a repeat relay controlled by said one series of register relays and by the first chain relay, and means controlled by said repeat relay and by said chain relays for energizing selected register relays of the second series during the second cycle of operation of the chain relays.

47. A code selector comprising a chain of counting relays and a control relay, means responsive to the first operation of the control relay to operate the first chain relay, means effective when each chain relay is operated to condition the next succeeding chain relay for operation by said control relay, two series of register relays, means for energizing selected register relays of one said series during the first cycle of operation of said chain, means effective only when said selected register relays of said one series are energized and responsive to the operation of the last chain relay for conditioning the first relay of the chain for operation to initiate a second cycle of operation of the chain, and means controlled by said chain for energizing selected relays of said second series during said second cycle.

48. A code selector comprising a chain of counting relays and a control relay, means responsive to the first operation of the control relay to operate the first chain relay, means effective when each chain relay is operated to condition the next succeeding chain relay for operation by said control relay, two series of code register relays, means for energizing selected register relays of one said series during the first cycle of operation of said chain, means effective upon the energization of the last chain relay to condition the first relay of the chain for a second operation, a repeat relay, means for operating said repeat relay upon such second operation of said first relay, means effective only when said repeat relay is operated to operate the remaining relays of said chain through a second cycle, and means for energizing selected register relays of the second series during such second cycle.

49. Code receiving apparatus comprising a series of contacts, means for closing said contacts one at a time in sequence one for each code element received, selectors adapted to be energized over circuits including said contacts when code elements of a particular character are received including a first selector for each said contact except the last, and a group of second selectors for each first selector, each group including a second selector for each said contact succeeding the one for the corresponding first selector, means for connecting each first selector to its contact to permit selective energization thereof, means effective when a first selector becomes energized for disconnecting all first selectors from said contacts and for connecting the corresponding selected group of second selectors to the succeeding contacts of said series to permit the selective energization of the selectors of said selected group, and means effective when a second selector beomes energized for disconnecting said selected group of selectors from said contacts.

50. Code receiving apparatus comprising a series of contacts, means for closing said contacts one at a time in sequence one for each code element received, selectors adapted to be energized over circuits including said contacts when code elements of a particular character are received including a first selector for each said contact except the last two contacts, a group of second selectors for each said first selector each group including a second selector for each said contact succeeding the one for the corresponding first selector except the last one, a sub-group of final selectors for each second selector each sub-group including a final selector for each said contact succeeding the one for the corresponding second selector, means for connecting each first selector to its contact to permit selective energization thereof, means effective when a first selector becomes energized for disconnecting all first selectors from said contacts and for connecting the corresponding group of second selectors to the succeeding contacts of said series to permit selective energization thereof, means effective when a second selector becomes energized for disconnecting said group of selectors from said contacts and for connecting the corresponding sub-group of final selectors to the then remaining contacts to permit selective energization thereof, and means effective when a final selector becomes energized for disconnecting said sub-group from said contacts.

51. Code receiving apparatus responsive to codes of elements of which selected ones have a particular character, comprising a series of contacts one for each code element, means for closing said contacts one at a time in sequence each when a code element is received, a plurality of series of selectors those of each series being adapted to be energized each over a different contact when the code element corresponding to that contact is of said particular character, means for initially connecting the first selector of one series to one contact of said series and other first selectors to preceding contacts, means responsive to the energization of one of the other first selectors for disconnecting the first selector of the one series from said one contact and for connecting the second selector of the series of the other first selector to said one contact.

52. Code receiving apparatus responsive to codes of elements of which selected ones have a particular character comprising a series of contacts one for each code element, means for closing said contacts one at a time in sequence each when a code element is received, a plurality of series of selectors those of each series being adapted to be energized each over a different contact when the code element corresponding to that contact is of said particular character, means for initially connecting the first selector of one series to one contact of said series and other first selectors to preceding contacts, and means responsive to each energization of a selector over a contact preceding said one contact in the series for disconnecting the selector then connected to said one contact and for connecting the next succeeding selector of a different series to said one contact.

53. Code receiving apparatus responsive to codes of elements of which selected ones have a particular character, comprising a series of contacts one for each code element, means for closing said contacts one at a time in sequence each when a code element is received, a plurality of series of selectors those of each series being adapted to be energized each over a different contact when the code element corresponding to that contact is of particular character, means for initially connecting a plurality of first selectors to a plurality of said contacts, means responsive to the energization of any selector except a final selector of a series for connecting the next selectors of each series of which it forms a part to the succeeding contacts in place of the selectors that were connected to said contacts when said selector became energized.

54. Code receiving apparatus responsive to codes of elements of which selected ones have a particular character comprising a series of contacts one for each code element, means for closing said contacts one at a time in sequence each when a code element is received, a plurality of series of selectors those of each series being adapted to be received each over a different contact when the code element corresponding to that contact is of said particular character, and means controlled by said selectors and rendered effective when any contact of said series becomes closed for rendering all succeeding contacts of such series available for the energization of certain of said selectors but not for the energization of certain other selectors.

55. A code receiver comprising a series of contacts adapted to be closed one at a time in sequence to register consecutive code elements, a plurality of series of selectors to register code elements of selected character, a relay controlled by the first contact of said series, a pick-up circuit for the first selector of each of said series controlled by a selected one of said contacts and by said first relay, means effective when the first relay of any series is energized for releasing said first relay, a pick-up circuit for each remaining selector of each series controlled by a selected one of said contacts and by the next preceding selector of the same series, means effective when any of said remaining selectors is energized for releasing said next preceding selector, and means effective when the final selector of any series is energized for controlling said series of contacts to permit the registration of the remaining elements of the code.

56. Code transmitting apparatus comprising a transmitter for forming different codes each including consecutive code elements, a plurality of starting contacts comprising only one for each code, means for closing any of said contacts, starting circuits including said starting contacts normally effective when any starting contact becomes closed for starting the transmitter, transmitter control circuits rendered effective if a closed starting contact is connected to the transmitter to cause a code element to have a particular character, selecting means controlled by the transmitter for repeatedly connecting the closed starting contact to the transmitter to form a distinctive code, characteristic of said starting contact, said selecting means being so arranged that if a plurality of starting contacts are closed at the same time the corresponding codes will be transmitted one at a time in order, and means effective when a code is completed for opening the starting contact which controlled its transmission.

57. Code transmitting apparatus comprising a transmitter for forming consecutive code elements, a plurality of starting contacts one for each code, means for closing any of said contacts, means effective when any starting contact becomes closed for starting the transmitter, means effective if a closed starting contact is connected to the transmitter to cause a code element to have a particular character, means controlled by the transmitter for repeatedly connecting the closed starting contact to the transmitter to form a code; said means being so arranged that at first different groups of starting contacts then different sub-groups, and finally different contacts are connected to the transmitter in turn, in each case until the closed contact, the group, or sub-group containing the closed contact becomes connected; and means effective when a code is completed for opening the starting contact which controlled its transmission.

58. Code transmitting apparatus comprising a transmitter for forming consecutive code elements, a plurality of starting contacts comprising only one for each code, means for closing any of said contacts, starting circuits including said contacts and effective when any starting contact becomes closed for starting the transmitter, a plurality of code determining circuits for each code, each including the corresponding starting contact and effective when closed to control the transmitter to cause a code element to have a particular character, code registering means controlled by said transmitter for registering each transmitted code, and means controlled by said code registering means for completing the code determining circuits including said closed contact one at a time in order to repeatedly control said transmitter to form the code corresponding to said contact.

59. Code transmitting apparatus comprising a transmitter for forming consecutive code elements, a plurality of starting contacts one for each code, means for closing any of said contacts, means effective when any starting contact becomes closed for starting the transmitter, means effective if a closed starting contact is connected to the transmitter to cause a code element to have a particular character, a circuit including said contact and effective when the transmitter is started for initiating the first element of particular character of the code corresponding to said contact, means controlled by said transmitter for registering each transmitted code, means controlled by the code registering means for terminating each element of particular character of a code when said element is registered by said means, a circuit controlled by the code registering means and including said contact for initiating the next succeeding element of particular character in the code corresponding to said contact, and means effective when the final element of particular character in the code corresponding to said contact is registered for opening said contact.

60. Code transmitting apparatus comprising a transmitter for forming consecutive code elements, a plurality of starting contacts comprising only one for each code, means for closing any of said contacts, a series of contacts adapted to be closed one at a time to register consecutive code elements, a plurality of code determining circuits, one for each code, each including an independent connection to one terminal of a source of current over a different one of said starting contacts, each of said circuits having a plurality of branches, starting means included in one branch of each of said circuits rendered effective when any starting contact becomes closed to start the transmitter, and to render each remaining branch of the circuit including said closed starting contact available to control the transmitter to cause a code element to have a particular character in accordance with the code corresponding to said contact, and means controlled by the transmitter for successively completing the branches of the circuit including said closed starting contact to control said transmitter, each branch being completed over a different contact of said series to form the code corresponding to said contact.

61. Code transmitting apparatus comprising a transmitter for forming consecutive code elements, a plurality of starting contacts comprising only one for each code, means for closing any of said contacts, a series of contacts adapted to be closed one at a time to register consecutive code elements, starting circuits including said starting contacts normally effective when any starting contact becomes closed to start the transmitter, transmitter control circuits effective if a closed starting contact becomes connected to the transmitter to cause a code element to have a particular character, means controlled by the transmitter for connecting the closed starting contact to the transmitter over one of said contacts to form the first element of particular character, selecting means selectively responsive to a code element of particular character to connect said starting contact to the transmitter over a succeeding contact of said series to form a succeeding element of particular character, and means responsive to the final element of particular character for opening said starting contact.

62. Code transmitting apparatus comprising a transmitter for forming consecutive code elements, a plurality of starting contacts one for each code, means for closing any of said contacts, a series of contacts adapted to be closed one at a time to register consecutive code elements, means effective when any starting contact becomes closed to start the transmitter, means effective if a closed starting contact becomes connected to the transmitter to cause a code element to have a particular character, means controlled by the transmitter for connecting said closed starting contact to the transmitter repeatedly over different ones of said contacts to form a code, said means being effective to simultaneously connect a plurality of other starting contacts to said transmitter each over a different one of said contacts, and means responsive to the control of said transmitter by said closed contact for preventing the control of said transmitter by any other starting contact connected to a succeeding contact of said series even though said other contact is closed.

63. In a remote control system comprising a line circuit including a line relay, means for at times opening and closing said line circuit to produce a series of code elements, means for prolonging selected ones of said elements, a bridging relay arranged to be energized when said line relay is receiving said code elements, two slow release relays each having a retardation time less than said prolonged elements but greater than the elements which are not prolonged; a pick-up circuit for the first slow release relay controlled by back contacts of the line relay, of the second slow release relay and of the bridging relay; a holding circuit for the first slow release relay controlled by front contacts of the line relay and of the bridging relay, a pick-up circuit for the second slow release relay controlled by a back contact of the line relay and a front contact of the first slow release relay, a holding circuit for the second slow release relay controlled by its own front contact and a back contact of the line relay, a circuit for the bridging relay controlled by front contacts of the two slow release relays, and register means selectively controlled during prolonged code elements when said line relay is open by said first slow release relay, and when said line relay is closed by said second slow release relay.

64. In combination with a line circuit, a code transmitter comprising a line relay included in said line circuit, a transmitting relay for periodically controlling said line circuit to actuate said lien relay, a series of counting relays, means controlled by said line relay for actuating said counting relays in order in response to consecutive operations of said line relay, a slow release bridging relay adapted to pick up when the line relay is deenergized and to remain picked up only if the line relay is actuated repeatedly, a control circuit for said transmitting relay including back contacts of a plurality of said counting relays in series, and a branch for said control circuit comprising a back contact of said bridging relay in parallel with the contact of the first said counting relay, whereby said transmitter is held when first energized until such first counting relay and the bridging relay become picked up.

65. A remote indication system for railroads comprising an office and a plurality of stations each adapted to transmit indications of track conditions to said office and including at said office a register relay for registering a received "track occupied" indication, a plurality of delivery relays at the office one for each station, an audible signal, a plurality of indication relays at the office one for each indication to be received from a station, and a visual indicator for each indication relay, a pick-up circuit for each indication relay including a front contact of the register relay and a front contact of an individual delivery relay, a holding circuit for each indication relay including its own front contact and a back contact of said individual delivery relay, a plurality of circuits for the audible signal all including a front contact of the register relay and each including a front contact of a delivery relay and a back contact of the corresponding indication relay, means effective when a "track occupied" indication is received from a station to energize the register relay and the delivery relay corresponding to such tsation to momentarily actuate said audible signal and to them pick up said indication relay, means for energizing said delivery relay but not said register relay to release said indication relay when a "track clear" indication is received, and means for energizing the visual indicator continuously when the indication relay is energized.

66. In combination, transmitting means for delivering a code comprising a series of elements arranged in a selected pattern in two groups, a receiver responsive to said code and including a plurality of selector relays, a group of stick relays for each selector relay each having a pick-up circuit and a stick circuit, a delivery relay for each selector relay, means effective when the receiver is supplied with one group of elements of the code for energizing a selected one of the selector relays in accordance with the code pattern of said one group of elements, means controlled by the energized selector relay and effective at the end of the code for momentarily energizing the corresponding delivery relay, and means controlled by such delivery relay for opening the stick circuit of each stick relay of the corresponding group and for simultaneously closing the pick-up circuits of selected relays of said group in accordance with the code pattern of a second group of elements of the code and for then closing the stick circuits of each energized stick relay to hold said selected relays energized.

67. In combination, transmitting means for delivering a code comprising a series of elements arranged in a selected pattern in two groups, a receiver responsive to said code and including a plurality of selector relays, a group of stick relays for each selector relay each having a pick-up circuit and a stick circuit, means effective when the receiver is supplied with one group of elements of the code for energizing a selected one of the selector relays in accordance with the code pattern of said one group of elements, a series of bus wires, means effective when the receiver is supplied with a second group of elements of the code for energizing selected ones of said bus wires in accordance with the code pattern of a second group of elements of the code, and means effective at the end of the code for opening the stick circuit of each stick relay of the group corresponding to the energized selector relay and for connecting each stick relay of said group momentarily to a bus wire to energize its pick-up circuit provided the corresponding bus wire is energized and for then closing the stick circuit of each stick relay which becomes energized.

68. In combination, transmitting means for delivering code seach comprising a series of elements arrahnged in a selected pattern in two groups, a receiver responsive to said code and including a plurality of delivery relays and a group of indication relays for each of said delivery relays, means effective at the end of a code for energizing a selected one of said delivery relays provided the receiver has been supplied with one group of code elements selectively arranged in accordance with a particular pattern, and means effective when the selected delivery relay is energized for selectively energizing the indication relays of a selected group in accordance with the code pattern of a second group of elements in the code.

69. In combination, transmitting means for delivering codes each comprising a series of elements arranged in a selected pattern in two groups, a receiver responsive to said code and including a plurality of selector relays, a plurality of delivery relays, one for each selector relay, and a plurality of groups of indication relays one for each delivery relay, means effective when the receiver is supplied with one group of elements of a code for selectively energizing one of the selector relays provided said one group of elements is arranged in accordance with a particular code pattern, means effective if a selector relay is energized for energizing the corresponding delivery relay at the end of the code, and means effective when a delivery relay is energized for selectively energizing the indication relays of a selected group in accordance with the code pattern of a second group of elements in the code.

70. In combination, transmitting means for delivering codes each comprising a series of elements arranged in a selected pattern in two groups, a receiver responsive to said code and including a plurality of selector relays, a plurality of delivery relays one for each selector relay, and a plurality of groups of indication relays, means for energizing a selected one of the selector relays in accordance with the pattern of the code elements in one group of elements of a received code, means effective when the receiver is supplied with a second group of code elements for preparing circuits for the control of the indication relays in accordance with the code pattern of the elements of said second group, means effective when the receiver has been supplied with the final element of the code provided a selector relay is then energized for energizing a selected one of the delivery relays, and means effective when said delivery relay is energized for completing the prepared circuits to energize selected indication relays of a selected group.

71. In combination, transmitting means for delivering codes each comprising a series of elements arranged in a selected pattern in two groups, a receiver responsive to said code and including a first selector relay, a plurality of second selector relays, and a plurality of delivery relays, one for each of the second selector relays, a plurality of groups of devices each adapted to be controlled by the receiver, means effective when the receiver is supplied with the first element of a code for energizing the first selector relay, means effective when the receiver is supplied with a first group of code elements for energizing one of the second selector relays provided said elements are arranged in a particular code pattern, means effective when any second selector relay is energized for causing the receiver to be responsive to a second group of code elements, means controlled by the first and second selector relays and effective when the receiver has been supplied with the final element of the code for energizing a selected one of the delivery relays, and means effective when a delivery relay is energized for controlling each device in a selected group in accordance with the code pattern of the second group of elements.

72. In a remote control system of the code type, an office and a station, transmitting means at the station for delivering a code to the office, means for stopping said transmitting means upon completion of a code, and locking means at the station effective upon failure of said stopping means to disable the transmitting means for a measured time interval.

73. In a remote control system of the code type, an office and a station, transmitting means at the station for delivering a code to the office, a master relay effective when energized to cause the transmitter to transmit a code, a plurality of starting relays, means effective when any starting relay becomes energized to energize the master relay to initiate the transmission of a code, a time element relay, means effective whenever the master relay is energized to energize the time element relay, means for deenergizing the master relay at the end of a code, means for deenergizing each starting relay at the end of a code initiated by such starting relay, and means controlled by said time element relay if energized substantially continuously for a predetermined time interval materially greater than the duration of a code for deenergizing the master relay even though a starting relay is then energized.

74. In a remote control system of the code type, an office and a station, transmitting apparatus at the station for delivering a code to the office, a stick relay effective when energized to control the transmitting apparatus and having a pick-up circuit and a stick circuit, means for momentarily closing said pick-up circuit to energize the stick relay, means for opening said stick circuit at the end of a code, and time measuring means controlled by said relay and effective to prevent more than a predetermined number of operations thereof per unit of time, said number being materially less than the number of codes said apparatus is adapted to transmit per unit of time.

75. In a remote control system of the code type, an office and a station, transmitting means at the station for delivering a code to the office, a stick relay effective when energized to control the transmitting means and having a pick-up circuit and a stick circuit, means for momentarily closing said pick-up circuit to energize the stick relay, means for opening said stick circuit at the end of a code, and time measuring means rendered effective when said stick relay is operated repeatedly for preventing the closing of the pick-up circuit of the relay for a predetermined time interval, said interval being materially greater than the normal interval between successive operations of said relay.

76. In a remote control system of the code type, an office and a plurality of stations connected by a line circuit, a code transmitter at each station for transmitting codes from the corresponding station to the office, means at each station for operating the transmitter at that station provided only the line circuit to the office is available, means controlled by each transmitter when operating for rendering the line to the office non-available for transmission from more remote stations, and means controlled by each transmitter when operated repeatedly and substantially continuously for a predetermined time for preventing its operation for a time interval sufficient to permit the operation of the transmitters at the more remote stations.

77. In a remote control system of the code type, a plurality of transmitting stations connected to the same line circuit, station apparatus at each station comprising a time element relay and a code transmitter operable to deliver codes to said line circuit, means at each station effective when said time element relay is in its normal position and said line circuit has been free for at least a brief time interval for causing the operation of the associated code transmitter, and means responsive to the operation of said code transmitter for actuating said time element relay away from its normal position to render said code transmitter ineffective for a limited time interval which is greater than said brief time interval.

78. In a remote control system for railroads, a track section, a track relay for the section, a signal for governing traffic through the section, a stick relay for the signal, a control circuit for the signal closed only when the stick relay and the track relay are energized, a pick-up circuit for the stick relay adapted to be closed from a remote point by a momentary current impulse, a first stick circuit for the stick relay closed when the stick relay and the track relay are energized, a slow release relay adapted to be energized when the track relay is energized, and a second stick circuit for the stick relay including a back contact of the slow release relay.

79. In a remote control system for railroads, a track section, a track relay for the section, a signal for governing traffic through the section, a stick relay for the signal, a control circuit for the signal closed only when the stick relay and the track relay are energized, a pick-up circuit for the stick relay adapted to be closed from a remote point by a momentary current impulse, a first stick circuit for the stick relay closed when the stick relay and the track relay are energized, a slow release relay adapted to be energized when the track relay is energized, a second stick circuit for the stick relay including a back contact of the slow release relay, and a third stick circuit for the stick relay including a manually controlled contact.

80. In a remote control system for railroads, a track section, a track relay for the section, a signal for governing traffic through the section, a stick relay for the signal, a control circuit for the signal closed only when the stick relay and the track relay are energized, a pick-up circuit for the stick relay adapted to be closed from a remote point by a momentary current impulse, a stick circuit for the stick relay including a contact closed when the track relay is energized, automatically controlled means for bridging said contact when the track relay has been deenergized for a brief period, and manually controlled means for bridging said contact.

81. In a train dispatching system, a railway switch adapted to be controlled from a remote point, a locking relay effective when deenergized to prevent operation of the switch, a time measuring device effective when set into operation to energize the locking relay at the end of a predetermined time interval to permit the switch to then be operated, means manually controllable from said remote point for setting said time measuring means into operation, and means for distinctively indicating at said remote point when the time measuring means is set into operation and when it completes its operation at the end of the predetermined time interval.

82. In a train dispatching system, a track switch adapted to be operated from a remote point, indication means at said remote point for indicating the condition of the switch, a locking relay effective when deenergized to prevent operation of the switch, a time measuring device effective when set into operation to energize the locking relay at the end of a predetermined time interval to permit the switch to be then operated, means manually controllable from said remote point for setting the time measuring means into operation, and means controlled by the time measuring means for modifying the indication given by the indication means for the duration of said time interval.

83. In a remote control system, an office and a plurality of stations connected by a line circuit, a transmitter at the office and at each station adapted to transmit to the line circuit codes each comprising a series of code elements, a series of counting relays at each station, means for operating the first counting relay of each series in response to the first element of any code transmitted over said line circuit, and means at each station for operating the remaining counting relays at such station in order in response to succeeding elements of a code transmitted from the office but not in response to succeeding elements of a code transmitted from another station.

84. In a remote control system, an office and a plurality of stations connected by a line circuit, a transmitter at the office and at each station adapted to transmit to the line circuit codes each comprising a series of code elements, a series of counting relays at each station, means for operating the first counting relay of each series in response to the first element of any code transmitted over said line circuit, and means at each station selectively responsive to the character of such first code element for operating the remaining counting relays at such station in response to succeeding elements of certain codes transmitted over said line circuit.

85. In a remote control system, an office and a plurality of stations connected by a line circuit, a transmitter at the office and at each station adapted to transmit to the line circuit codes each comprising a series of code elements, a series of counting relays at each station, means for operating the first counting relay of each series in response to the first element of any code transmitted over said line circuit, a selector relay at each station selectively responsive to the character of the first element of each code transmitted from the office, and means at each station controlled by the associated selector relay for operating the remaining counting relays at such station in order in response to succeeding elements of a code transmitted over said line circuit.

86. In a remote control system, an office and a plurality of stations connected by a line circuit, a transmitter at the office and at each station adapted to transmit to the line circuit codes each comprising a series of code elements, a series of counting relays at each station, means for operating the first counting relay of each series in response to the first element of any code transmitted over said line circuit, a selector relay at each station selectively responsive to the character of the first element of each code transmitted from the office, means at each station controlled by the associated selector relay and by the first counting relay of the associated series for operating the remaining counting relays at such station in order in response to succeeding elements of a code transmitted from said office, and receiving means at said office responsive to codes transmitted over said line circuit from a station.

87. A code receiver comprising a selector relay, register relays and a delivery relay; means for selectively energizing the selector relay in accordance with a portion of the code, means effective when the selector relay is energized for energizing selected register relays to register the remainder of the code, station devices adapted to be operated in accordance with the condition of the register relays when the delivery relay is energized, means for energizing the delivery relay at the end of the code, and means for maintaining the delivery and register relays energized until after the selector relay is released and the receiver is in condition to receive at least a portion of a succeeding code.

88. A code receiver comprising means for separately registering a first portion and a second portion of a code, a delivery relay, devices adapted to be operated by the delivery relay in accordance with the second portion of the code, means controlled selectively by the first portion of the code for energizing the delivery relay at the end of the code, and means for holding the delivery relay energized for a predetermined time interval to operate said devices while the first portion of a succeeding code is being registered by said receiver.

89. A code receiver comprising means for separately registering a first portion and a second portion of a code, devices adapted to be controlled in accordance with the second portion of the code, code storing means selectively controlled by the first portion of the code for operating said devices at the end of the code, and means effective at the end of a code for placing the receiver in condition to receive the first portion of a succeeding code prior to the completion of the operation of said devices by the code storing means.

90. In combination with a track switch and a signal for governing traffic over the switch, switch control means for operating the track switch, signal control means for operating the signal, code transmitting means at a remote office effective when actuated to transmit codes for selectively operating said switch and signal control means to control the switch and the signal, normally energized switch indication means at the office adapted to indicate the condition of the switch and of its control means, means controlled by said code transmitting means for deenergizing the switch indication means when the code transmitting means is actuated for operating the switch, means controlled by the switch when fully operated to a position corresponding with the condition of its control means to energize the switch indication means, and manually controllable means operable only when said switch indication means is energized to indicate correspondence between the switch and its control means for actuating the code transmitting means to transmit a code for controlling said signal control means to operate the signal to a proceed position.

91. In combination with a plurality of track switches and a signal for governing traffic over a traffic route including said switches, code transmitting means at a remote office effective when actuated to transmit different codes for selectively operating said switches and for controlling said signal, normally energized switch indication means at the office for each switch adapted to indicate the condition of that switch, means controlled by said code transmitting means for deenergizing the switch indication means for each switch when the code transmitting means is actuated for operating that switch, means controlled by each switch when fully operated to energize the corresponding switch indication means, and manually controllable means effective only when all of said indication means are energized to indicate that each track switch occupies the position required for said route for automatically setting the code transmitting means into operation to operate the signal to a proceed position.

92. In combination, a two-position track switch and a signal governing traffic over the switch, code transmitting means effective when actuated to transmit codes for operating the switch and signal, switch control and signal control levers for selectively controlling the operation of the code transmitting means to determine the operations to be performed by said codes, normally energized indication means associated with said levers for indicating each position of the switch, means for manually actuating said code transmitting means to transmit a code in accordance with the position of said switch lever, means controlled by said code transmitting means when actuated for deenergizing the switch indication means, switch control means controlled by said code for operating the track switch to a position corresponding to that of said lever, means controlled by the track switch and its control means and effective only when the switch assumes a position in accordance with said code to reenergize said indication means to indicate the position assumed by the switch, and means effective only if said signal lever is reversed and said switch indication means becomes energized in agreement with the position of the switch lever for automatically actuating said code transmitting means to transmit a code to operate the signal to a proceed position.

93. In combination, a track switch and a railway signal for governing traffic over the switch, a stick relay for controlling the signal, switch control means for controlling the switch, an indication relay for indicating correspondence between the switch and its control means, transmitting means at a remote point for selectively energizing said stick relay, indication means at said remote point controlled by said indication relay, manually controlled means rendered effective when said indicating means becomes energized for actuating said transmitting means to energize said stick relay, and means controlled by said stick relay and said indication relay for clearing said signal.

94. In combination, a track switch and a railway signal for governing traffic over the switch, a stick relay, means for conditioning the signal to indicate proceed when the stick relay is energized and to indicate stop when the stick relay is released, transmitting means at a remote point for selectively energizing or deenergizing said stick relay, an indication relay for indicating the position of the switch, an indication repeating relay at said remote point controlled by said indication relay, manually controlled means for actuating said transmitting means, and means controlled by said indication repeating relay for preventing the control of said transmitting means by said manually controlled means unless said transmitting means is in condition to cause the deenergization of said stick relay.

95. In combination, a railway signal, manually controlled apparatus for transmitting different control messages from a remote point to condition a railway signal to indicate proceed or to indicate stop, indication means at said remote point for indicating when the route governed by said railway signal is available, and means for preventing the operation of said manually controlled apparatus unless an available route is indicated by said indication means or said manually controlled apparatus is in condition to cause said railway signal to indicate stop.

96. In combination with transmitting apparatus for sending switch and signal control messages from an office to a remote station, a track switch and a railway signal at the station, means selectively responsive to a switch control message from said apparatus for operating said switch to one position or another and responsive to a signal control message from said apparatus for operating said signal to indicate proceed or stop, indication means at said office for indicating the condition of said signal, and locking means associated with said transmitting apparatus and effective to prevent the sending of a switch control message unless said indication means indicates that the signal is at stop or said apparatus has been operated to send a message to cause the signal to indicate stop.

97. In combination with transmitting apparatus for sending switch and signal control messages from an office to a remote station, a series of track switches at the station, a plurality of railway signals including one for each of a plurality of routes determined by the positions of said switches, means selectively responsive to switch control messages from said transmitting apparatus for operating each of said switches to one position or another and responsive to signal control messages from said transmitting apparatus for operating each of said railway signals to indicate proceed or stop, indication means at said office for indicating the condition of said signals, and locking means effective to prevent the sending of switch control messages unless said indication means indicates that each signal governing a route over the switches controlled by such messages is at stop or said apparatus has been operated to send a message to cause such signal to indicate stop.

98. In combination with transmitting apparatus for sending switch and signal control messages from an office to a remote station, a series of track switches at the station, a plurality of railway signals including one for each direction over each of a plurality of routes over said switches, means selectively responsive to control messages from said apparatus for operating each of said switches and signals, indication means at said office for indicating the condition of said switches and signals, switch control means for controlling the sending of switch control messages, said means being effective only when said indication means indicates that each of said signals has been operated to the stop position, and signal control means for controlling the sending of a signal control message to operate a selected one of said signals to the proceed position, said signal control means being effective when the indicated position of each switch included in the route governed by said signal is in agreement with the position of its control means and the control means for the opposing signal has been operated to send a message to put such signal in the stop position.

99. In combination with transmitting apparatus for sending control messages from an office to a remote station to operate one or the other of a pair of opposing railway signals at said switch, indication means at the office for indicating the condition of said signals, signal control means for controlling the sending of said messages, and locking means effective when said indication means indicates that either of said signals is at proceed for preventing the sending of a message for causing the other signal to indicate proceed.

100. In combination with transmitting apparatus for sending control messages from an office to a remote station to operate a railway signal at said station, indication means for indicating when the route governed by said signal is available, a signal lever having a proceed and a stop position, a lever repeating relay for said lever, a circuit for the lever repeating relay adapted to be closed when the lever is in the stop position, a second circuit for said lever repeating relay adapted to be closed when the lever is in the proceed position provided an available route is indicated by said indication means, and means effective when said lever repeating relay is energized for initiating the operation of said transmitting apparatus to send a message for controlling said signal in accordance with the position of said signal lever.

101. In combination with a detector section of railway track including a track switch, a signal for governing the movement of traffic into said section, normally energized switch control means manually controllable from a remote point, means controlled by said switch control means effective to operate the switch only when the signal indicates stop and the detector section is unoccupied, means effective to restore the signal to stop upon the deenergization of the switch control means or upon the occupancy of said detector section, and means for preventing the deenergization of the switch control means when the signal is at clear but only if a train is approaching within a predetermined distance of the signal at clear.

102. In combination with an approach section of railway track and an adjacent detector section including a track switch, a signal for governing the movement of traffic from the approach section into the detector section, switch control means for operating the switch, locking means subject to control by traffic conditions in said approach section only when the signal is at clear for preventing the operation of the switch control means if the approach section is occupied and the signal is at clear, and other locking means for preventing the operation of the switch by its control means when the signal is at clear irrespective of the condition of said approach section.

103. In combination with a railway track switch, a pair of opposing signals including one for each direction for governing the movement of traffic over the switch, switch control means for operating the switch, a locking relay for each signal deenergized when the signal is at clear and effective when deenergized to prevent the operation of the switch by its control means, a repeating relay controlled by said locking relays and effective when deenergized to prevent the operation of the switch control means, and means for energizing said repeating relay independently of the condition of said locking relays provided no train is approaching within a predetermined distance of said switch.

104. Remote control apparatus for the control of devices located at a plurality of different stations connected with a control office by a line circuit comprising means at the office for periodically interrupting the line circuit to produce different codes in which the periods of open and closed circuit in the line circuit are both regulated so that both these periods constitute code elements, and a code receiver at each station for controlling the devices at such station comprising means selectively responsive to a distinctive code pattern of open and closed circuit periods in a code transmitted over said line circuit.

105. Remote control apparatus for the control of devices located at a plurality of different stations connected with a control office by a line circuit comprising means at the office for periodically interrupting the line circuit to produce different codes in which the periods of open and closed circuit in the line circuit are both regulated so that both these periods constitute code elements, and a code receiver at each station for controlling the devices at such station comprising means selectively responsive to the relative lengths of both the open and of the closed circuit periods in a code transmitted over said line circuit.

106. Remote control apparatus for the control of devices located at a plurality of different stations connected with a control office by a line circuit comprising means at the office for periodically interrupting the line circuit to produce different codes in which the periods of open and closed circuit in the line circuit are both regulated so that both these periods constitute code elements, and a code receiver at each station for controlling the devices at such station including means selectively responsive to the relative lengths of the open circuit periods of a code and other means selectively responsive to the relative lengths of the closed circuit periods of a code, each code receiver also including means for registering a distinctive pattern of such open and closed circuit periods.

107. Remote control apparatus for the control of devices located at a plurality of different stations connected with a control office by a line circuit comprising means at the office for periodically interrupting the line circuit to produce different codes in which the alternate periods of open and closed circuit constituting the code elements include a number of relatively long open or closed circuit periods which are differently distributed throughout the succession of code elements for each code, and a code receiver at each station for controlling the devices at such station comprising means selectively responsive to a distinctive arrangement of the relatively long open or closed circuit periods in a code transmitted over said line circuit.

108. Remote control apparatus for the control of devices located at a plurality of different stations connected with a control office by a line circuit and for the indication at said office of devices at said stations comprising means at the office and at each station for periodically interrupting the line circuit to transmit different codes in which the alternate periods of open and closed circuit constituting the code include a number of relatively long open or closed circuit periods which are differently distributed throughout the succession of code elements to provide a distinctive code for each station, a code receiver at each station selectively responsive to the particular arrangement only of long open and closed circuit periods constituting the distinctive code for such station, and a code receiver at the office selectively responsive to each such distinctive code of long and short open and closed circuit periods.

109. Remote control apparatus for the control of devices located at a plurality of different stations connected with a control office by a normally closed line circuit and for the indication at said office of the conditions of devices at the several stations comprising means at the office for periodically interrupting the line circuit to produce different codes in which the initial interruption is relatively long and in which the remaining alternate periods of closed and open circuit constituting the code elements include a number of relatively long open or closed periods which are differently distributed throughout the succession of code elements to provide a distinctive code pattern for each station, a code receiver at each station for controlling the devices at such station comprising means selectively responsive to a code transmitted over said line circuit including an initial relatively long open circuit period and succeeding relatively long closed and open circuit periods arranged in accordance with the distinctive code pattern for such station, means at each station for periodically interrupting the line circuit to produce a code in which the initial interruption is relatively short and in which the remaining elements are arranged in accordance with the distinctive code pattern to which the code receiver at such station responds, and a code receiver at the office selectively responsive to each distinctive code to indicate the condition of the devices at the station originating the code, said office receiver being non-responsive to codes originating at said office.

110. Remote control apparatus for the control of devices located at a plurality of different stations connected with a control office by a line circuit comprising means at the office and at each station for periodically interrupting the line circuit to produce different codes in which the alternate periods of open and closed circuit constituting the code elements include a number of relatively long open or closed periods which are differently distributed throughout the succession of code elements for each code, and a code receiver at each station, each code receiver being selectively responsive to a long first element to distinguish the point of origin of the code, a progressively smaller number of code receivers being responsive to each succeeding long open or closed period, the receiver at but one station only being responsive to the last long element of each distinctive code to effect the control of the associated device.

111. Remote control apparatus for the indication of the conditions of a plurality of devices each located at a different station, said stations being connected with said office by a line circuit comprising means at each station for periodically interrupting the line circuit to produce different codes in which the alternate periods of open and closed circuit constituting the code elements include a fixed number of relatively long open or closed periods which are differently distributed throughout the succession of code elements to provide a distinctive code for each station, and a code receiver at the office comprising a series of groups of selecting devices, means for operating one selecting device of a group when each long open or closed circuit period of the code is received, means controlled by each selecting device when operated for rendering the other devices of its group inoperative and for also rendering the selecting devices of a subordinate group operative by the next succeeding long open or closed circuit period of the code, a selecting device associated with a particular station being operated by the last long code element of the distinctive code for such station to indicate the condition of the device at such station.

112. In a remote control system, code transmitting apparatus for delivering different codes to a line circuit comprising means for periodically interrupting the line circuit to produce different codes each having the same number of code elements and each containing the same number of overlapping groups of elements, each group having one selected element different from the remainder, and means rendered effective upon the transmission of the different element in each group except the final group to render each following element of the code available as an element of the next succeeding group.

113. In a remote system of the type employing distinctive codes all having the same number of elements arranged in groups, a selected element of each group being different from the remainder, the method of forming a large number of different codes from a limited number of elements which consists in expanding each group to include elements of an adjoining group and in providing means for each group effective when operated to initiate the transmission or reception of each of the code elements of its group one at a time in sequence, in providing means for initially operating the selecting means for the first group of elements, and in providing means responsive to the different element in each group to release the selecting means for the group and to also operate the selecting means for the next succeeding group.

114. In combination with a line relay capable of assuming two positions, means for operating said relay alternately to said two positions for selected time intervals, three timing devices, means for operating the first said timing device when said relay remains in one said position for a predetermined time interval, means for operating the second timing device when said relay remains in the other said position for a predetermined time interval, means for operating said third timing device when said relay remains in either position for a predetermined longer time interval, a plurality of indicators, means effective upon each operation of said first or of said second timing device to operate a different indicator of said series, and means effective upon the operation of said third timing device to release said indicators.

115. In combination with a line circuit, a line relay capable of assuming two positions included in said line circuit, transmitting means controlling said line circuit and normally effective to operate the line relay alternately to said two positions for relatively short time intervals, two timing devices, means for operating one said timing device if the line relay remains in one said position for a predetermined longer time interval, means for operating the other timing device if the line relay remains in its other said position for a predetermined longer time interval, and means for at times delaying the operation of said transmitting means until one or the other of said timing devices have operated to deliver a series of code elements of selected lengths to said line circuit.

116. In a centralized traffic controlling system, a control office, a field station, a line circuit connecting said control office with said field station, step-by-step mechanisms at said control office and at said field station, means for operating said mechanisms in synchronism by a series of impulses applied to said line circuit, means at said field station for controlling the time spacings between said impulses and for controlling the lengths of said impulses during the operation of said mechanism to form a code combination, and means controlled by said code combination for registering said field station in said control office.

117. In a centralized traffic controlling system, a control office, a field station, a normally energized line circuit extending from said control office to said field station, means for de-energizing and energizing said line circuit to form a series of equally time-spaced impulses of equal duration, step-by-step mechanisms at said control office and at said field station operated in synchronism by said impulses, code selecting means at said field station operable successively by said mechanism to change said impulses to a series of unequal time spaced impulses of unequal duration, and means at said control office for registering said unequal time spacings and impulses during the operation of said mechanisms.

118. In a centralized traffic controlling system, a control office, a plurality of field stations, a line circuit extending from said control office through said field stations, code transmitting means for energizing said line circuit with a series of time spaced impulses, indication transmitting means at each field station capable of varying the length of said impulses and the time spacings between said impulses to distinctively condition said line circuit for each impulse and for each time space, means responsive to the distinctive conditions of said line circuit for registering said stations in said office, and means for rendering effective the indication transmitting means at only one station during any one particular series of impulses applied to said line circuit.

119. In a centralized traffic controlling system, a plurality of locations including a control office and a field station, step-by-step mechanisms at said locations, a line circuit connecting said control office with said field station, means for applying a series of impulses to said line circuit, means responsive to said impulses for operating said mechanisms, means at said field station effective during the operation of said mechanisms for controlling the time spacings between said impulses and the lengths of said impulses, means including a first slow acting relay at said control office effective during the operation of said mechanisms for registering said time spacings, and means including a second slow acting relay at said control office effective during the operation of said mechanisms for registering the lengths of said impulses.

120. Remote control apparatus for the control of a plurality of indication devices located at a control office connected by a line circuit with a plurality of different stations, comprising means at each station for repeatedly interrupting the line circuit to produce different codes in which the periods of open and closed circuit are both regulated so that both these periods constitute code elements, and a code receiver at the office for controlling said indication devices comprising means selectively responsive to different code patterns of open and closed circuit periods in codes transmitted over said line circuit.

121. Remote control apparatus for the control of a plurality of indication devices located at a control office connected by a line circuit with a plurality of different stations, comprising means at each station for repeatedly interrupting the line circuit to produce different codes in which the periods of open and closed circuit are both regulated so that both these periods constitute code elements, and a code receiver at the office for controlling said indication devices comprising means selectively responsive to a distinctive arrangement of the relatively long open or closed circuit periods in a code transmitted over said line circuit.

122. In combination, a first section of railway track including a track switch, a track circuit for said track section including a track relay, a normally energized slow-release slow-pickup repeater relay controlled by said track relay, operating mechanism effective at times to move the switch, an approach track section provided with a track circuit, an approach locking relay controlled by the track circuit of said approach section, an energizing circuit for said locking relay including a back contact of the repeater relay, a control circuit for the operating mechanism and including a front contact of the locking relay and a front contact of the repeater relay, whereby neither a momentary shunt of the first section while a train occupies the approach section nor a momentary loss of shunt while a train occupies the first section will permit the operating mechanism to move the switch.

123. In combination, a first section of railway track including a track switch, a track circuit for said section including a track relay, a repeater relay controlled by said track relay, an approach track section provided with a track circuit, an approach locking relay controlled by the track circuit of the approach section, an energizing circuit for said locking relay including a back contact of the repeater relay, switch operating mechanism effective at times to move the switch, and a controlling relay for said switch operating mechanism controlled by a front contact of the locking relay and a front contact of said repeater relay in series, said repeater relay being provided with slow-releasing slow-pickup characteristics, whereby neither a momentary shunt of said first section while a train occupies the approach section nor a momentary loss of shunt while a train occupies the first track section will permit the operating mechanism to move the switch.

124. In combination, a section of railway track including a track switch, a track circuit for said section including a track relay, a repeater relay controlled by said track relay characterized by being provided with both slow-release and slow-pickup features, a third relay responsive to traffic conditions approaching said track section, a pick-up circuit for said third relay including a back contact of the repeater relay, a switch controlling relay for governing the operation of said switch; and a control circuit for said controlling relay including front contacts of the track relay, the repeater relay and said third relay in series.

125. In combination, a section of railway track including a track switch, a track circuit for said section including a track relay, a repeater relay controlled by said track relay characterized by being provided with both slow-release and slow-pickup features, a signal to govern traffic through said section, a signal control relay to govern the operation of said signal, an approach locking relay, a stick circuit for said locking relay controlled by a back contact of said signal control relay, a pickup circuit for said locking relay including a back contact of said repeater relay, a switch controlling relay for governing the operation of said switch, and a control circuit for said switch controlling relay including front contacts of said repeater relay and said locking relay in series.

126. In a remote control system for railroads, a track section, a track relay for the section, a signal for governing traffic through the section, a stick relay for the signal, a control circuit for the signal closed only when the stick relay and the track relay are energized, a pick-up circuit for the stick relay adapted to be closed from a remote point by a momentary current impulse, a slow release relay controlled by a front contact of the track relay, a first stick circuit for the stick relay including a front contact of the track relay, and a second stick circuit for said stick relay including a back contact of the slow release relay.

127. In a remote control system for railroads, a track section, a track relay for the section, a signal for governing traffic through the section, a stick relay for the signal, a control circuit for the signal closed only when the stick relay and the track relay are energized, a pick-up circuit for the stick relay adapted to be closed from a remote point by a momentary current impulse, a slow release relay controlled by a front contact of the track relay, a relay adapted to be controlled manually from a remote point by a momentary current impulse, and a plurality of stick circuits for the stick relay each including a contact of said relay controlled manually and including respectively a front contact of the track relay and a back contact of the slow release relay.

128. In a remote control system, a control office and a plurality of field stations, a master relay at each station, means for independently energizing a plurality of said master relays, means for maintaining one and only one of said master relays energized during an operating cycle of said system, means for transmitting messages from one of said stations to said office when the associated master relay is operated, a slow acting relay for each master relay, means for operating each slow acting relay dependent upon how long the associated master relay is operated, and means controlled by each slow acting relay in its operated condition for rendering the operating circuit of said associated master relay ineffective for a time interval which is longer than the normal interval between successive operating cycles of said system.

129. In a remote control system, a control office, a first field station, a plurality of other field stations, a communication system connecting said office with said stations, means including said communication system for transmitting indications from each of said stations to said office in response to a change in condition at the corresponding station, means preventing any station from initiating the transmission of indications while another station is transmitting indications, lockout means normally preventing the transmission of indications from said other stations until after said first station has transmitted its indications in the event said first station and another station both become associated with said communication system at the same time, a slow acting relay energized in response to the active association of said first station with said communication system for a measured length of time, means controlled by said slow acting relay for measuring off a predetermined time interval after said first station is disassociated from active use of said communication system, and means controlled by said slow acting relay for preventing said first station obtaining active association with said communication system until after one of said other stations has transmitted its indications in the event one of said other stations initiates the tranmission of indications before said time interval has been measured off.

130. In a communication system, a control office and a plurality of stations connected by a line circuit, means at each station effective when initiated for operating said system through cycles of operations, means at each of said stations for initiating said system into cycles of operations by actively associating the corresponding station with said communication system, a time measuring device at each of said stations, means responsive to the active association of a station with said communication system for a measured period of time for operating the associated device, means controlled in part by each said device for preventing the associated station from actively associating itself with said communication system as long as any one of said stations is actively associated with said communication system, and means including the device at a particular station in its operated condition for allotting all other stations a preferred chance to actively associate themselves with said communication system irrespective of the condition existing which requires the association of said particular station with said system.

131. In a communication system, a control office, a superior station and an inferior station connected to said control office by a line circuit, means at each station effective when initiated for operating said system through cycles of operations, means at each station including a master relay for initiating said system into cycles of operations and actively associating the corresponding station with said communication system, means effective as long as the master relay at said superior station is in its operated condition for preventing said inferior station from being actively associated with said communication system, a time measuring device at said superior station, means responsive to the active association of said superior station with said communication system for a measured period of time for operating said device, and means including said device for preventing said superior station from actively associating itself with said communication system as long as said inferior station is actively associated with said communication system, and for at tmes allotting said inferior station a chance to actively associate itself with said communication system irrespective of a condition existing which requires the active association of said superior station with said communication system.

132. In a centralized traffic control system for a railway track layout having a plurality of track sections interconnected by track switches to form different traffic routes with signals for governing traffic movements over the routes, in which the switches and signals are controlled individually in accordance with the positions of switch and signal levers at a control office by means of impulse codes transmitted from said office to said station and in which the positions of the switches and signals are indicated at the office by indication relays controlled by other impulse codes transmitted from the station to said office, the combination of a circuit network at said office including a route circuit for each route through the track layout for each direction of traffic movement, with means for preparing the route circuit for any desired route upon movement of the switch levers to positions required to establish the route with the lever for the corresponding signal in the signal clearing position, means controlled by the indication relays for completing the prepared route circuit upon receipt of codes indicating that the track switches involved occupy the required positions and the opposing signal is at stop, and means controlled by each route circuit when established for initiating the transmission of a code for clearing the corresponding signal.

LLOYD V. LEWIS.

CERTIFICATE OF CORRECTION.

Patent No. 2,229,249. January 21, 1941.

LLOYD V. LEWIS.

It is hereby certified that error appears in the printed specification of the above numbered patent requiring correction as follows: Page 30, first column, line 35, claim 64, for "lien" read --line--; line 73, claim 65, for "tsation" read --station--; line 74, same claim, for the word "them" read --then--; and second column, line 54, claim 68, for "code seach" read --codes each--; page 33, second column, line 37, claim 93, for "indicating" read --indication--; line 62, claim 95, for "a" before "railway" read --said--; page 34, first column, line 63, claim 99, for "switch" read --station--; and that the said Letters Patent should be read with this correction therein that the same may conform to the record of the case in the Patent Office.

Signed and sealed this 29th day of April, A. D., 1941.

Henry Van Arsdale,
Acting Commissioner of Patents.

(Seal)